US009346432B2

(12) United States Patent
Sugimoto et al.

(10) Patent No.: US 9,346,432 B2
(45) Date of Patent: May 24, 2016

(54) AIRBAG UNIT AND AIRBAG FOLDING METHOD

(71) Applicant: Takata Corporation, Tokyo (JP)

(72) Inventors: Kazutaka Sugimoto, Tokyo (JP); Kazuhiro Abe, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/262,325

(22) Filed: Apr. 25, 2014

(65) Prior Publication Data

US 2014/0318881 A1    Oct. 30, 2014

(30) Foreign Application Priority Data

Apr. 26, 2013    (JP) .................................. 2013-093358
Jul. 17, 2013    (JP) .................................. 2013-148314
Jan. 22, 2014    (JP) .................................. 2014-009383
Mar. 26, 2014    (JP) .................................. 2014-064112

(51) Int. Cl.
*B60R 21/36*      (2011.01)
*B60R 21/237*     (2006.01)
*B60R 21/2165*    (2011.01)
*B60R 21/217*     (2011.01)
*B60R 21/215*     (2011.01)
(Continued)

(52) U.S. Cl.
CPC ............... *B60R 21/36* (2013.01); *B60R 21/237* (2013.01); *B60R 21/217* (2013.01); *B60R 21/2165* (2013.01); *B60R 2021/21537* (2013.01); *B60R 2021/23324* (2013.01); *B60R 2021/23382* (2013.01); *B60R 2021/23386* (2013.01); *B60R 2021/346* (2013.01)

(58) Field of Classification Search
CPC combination set(s) only.
See application file for complete search history.

(56) References Cited

U.S. PATENT DOCUMENTS 7,341,274 B2 *   3/2008   Mori ....................... B60R 21/36
                                                    180/274
7,357,212 B2 *   4/2008   Sasaki .................... B60R 21/36
                                                    180/274
(Continued)

FOREIGN PATENT DOCUMENTS

EP        1 340 269      4/2003
EP        1 338 483      8/2003
(Continued)

OTHER PUBLICATIONS

Partial European Search Report dated Jul. 10, 2014 issued in European Application No. 14165788.2.
(Continued)

*Primary Examiner* — Nicole Verley
(74) *Attorney, Agent, or Firm* — Foley & Lardner LLP

(57) ABSTRACT

[Object] To provide an airbag unit smaller in size and lighter in weight, and capable of being rapidly expanded, and a method of folding an airbag.
[Solution] An airbag unit 20, configured to cover at least a part of a windshield 6 and a front pillar 2 outside of a vehicle 1, includes an airbag 10 formed in a U-shape including a bottom portion and a pair of projecting portions respectively projecting from the bottom portion, a gas generator 22 that ejects gas into the airbag 10, a lower cover unit 21 that accommodates therein the unexpanded airbag 10 and the gas generator 22, and an upper cover unit 24 that covers the lower cover unit 21 containing therein the airbag 10. The airbag 10 is expanded by the gas ejected from the gas generator 22 through between a hood 4 the windshield 6 of the vehicle 1.

26 Claims, 52 Drawing Sheets

(51) Int. Cl.
    *B60R 21/233*     (2006.01)
    *B60R 21/2338*    (2011.01)
    *B60R 21/34*      (2011.01)

(56) References Cited

U.S. PATENT DOCUMENTS

| | | | |
|---|---|---|---|
| 7,584,988 B2* | 9/2009 | Okamoto | B60R 21/36 180/274 |
| 7,712,767 B2* | 5/2010 | Takahashi | B60R 21/36 180/274 |
| 7,770,684 B2* | 8/2010 | Takimoto | B60R 21/36 180/274 |
| 7,845,454 B2* | 12/2010 | Takimoto | B60R 21/2338 180/274 |
| 8,016,066 B1* | 9/2011 | Boxey | B60R 21/36 180/271 |
| 8,770,654 B2* | 7/2014 | Schaefer | B60R 13/07 296/192 |
| 2005/0098372 A1 | 5/2005 | Takimoto | |
| 2005/0206137 A1 | 9/2005 | Takimoto | |
| 2006/0151228 A1* | 7/2006 | Kalliske | B60R 21/2338 180/274 |
| 2007/0023223 A1 | 2/2007 | Okamoto et al. | |
| 2007/0114090 A1* | 5/2007 | Okamoto | B60R 21/36 180/274 |
| 2009/0008910 A1 | 1/2009 | Takimoto et al. | |
| 2009/0014988 A1* | 1/2009 | Takimoto | B60R 21/2338 280/730.1 |
| 2009/0120708 A1 | 5/2009 | Takimoto | |

FOREIGN PATENT DOCUMENTS

| | | | | |
|---|---|---|---|---|
| EP | 1 527 966 A | | 5/2005 | |
| EP | 1 681 212 A | | 7/2006 | |
| EP | 1 977 937 | | 10/2008 | |
| EP | 1 982 872 | | 10/2008 | |
| EP | 2360068 A1 | * | 8/2011 | ............. B60R 21/36 |
| EP | 2 520 471 A | | 11/2012 | |
| GB | WO 2015028780 A1 | * | 3/2015 | ............ B60R 21/237 |
| JP | 2004-352218 A | | 12/2004 | |
| JP | 2005-138749 A | | 6/2005 | |
| JP | 2005-153851 A | | 6/2005 | |
| JP | 2006-062488 A | | 3/2006 | |
| JP | 2006-219046 | | 8/2006 | |
| JP | 2006-219116 A | | 8/2006 | |
| JP | 2006-256447 | | 9/2006 | |
| JP | 2007-112183 A | | 5/2007 | |
| JP | 2007-152967 A | | 6/2007 | |
| JP | 2007-203956 A | | 8/2007 | |
| JP | 2007-216938 A | | 8/2007 | |
| JP | 2007-238098 | | 9/2007 | |
| JP | 2008-094343 A | | 4/2008 | |
| JP | WO 2011162123 A1 | * | 12/2011 | ............. B60R 21/36 |
| WO | WO-2005/023605 | | 3/2005 | |
| WO | WO-2008/117496 | | 10/2008 | |
| WO | WO-2012/118426 A | | 9/2012 | |

OTHER PUBLICATIONS

European Search Report mailed Oct. 14, 2013 issued in European Patent Application No. EP14165788.

* cited by examiner

FIG.3
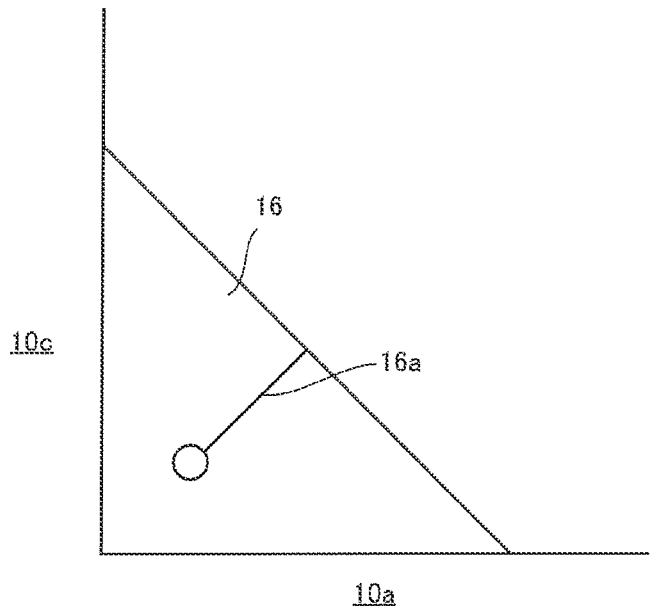
(a)
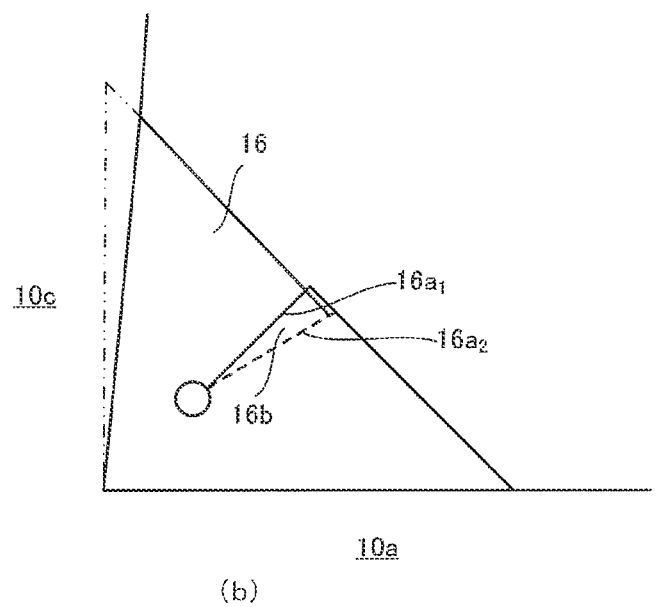
(b)

FIG.8
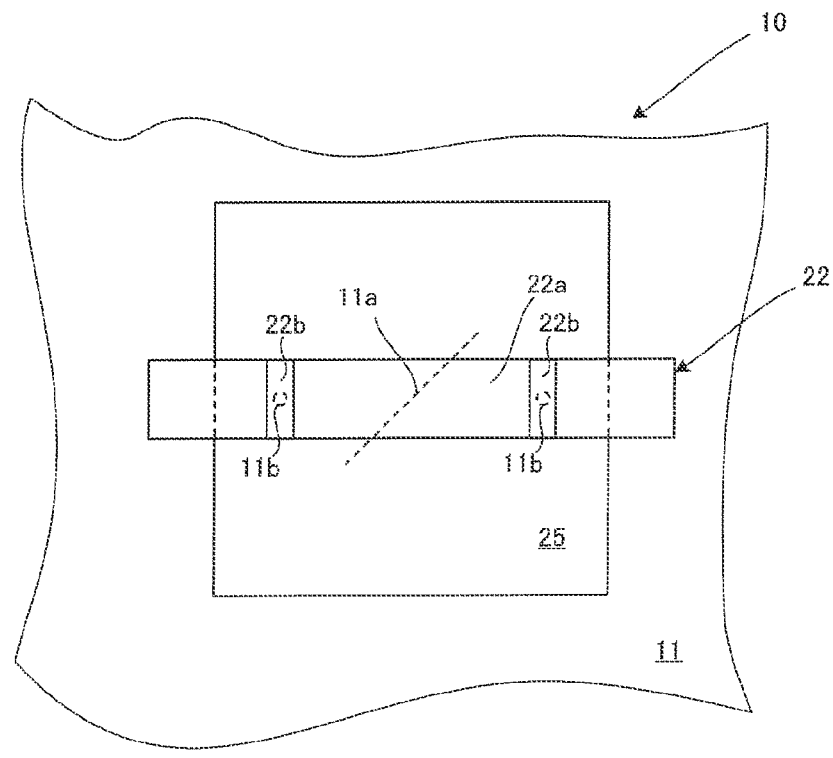
(a)
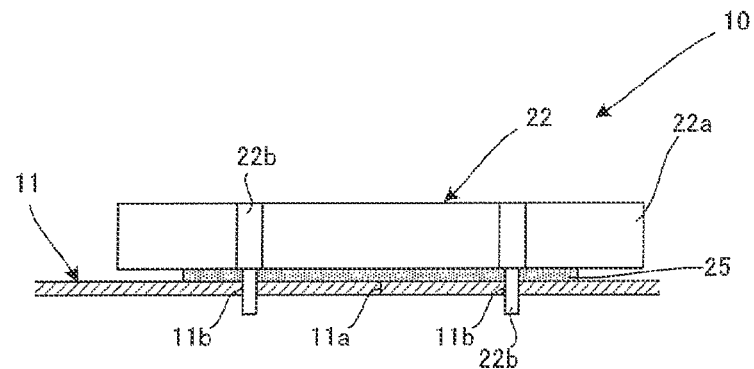
(b)

AIRBAG UNIT AND AIRBAG FOLDING METHOD

BACKGROUND OF THE INVENTION

1. Technical Field

The present invention relates to an airbag unit to be expanded and unfolded outwardly of the vehicle by a gas from a gas generator such as an inflator in an emergency case such as collision with an object, to mitigate the impact against the object and the vehicle, and a method of folding an airbag.

2. Background Art

The airbags thus far developed include those to be expanded to the rear side of the bonnet and the outer side of the pillars of the vehicle in an event of collision with a pedestrian or an object, to mitigate the impact of recollision of the pedestrian or the object with the vehicle.

For example, the airbag unit according to a patent literature (PTL) 1 is installed inside the engine hood and extends, upon being expanded and unfolded, along the front shield glass and the front pillars.

In addition, PTL 2 discloses an airbag unit including an airbag module placed between the rear edge of the bonnet hood and the front edge of the cowl top so as to extend in the left-right direction of the vehicle body, and supported by a rigid damper housing without affecting the locations of the air intake and the wiper.

CITATION LIST

Patent Literature

[PTL 1] Japanese Unexamined Patent Application Publication No. 2007-112183
[PTL 2] Japanese Unexamined Patent Application Publication No. 2006-62488

SUMMARY OF THE INVENTION

Technical Problem

In the airbag unit according to PTL 1, however, the airbag that should cover the front pillars is installed in the engine hood so as to expand therefrom, and therefore it takes a long time before the airbag is unfolded over the front pillars.

With the airbag unit according to PTL 2, since the airbag module is supported by the damper housing, the case of the airbag has to have a sufficient strength to protect peripheral parts from damage at the time of expansion. Therefore both the weight and the size of the airbag unit are increased.

Further, since the airbag unit according to PTL 2 is located on the front side of the cowl top, it takes a long time before the airbag is unfolded over the windshield and the front pillars. In addition, a space for installing the airbag unit has to be secured between the bonnet hood and the cowl top. Therefore the design of the bonnet hood has to be modified, and the airbag unit is unable to be installed in an existing vehicle body.

The present invention has been accomplished in view of the foregoing situation, and provides an airbag unit smaller in size and lighter in weight, and capable of being rapidly expanded, and a method of folding an airbag.

Solution to Problem

An airbag unit according to one or more embodiments of the present invention, configured to cover at least a part of a windshield and a front pillar outside of a vehicle, includes an airbag formed in a U-shape including a bottom portion and a pair of projecting portions projecting from the bottom portion, a gas generator that ejects gas into the airbag, a lower cover unit that accommodates therein the folded airbag and the gas generator, and an upper cover unit that covers the lower cover unit containing therein the airbag. The airbag is expanded by the gas ejected from the gas generator through between a hood of the vehicle and the windshield.

In one or more embodiments of the airbag unit, the lower cover unit and the upper cover unit may each include a recess for circumventing functional parts of the vehicle.

In one or more embodiments of the airbag unit, the upper cover unit may be connected to a cowl top of the vehicle.

In one or more embodiments of the airbag unit, the upper cover unit may include a groove formed on an upper face thereof.

In one or more embodiments of the airbag unit, the upper cover unit may include a tear line that facilitates the upper cover unit to be torn apart and a hinge that facilitates the upper cover unit to be bent, the lower cover unit and the upper cover unit may each include an offset portion recessed backward and located on the side of a forward portion of the vehicle, and the tear line may be offset along the offset portion.

In one or more embodiments of the airbag unit, the upper cover unit may include a sloped recess formed in a region of the upper face of the upper cover unit on the side of the forward portion of the vehicle.

In one or more embodiments of the airbag unit, the lower cover unit may include a sloped cover bottom and a cover sidewall projecting from the cover bottom, and a water escape hole is provided in the cover bottom or at a lower end portion of the cover sidewall.

In one or more embodiments of the airbag unit, the bottom portion may cover at least a part of the hood, and a thickness of the projecting portion of the airbag in a vertical direction from the windshield may be thicker than a thickness of the bottom portion of the airbag in a vertical direction from the hood.

In one or more embodiments of the airbag unit, a thickness $h1$ of the airbag in the bottom portion in the vertical direction from the hood may satisfy 80 mm$\leq h1 \leq$230 mm, or 80 mm$\leq h1 \leq$180 mm, and a thickness $h2$ of the airbag in the projecting portion in the vertical direction from the windshield may satisfy 180 mm$\leq h2 \leq$280 mm, or 200 mm$\leq h2 \leq$250 mm.

In one or more embodiments of the airbag unit, the airbag may include a first inner tether constituting a partition between the bottom portion and the projecting portion.

In one or more embodiments of the airbag unit, the first inner tether may be inclined so as to be closer to a distal end of the projecting portion in a direction away from the midpoint between the pair of projecting portions formed in the U-shape.

In one or more embodiments of the airbag unit, the airbag may further include a second inner tether that divides the bottom portion into two sections, and the section of the bottom portion of the airbag on the side of the windshield divided by the second inner tether may constitute a first unfolding portion, the section of the bottom portion of the airbag on the side of the hood divided by the second inner tether may constitute a second unfolding portion, and the projecting portion of the airbag may constitute a third unfolding portion.

In one or more embodiments of the airbag unit, the second inner tether may include a gas passage, and the airbag may include a diffuser that leads the gas generated by the gas generator to the gas passage.

In one or more embodiments of the airbag unit, the second inner tether may be supported by the gas generator together with the airbag.

In one or more embodiments of the airbag unit, a central portion of the second inner tether may be made higher than end portions thereof in a width direction of the vehicle.

In one or more embodiments of the airbag unit, the gas generator may be supported by a gas generator holder that serves as a diffuser.

In one or more embodiments of the airbag unit, the airbag unit may further include a harness connected to the gas generator, the harness being longer than a length of the lower cover unit in a longitudinal direction thereof.

In one or more embodiments of the airbag unit, 80% or more of the harness may be accommodated in the lower cover unit.

In one or more embodiments of the airbag unit, the airbag may include a first outer tether connecting between a part of the bottom portion on the side of the windshield and a part of the projecting portion on the side of the windshield.

In one or more embodiments of the airbag unit, the airbag may include a second outer tether having one end attached to the bottom portion and the other end attached to one of the lower cover unit and the bottom portion, so that the end portions of the bottom portion in the width direction of the vehicle body are crushed at the time of expansion of the airbag.

In one or more embodiments of the airbag unit, the airbag may include a second outer tether having one end attached to the bottom portion and the other end attached to both of the lower cover unit and the bottom portion, so that the end portions of the bottom portion in the width direction of the vehicle body are crushed at the time of expansion of the airbag.

In one or more embodiments of the airbag unit, the lower cover unit may be attached to a bulkhead of the vehicle.

In one or more embodiments of the airbag unit, the airbag may include a marking provided on a surface thereof and indicating steps to be followed before the expansion and after the unfolding.

In one or more embodiments of the airbag unit, an unfolded size of the projecting portion of the airbag may be longer in the width direction of the vehicle, than a size of the front pillar in the width direction of the vehicle.

In one or more embodiments of the airbag unit, the airbag may include a vulnerable stitch portion provided in an upper portion of the bottom portion, to be torn apart by a predetermined internal pressure.

In one or more embodiments of the airbag unit, the airbag may include a patched portion at a position interfering with other parts.

In one or more embodiments of the airbag unit, the airbag may include a tucked portion folded back and sewn together, the tucked portion being located on the side of the vehicle.

In another aspect, the present invention provides a folding method of an airbag formed in a U-shape including a bottom portion and a pair of projecting portions projecting from the bottom portion. The method includes folding the projecting portion of the airbag onto the side of the bottom portion, folding the projecting portion of the airbag folded onto the side of the bottom portion and both end portions of the bottom portion in a longitudinal direction thereof, and folding the bottom portion of the airbag the longitudinal end portions of which have been folded, from the opposite side of the projecting portion.

A folding method of an airbag according to one or more embodiments of the present invention, the airbag being formed in a U-shape including a bottom portion and a pair of projecting portions projecting from the bottom portion, includes folding the projecting portion of the airbag onto the side of the bottom portion, folding, from the opposite side of the projecting portion, the bottom portion of the airbag onto which the projecting portion has been folded, and folding the projecting portion of the airbag folded onto the bottom portion, the bottom portion having been folded from the opposite side of the projecting portion, and end portions of the bottom portion in a longitudinal direction thereof.

In the foregoing airbag folding method, the bottom portion may include a first unfolding portion located on the side of one of the projecting portions and a second unfolding portion located on the side of the other projecting portion. The folding of the projecting portion of the airbag onto the side of the bottom portion may include folding the projecting portion and the first unfolding portion of the bottom portion onto the side of the second unfolding portion, and the folding of the bottom portion of the airbag from the opposite side of the projecting portion may include folding the second unfolding portion of the bottom portion.

In the foregoing airbag folding method, the number of folding times of the projecting portion of the airbag onto the side of the bottom portion may be larger than the number of folding times of the projecting portion and the longitudinal end portions of the bottom portion.

A folding method of an airbag according to one or more embodiments of the present invention, the airbag being formed in a U-shape including a bottom portion and a pair of projecting portions projecting from the bottom portion, includes folding the projecting portion of the airbag onto the side of the bottom portion, folding in a Z-shape the projecting portion of the airbag folded onto the side of the bottom portion and both end portions of the bottom portion in a longitudinal direction thereof, and folding the airbag the longitudinal end portions of which have been folded onto the side of the bottom portion, in a direction opposite to the folding of the projecting portion onto the side of the bottom portion.

The foregoing airbag folding method may further include folding in a Z-shape the projecting portion of the airbag and the longitudinal end portions of the bottom portion, after the folding of the airbag the longitudinal end portions of which have been folded onto the side of the bottom portion.

In the foregoing airbag folding method, the folding of the projecting portion of the airbag onto the side of the bottom portion may include rolling the end portion of the projecting portion in one direction away from the vehicle body, as an initial action of the folding.

A folding method of an airbag according to one or more embodiments of the present invention, the airbag being formed in a U-shape including a bottom portion and a pair of projecting portions projecting from the bottom portion, includes folding the projecting portion of the airbag and both end portions of the bottom portion in a longitudinal direction thereof, folding the projecting portion of the airbag the longitudinal end portions of which have been folded onto the side of the bottom portion, and folding the projecting portion of the airbag folded onto the side of the bottom portion and the longitudinal end portions of the bottom portion.

Advantageous Effects of Invention

The airbag unit according to one or more embodiments is configured to cover at least a part of the windshield and the front pillar outside of the vehicle, and includes an airbag formed in a U-shape including the bottom portion and the pair of projecting portions projecting from the bottom portion, the gas generator that ejects gas into the airbag, the lower cover unit that accommodates therein the unexpanded airbag and the gas generator, and the upper cover unit that covers the lower cover unit containing therein the airbag, and the airbag is expanded by the gas ejected from the gas generator through between the hood of the vehicle and the windshield. The mentioned configuration allows efficient utilization of the space and enables the airbag to rapidly expand to the desired position. Further, the airbag unit can be built in a reduced size and weight, and be installed in an existing vehicle body.

In the airbag unit configured as above, the lower cover unit and the upper cover unit each include the recess for circumventing the functional parts of the vehicle. Therefore, the airbag unit can be placed close to the windshield, so that the airbag can rapidly expand to the desired position.

In the airbag unit configured as above, the upper cover unit is connected to the cowl top of the vehicle. Accordingly, the upper cover unit can also serve as the cowl top, and the airbag unit can be placed at the position of the cowl top. Such a configuration allows efficient utilization of the space.

In the airbag unit configured as above, since the upper cover unit includes the groove formed on the upper face thereof, water that has fallen on the upper cover unit can be drained along the groove.

In the airbag unit configured as above, the upper cover unit includes the tear line that facilitates the upper cover unit to be torn and the hinge that facilitates the upper cover unit to be bent, the lower cover unit and the upper cover unit each include the offset portion recessed backward and located on the side of the forward portion of the vehicle, and the tear line is offset along the offset portion. The mentioned configuration allows the upper cover unit to reach the hood when the tear line is torn apart and the upper cover unit is bent along the hinge, thereby preventing the airbag from intruding into a space under the hood.

In the airbag unit configured as above, the upper cover unit includes the sloped recess formed in a region of the upper face of the upper cover unit on the side of the forward portion of the vehicle. The mentioned configuration prevents interference between the upper cover unit and the peripheral parts such as a washer nozzle for ejecting the window washer fluid.

In the airbag unit configured as above, the lower cover unit includes the sloped cover bottom and the cover sidewall projecting from the cover bottom, and the water escape hole is provided in the cover bottom or at the lower end portion of the cover sidewall. Therefore, water that has intruded inside the lower cover unit can be discharged.

In the airbag unit configured as above, the bottom portion covers at least a part of the hood, and the thickness of the projecting portion of the airbag in a vertical direction from the windshield is thicker than the thickness of the bottom portion of the airbag in a vertical direction from the hood. The mentioned configuration allows reduction of the capacity of a portion of the airbag to be unfolded over the hood and the upper cover unit, which are capable of serving as a buffer material, thereby enabling the use amount of the gas to be reduced.

In the airbag unit configured as above, the thickness $h1$ of the airbag in the bottom portion in the vertical direction from the hood satisfies 80 mm$\leq h1 \leq$230 mm, or 80 mm$\leq h1 \leq$180 mm, and the thickness $h2$ of the airbag in the projecting portion in the vertical direction from the windshield satisfies 180 mm$\leq h2 \leq$280 mm, or 200 mm$\leq h2 \leq$250 mm. Thus, the airbag can be made even smaller.

In the airbag unit configured as above, since the airbag includes the first inner tether constituting a partition between the bottom portion and the projecting portion, the airbag can be made to rapidly expand from the side closer to the object, so that the object can be properly protected.

In the airbag unit configured as above, the first inner tether is inclined so as to be closer to the distal end of the projecting portion in a direction away from the midpoint between the pair of projecting portions formed in the U-shape. The mentioned configuration reduces shaking of the projecting portion when the airbag is unfolded, thereby allowing the projecting portion to stably cover the front pillar.

In the airbag unit configured as above, the airbag further includes the second inner tether that divides the bottom portion into two sections, and the section of the bottom portion of the airbag on the side of the windshield divided by the second inner tether constitutes the first unfolding portion, the section of the bottom portion of the airbag on the side of the hood divided by the second inner tether constitutes the second unfolding portion, and the projecting portion of the airbag constitutes the third unfolding portion. Therefore, the airbag can be rapidly expanded from the side closer to the object, so that the object can be properly protected.

In the airbag unit configured as above, the second inner tether includes the gas passage, and the airbag includes the diffuser that leads the gas generated by the gas generator to the gas passage. The mentioned configuration allows the gas to flow along the diffuser thus to smoothly pass through the gas passage. As a result, the airbag can be properly expanded.

In the airbag unit configured as above, since the second inner tether is supported by the gas generator together with the airbag, the second inner tether serves as a patch that improves the strength, thereby increasing the attaching strength of the airbag.

In the airbag unit configured as above, the central portion of the second inner tether is made higher than the end portions thereof in the width direction of the vehicle. Therefore, the upper face of the airbag becomes generally horizontal over the entire width, when the airbag is unfolded.

In the airbag unit configured as above, since the gas generator is supported by the gas generator holder that also serves as the diffuser, the gas can be smoothly ejected into the airbag.

In one or more embodiments, the airbag unit further includes the harness connected to the gas generator, the harness being longer than the length of the lower cover unit in the longitudinal direction thereof. The mentioned configuration allows the harness to be properly routed.

In the airbag unit configured as above, since 80% or more of the harness is accommodated in the lower cover unit, disturbance by an unnecessary excess of the harness can be avoided.

In the airbag unit configured as above, the airbag includes the first outer tether connecting between a part of the bottom portion on the side of the windshield and a part of the projecting portion on the side of the windshield. The mentioned configuration reduces shaking of the projecting portion when the airbag is unfolded, thereby allowing the projecting portion to stably cover the front pillar.

In the airbag unit configured as above, the airbag includes the second outer tether having one end attached to the bottom portion and the other end attached to the lower cover unit or the bottom portion, so that the end portions of the bottom portion in the width direction of the vehicle body are crushed at the time of expansion of the airbag. The mentioned configuration reduces shaking of the airbag, thereby allowing the airbag to be stably unfolded. Further, the capacity of the airbag is reduced by crushing the end portions of the airbag, which leads to reduction in gas consumption.

In the airbag unit configured as above, the airbag includes the second outer tether having one end attached to the bottom portion and the other end attached to both of the lower cover unit and the bottom portion, so that the end portions of the bottom portion in the width direction of the vehicle body are crushed at the time of expansion of the airbag. The mentioned configuration allows a step in the manufacturing process to be skipped, thereby facilitating the assembly of the airbag unit.

In the airbag unit configured as above, since the lower cover unit is attached to the bulkhead of the vehicle, the airbag unit can be stably retained.

In the airbag unit configured as above, the airbag includes the marking provided on the surface thereof and indicating steps to be followed before the expansion and after the unfolding. Therefore, the operator can confirm the process to be followed before the expansion and after the unfolding, to thereby rapidly and properly perform the work before the expansion and after the unfolding of the airbag.

In the airbag unit configured as above, the unfolded size of the projecting portion of the airbag is longer in the width direction of the vehicle than the size of the front pillar in the width direction of the vehicle. Therefore, pedestrians or objects can be effectively protected.

In the airbag unit configured as above, the airbag includes the vulnerable stitch portion provided in the upper portion of the bottom portion, to be torn apart by a predetermined internal pressure. The mentioned configuration substantially reduces the inner capacity at the initial stage of the expansion thereby increasing the expanding speed of the airbag, and resultantly enables the airbag to be rapidly unfolded over the entire width of the hood of the vehicle. In addition, the expanding speed can be increased without increasing the output of the gas generator.

In the airbag unit configured as above, the airbag includes the patched portion at a position interfering with other parts. Therefore, the strength of the base cloth can be increased, and the airbag can be properly unfolded because the main body of the airbag is exempted from damage despite contacting the hood in the expansion process.

In the airbag unit configured as above, the airbag includes the tucked portion folded back and sewn together, the tucked portion being located on the side of the vehicle. The mentioned configuration allows the airbag to be bent at the tucked portion thus to be unfolded in the direction to contact the vehicle body. Therefore, the shaking of the airbag after the expansion can be rapidly suppressed, so that the airbag can be stably unfolded.

The foregoing folding method of the airbag, formed in the U-shape including the bottom portion and the pair of projecting portions projecting from the bottom portion, includes folding the projecting portion of the airbag onto the side of the bottom portion, folding the projecting portion of the airbag folded onto the side of the bottom portion and both end portions of the bottom portion in a longitudinal direction thereof, and folding the bottom portion of the airbag the longitudinal end portions of which have been folded, from the opposite side of the projecting portion. The mentioned folding method allows the bottom portion to be first expanded in the event of collision with the pedestrian, so that the airbag is rapidly unfolded from the portion corresponding to a region over the hood, which is closer to the pedestrian, thus enabling the pedestrian to be effectively protected.

The foregoing folding method of the airbag, formed in the U-shape including the bottom portion and the pair of projecting portions projecting from the bottom portion, includes folding the projecting portion of the airbag onto the side of the bottom portion, folding, from the opposite side of the projecting portion, the bottom portion of the airbag onto which the projecting portion has been folded, and folding the projecting portion of the airbag folded onto the bottom portion, the bottom portion having been folded from the opposite side of the projecting portion, and both end portions of the bottom portion in a longitudinal direction thereof. The mentioned folding method increases the expanding speed of the airbag in the width direction of the vehicle, thereby allowing the airbag to be rapidly unfolded over the entire width of the hood of the vehicle. As a result, the projecting portion supposed to cover the front pillar can also be rapidly unfolded.

In the foregoing airbag folding method, the bottom portion includes the first unfolding portion located on the side of one of the projecting portions and the second unfolding portion located on the side of the other projecting portion. The folding of the projecting portion of the airbag onto the side of the bottom portion includes folding the projecting portion and the first unfolding portion of the bottom portion onto the side of the second unfolding portion, and the folding of the bottom portion of the airbag from the opposite side of the projecting portion includes folding the second unfolding portion of the bottom portion. The mentioned folding method allows the second unfolding portion to be first expanded in the event of collision with the pedestrian, so that the airbag is rapidly expanded from the portion corresponding to a region over the hood, which is closer to the pedestrian, thus enabling the pedestrian to be effectively protected. Further, it is known that the airbag imposes a strongest impact on the peripheral parts in the initial stage of the expansion when the first lot of the gas is ejected from the gas generator. However, in the airbag configured as above the first unfolding portion to be unfolded over the wiper starts to expand after the second unfolding portion is expanded, and therefore the impact of the first unfolding portion against the wiper can be mitigated.

In the foregoing airbag folding method, the number of folding times of the projecting portion of the airbag onto the side of the bottom portion is larger than the number of folding times of the projecting portion and the longitudinal end portions of the bottom portion. The mentioned folding method increases the expanding speed of the airbag in the width direction of the vehicle, thereby allowing the airbag to be rapidly unfolded over the entire width of the hood of the vehicle.

The foregoing folding method of the airbag, formed in the U-shape including the bottom portion and the pair of projecting portions projecting from the bottom portion, includes folding the projecting portion of the airbag onto the side of the bottom portion, folding in a Z-shape the projecting portion of the airbag folded onto the side of the bottom portion and both end portions of the bottom portion in a longitudinal direction thereof, and folding the airbag the longitudinal end portions of which have been folded onto the side of the bottom portion, in a direction opposite to the folding of the projecting portion onto the side of the bottom portion. The mentioned folding method increases the expanding speed of the airbag in the width direction of the vehicle, thereby allowing the airbag to be rapidly unfolded over the entire width of the hood of the vehicle.

The foregoing airbag folding method further includes folding in a Z-shape the projecting portion of the airbag and the longitudinal end portions of the bottom portion, after the folding of the airbag the longitudinal end portions of which have been folded onto the side of the bottom portion. Therefore, the airbag is alternately folded in the up-down direction and in the longitudinal direction, which improves the balance of the expanding performance.

In the foregoing airbag folding method, the folding of the projecting portion of the airbag onto the side of the bottom portion includes rolling the end portion of the projecting portion in one direction away from the vehicle body, as an initial action of the folding. The mentioned folding method prevents interference between the end portion of the projecting portion and the vehicle body at the time of expansion, thus enabling the airbag to be rapidly unfolded.

The foregoing folding method of the airbag, formed in the U-shape including the bottom portion and the pair of projecting portions projecting from the bottom portion, includes folding the projecting portion of the airbag and both end portions of the bottom portion in a longitudinal direction thereof, folding the projecting portion of the airbag the longitudinal end portions of which have been folded onto the side of the bottom portion, and folding the projecting portion of the airbag folded onto the side of the bottom portion and the longitudinal end portions of the bottom portion. The mentioned folding method increases the expanding speed of the airbag in the width direction of the vehicle, thereby allowing the airbag to be rapidly unfolded over the entire width of the hood of the vehicle.

BRIEF DESCRIPTION OF THE DRAWINGS

FIGS. 3(a) and 3(b) are plan views showing a collapse prevention tether 16 of the airbag 10 according to the first embodiment.

FIG. 8(a) is a plan view and FIG. 8(b) is a side view, each showing the gas generator 22 installed in the airbag 10 according to the first embodiment.

DETAILED DESCRIPTION OF EMBODIMENTS

Hereafter, embodiments of the present invention will be described with reference to the drawings.

Figure 1:
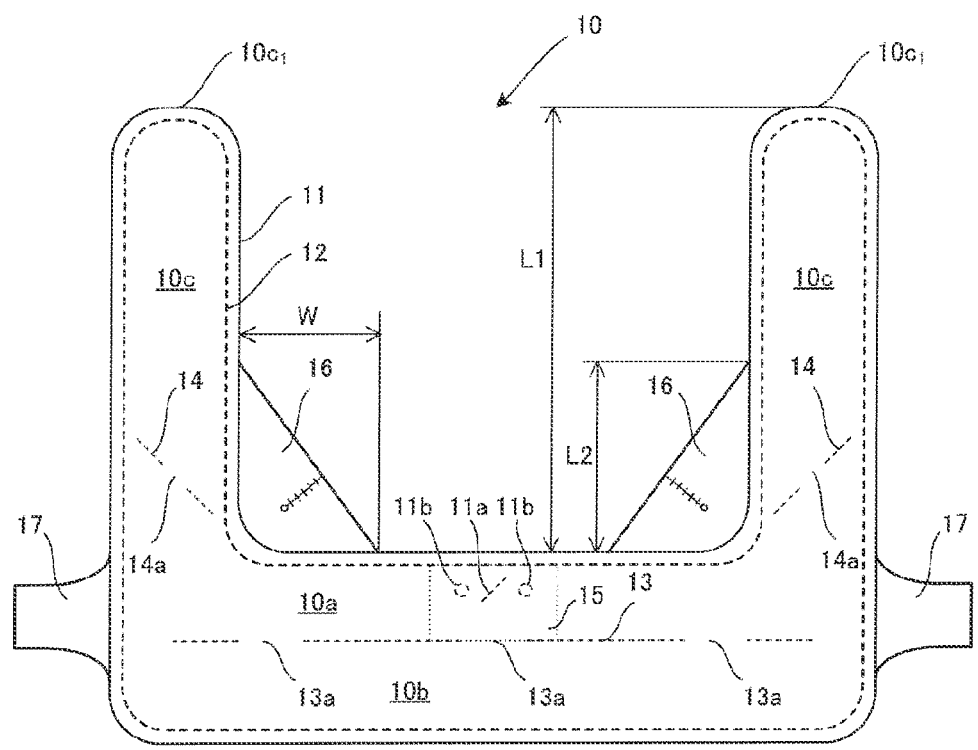
FIG. 1 is a plan view showing an airbag 10 according to a first embodiment.
Figure 2:
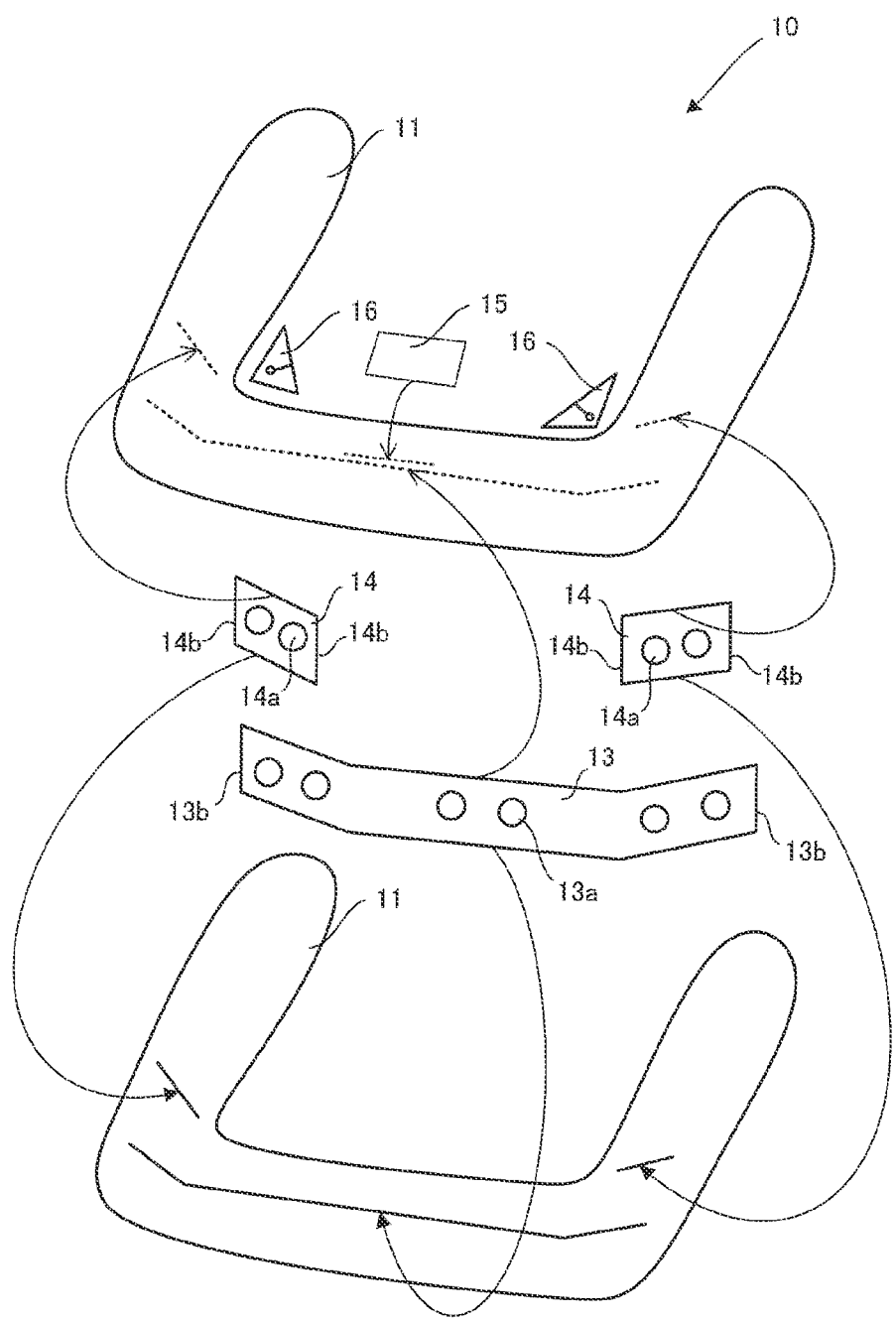
FIG. 2 is an exploded perspective view of the airbag 10 according to the first embodiment.

FIG. 1 is a plan view showing an airbag 10 according to a first embodiment. FIG. 2 is an exploded perspective view of the airbag 10 according to the first embodiment.

The airbag 10 according to the first embodiment includes a base cloth 11 composed of a pair of cloths formed in a U-shape, a sewing thread 12 that sews the outer periphery of the base cloth 11, a bottom inner tether 13 and a pair of projection inner tethers 14 each partitioning the inside of the base cloth 11, a diffuser cloth 15 that rectifies the gas flow, a pair of collapse prevention tethers 16, and a pair of crushing tethers 17. The projection inner tether 14 corresponds to the first inner tether, the bottom inner tether 13 corresponds to the second inner tether, the collapse prevention tether 16 corresponds to the first outer tether, and the crushing tether 17 corresponds to the second outer tether in the present invention.

The airbag 10 is divided into a first unfolding portion 10a, a second unfolding portion 10b, and third unfolding portions 10c, by the base cloth 11, the bottom inner tether 13, and the projection inner tethers 14. The first unfolding portion 10a and the second unfolding portion 10b constitute the bottom portion of the U-shaped airbag 10, and the third unfolding portions 10c each constitute the projecting portion of the U-shaped airbag 10.

The first unfolding portion 10a corresponds to a region on the side of the projecting portion, of the bottom portion connecting the pair of projecting portions forming the U-shape of the base cloth 11, and is surrounded by the base cloth 11, the bottom inner tether 13, and the projection inner tether 14. The second unfolding portion 10b corresponds to a region of the bottom portion of the U-shaped base cloth 11 on the opposite side of the projecting portion, and is surrounded by the base cloth 11 and the bottom inner tether 13. Each of the third unfolding portions 10c corresponds to a region of the projecting portion forming the U-shape of the base cloth 11, and is surrounded by the base cloth 11 and the projection inner tether 14.

The bottom inner tether 13 is sewn to the upper and the lower base cloth 11 in the bottom portion, so as to connect the upper and the lower base cloth 11 and to partition the bottom portion of the U-shape into the projecting portions and the opposite region, i.e., serves as the partition between the first unfolding portion 10a and the second unfolding portion 10b. The bottom inner tether 13 includes gas passages 13a at predetermined positions. A gap may be provided between end portions 13b of the bottom inner tether 13 in a longitudinal direction and the base cloth 11. The position of the base cloth 11 where the bottom inner tether 13 is to be formed may be sewn in advance with a vulnerable thread, so that the thread is cut off by gas pressure applied when the airbag 10 is expanded.

The bottom inner tether 13 may be divided. Referring to FIG. 2, the bottom inner tether 13 may be divided, for example, in three sections in the longitudinal direction, such that each section includes a pair of gas passages 13a. Since each of the divided sections of the bottom inner tether 13 is smaller, the sewing job can be easily performed.

The projection inner tether 14 is sewn to the upper and the lower base cloth 11 in the projecting portion, so as to connect the upper and the lower base cloth 11 and to serve as the partition between the first unfolding portion 10a and the pair of third unfolding portions 10c. The projection inner tether 14 includes gas passages 14a at predetermined positions. A gap may be provided between end portions 14b of the projection inner tether 14 in the longitudinal direction and the base cloth 11. The position of the base cloth 11 where the projection inner tether 14 is to be formed may be sewn in advance with a vulnerable thread, so that the thread is cut off by gas pressure applied when the airbag 10 is expanded.

The inner space of the airbag 10 is thus partitioned by the bottom inner tether 13 and the projection inner tether 14, and therefore the airbag 10 can be made to rapidly expand from the side closer to the object, so that the object can be properly protected.

Regarding the bottom inner tether 13 and the projection inner tether 14, the expanding speed of the first unfolding portion 10a, the second unfolding portion 10b, and the third unfolding portion 10c can be accurately controlled by adjusting the size of the gas passages 13a, 14a in the designing stage.

Further, it is preferable to form each of the pair of projection inner tethers 14 with an inclination such that the projection inner tether 14 comes closer to the bottom inner tether 13 in a direction toward the midpoint between the pair of projecting portions forming the U-shape, and goes farther away from the bottom inner tether 13 in a direction away from the mentioned midpoint. In other words, it is preferable to form the pair of projection inner tethers 14 so as to come closer to the distal end $10C_1$ in the direction away from the midpoint between the pair of projecting portions forming the U-shape. Forming thus the projection inner tether 14 with an inclination prevents the third unfolding portion 10c from collapsing to the outer side at the time of expansion.

The base cloth 11 also includes an insertion hole 11a through which a gas generator (described later) is to be inserted, and holder holes 11b through which holders that retain the gas generator are to be respectively inserted. Although the insertion hole 11a and the holder holes 11b are located in the first unfolding portion 10a in the first embodiment, these holes may be located at different positions depending on the location of the gas generator.

Although the airbag 10 according to the first embodiment is divided into the first unfolding portion 10a, the second unfolding portion 10b, and the third unfolding portion 10c, it suffices that the airbag is divided into at least two unfolding portions. It is preferable that the airbag 10 according to the first embodiment is unfolded such that, for example, the first unfolding portion 10a covers the windshield and the cowl top of the vehicle, the second unfolding portion 10b covers the hood of the vehicle, and the third unfolding portions 10c cover the respective front pillars of the vehicle.

In the airbag 10 according to the first embodiment, the diffuser cloth 15 is sewn to the base cloth 11 at a position corresponding to the insertion hole 11a and the holder holes 11b. An end portion of the diffuser cloth 15 may be sewn together with the upper portion of the bottom inner tether 13 and the other end portion of the diffuser cloth 15 may be attached together with the gas generator or sewn to the bottom portion with the sewing thread 12 at a position in the vicinity of the insertion hole 11a and the holder holes 11b.

Further it is preferable to apply a silicone seal to at least a part of the airbag 10. In particular, it is preferable to apply the silicone seal to the stitched portion. More preferably, the silicone seal may be applied to the entirety of the airbag. Applying the silicone seal allows the expanding pressure to be effectively maintained.

FIGS. 3(a) and 3(b) illustrate the collapse prevention tether 16 of the airbag 10 according to the first embodiment.

It is preferable that the airbag 10 includes the pair of collapse prevention tethers 16 each connecting between the first unfolding portion 10a and the third unfolding portion 10c. Each of the collapse prevention tethers 16 is provided, as shown in FIG. 1, between an inner central portion of the third unfolding portion 10c in the projecting portion and the first unfolding portion 10a in the bottom portion, and serves to provide a tension to the airbag 10.

For example, the collapse prevention tether 16 may be formed of a triangular cloth having a slit 16a formed from the base and sewn to the first unfolding portion 10a and the third unfolding portion 10c via the respective sides as shown in FIG. 3(a), and a slit edge $16a_1$ and the opposite slit edge $16a_2$ may be made to pass over each other so as to form an overlapping portion 16b as shown in FIG. 3(b), and the overlapping portion 16b may be sewn together.

Regarding the attaching position of the collapse prevention tether 16 to the airbag 10, it is preferable that a length W between the inner edge of the projecting portion and a corner of the collapse prevention tether 16 connected to the first unfolding portion 10a is equal to or shorter than a half of a length L1 between the bottom portion of the U-shaped base cloth 11 and the distal end of the projecting portion, as shown in FIG. 1. In addition, it is preferable that a length L2 between the bottom portion of the base cloth 11 and the corner of the collapse prevention tether 16 connected to the third unfolding portion 10c is equal to or shorter than a half of the length L1.

Providing thus the pair of collapse prevention tethers 16 allows stabilization of the expanding behavior of the third unfolding portion 10c. Stabilizing the behavior of the third unfolding portion 10c allows the visual field for the occupants to be secured.

It is preferable that the airbag 10 includes the pair of crushing tethers 17 at the respective end portions of the first unfolding portion 10a or the second unfolding portion 10b in the longitudinal direction. As shown in FIG. 1, the crushing tethers 17 each have an end portion connected to the longitudinal end portion of the bottom portion of the airbag 10 and the other end portion connected to another position of the bottom portion of the airbag 10 or a member on the side of the vehicle body, and serve to crush the longitudinal end portions of the bottom portion of the airbag 10 at the time of expansion.

The collapse prevention tether 16 may be formed of a string or a tape.

Figure 4:
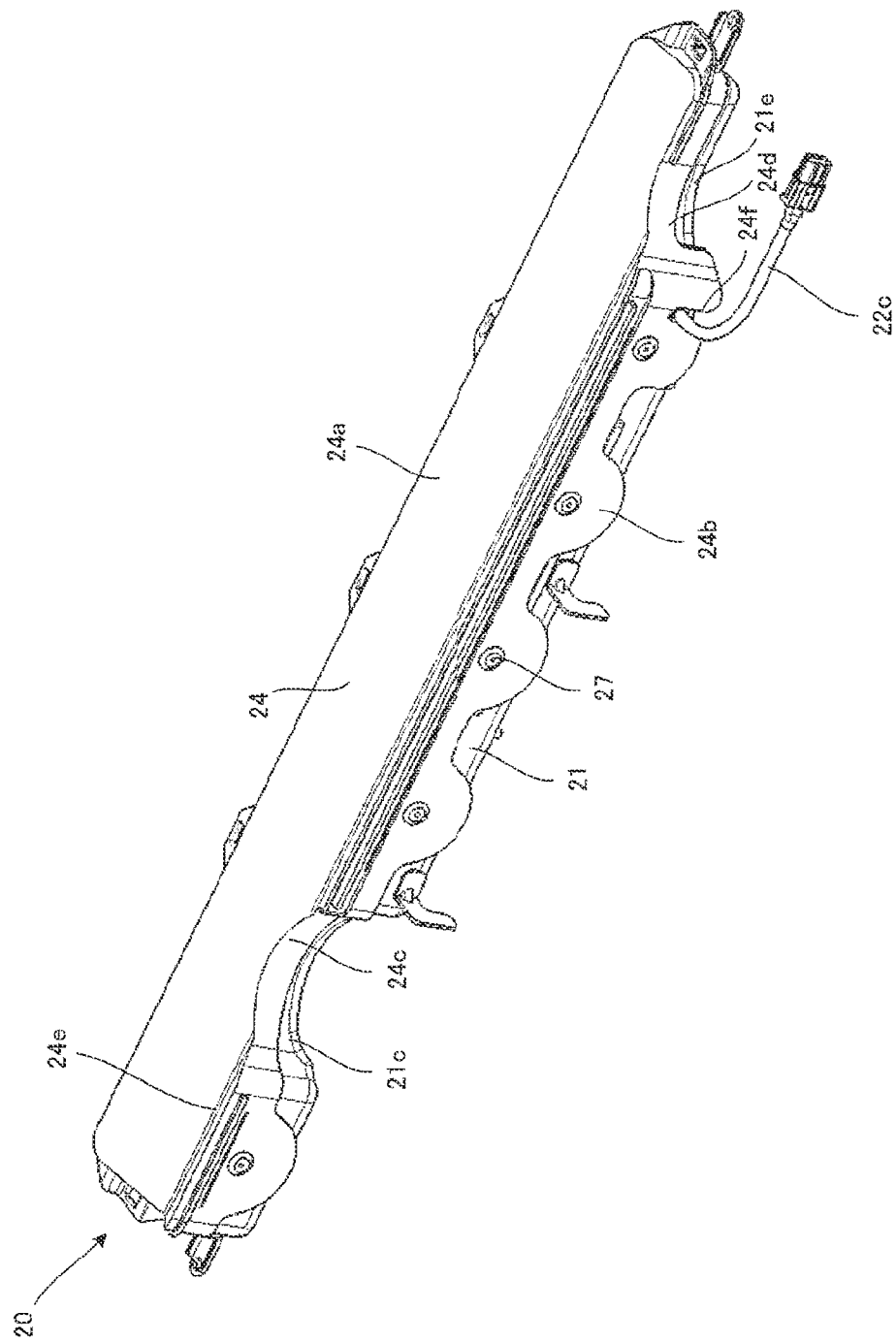
FIG. 4 is a perspective view showing an airbag unit 20 according to the first embodiment.
Figure 5:
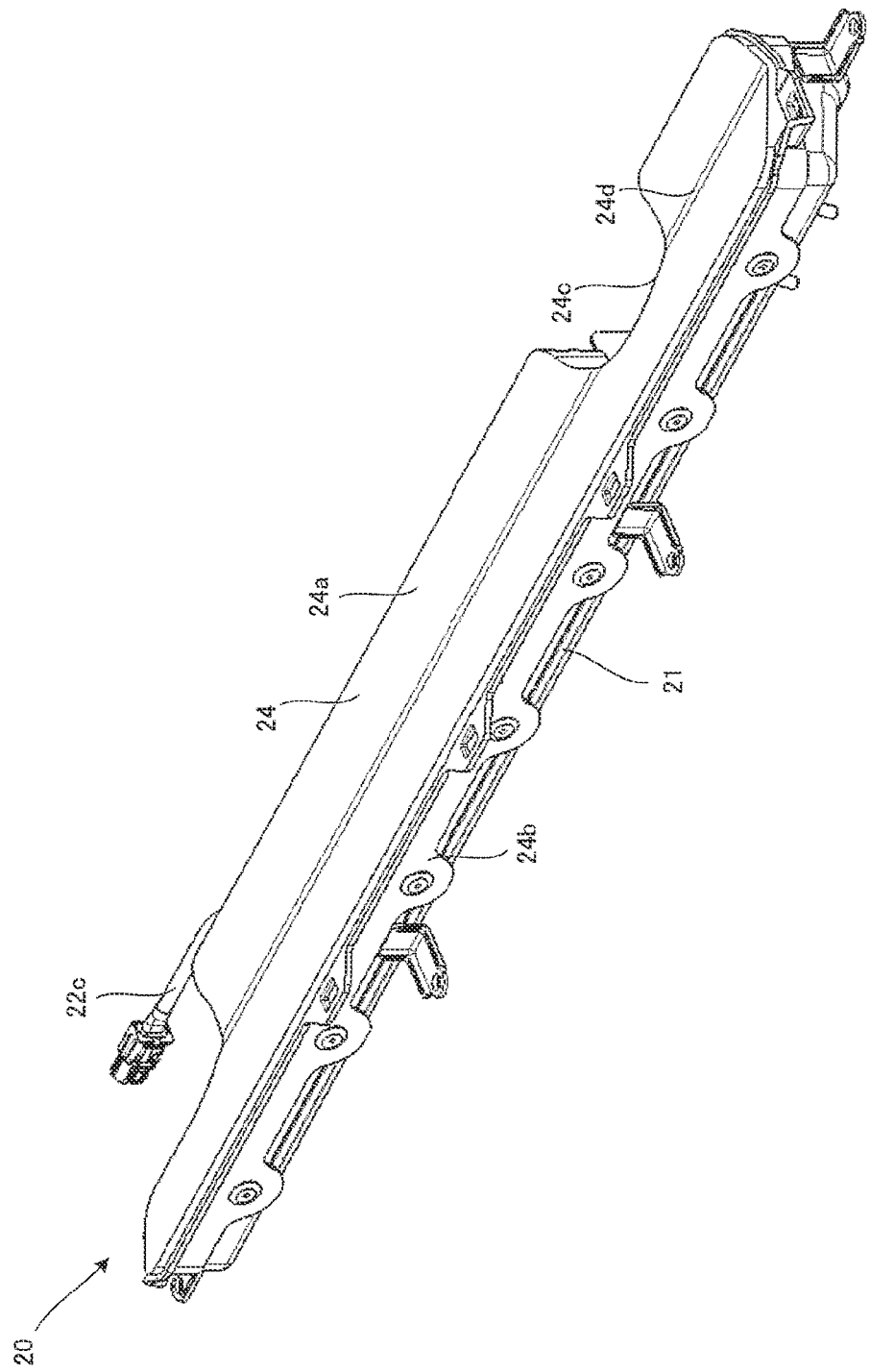
FIG. 5 is a perspective view from the opposite side of FIG. 4, showing the airbag unit 20 according to the first embodiment.
Figure 6:
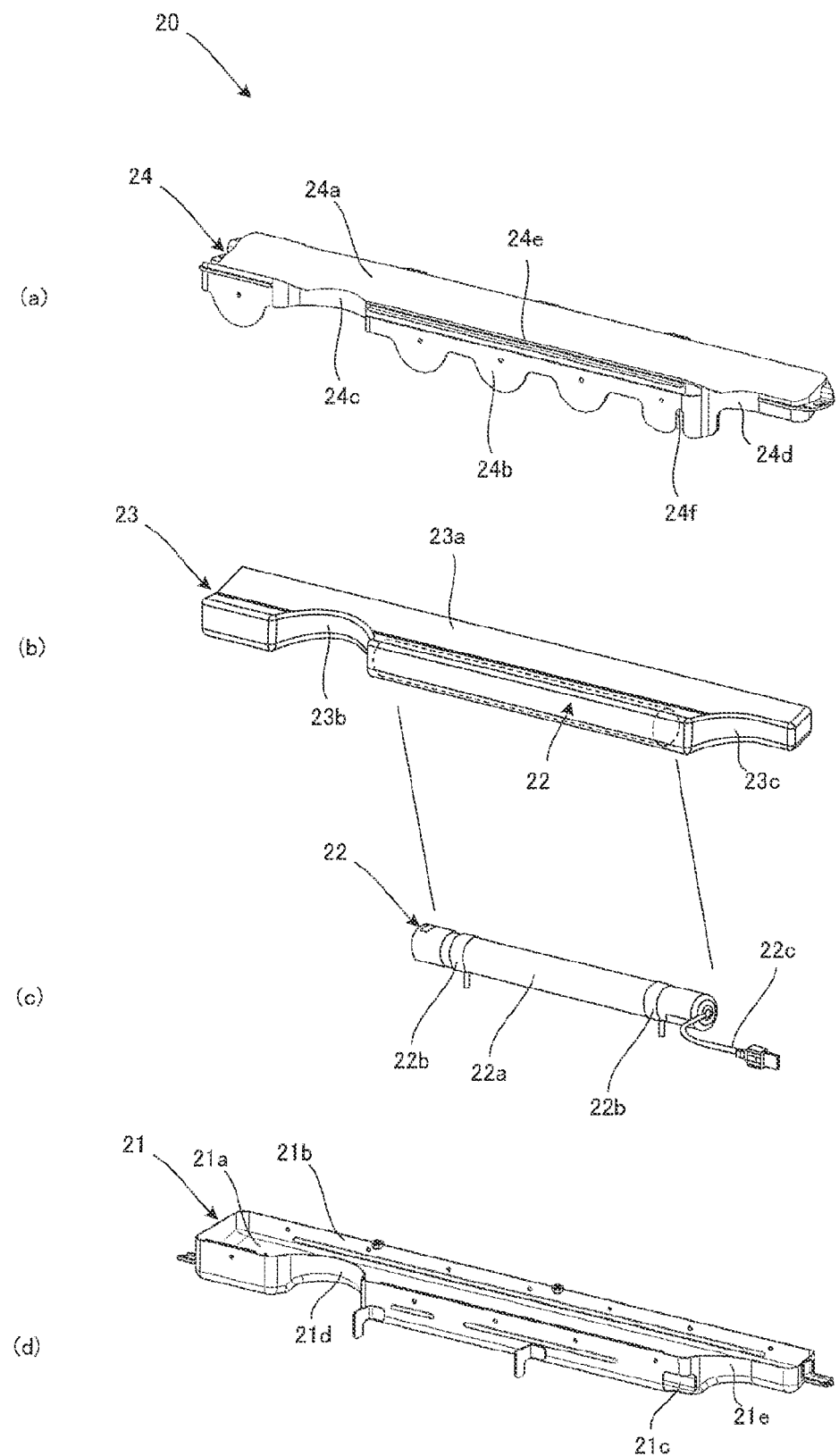
FIGS. 6(a) to 6(d) are exploded perspective views of the airbag unit 20 according to the first embodiment.
Figure 7:
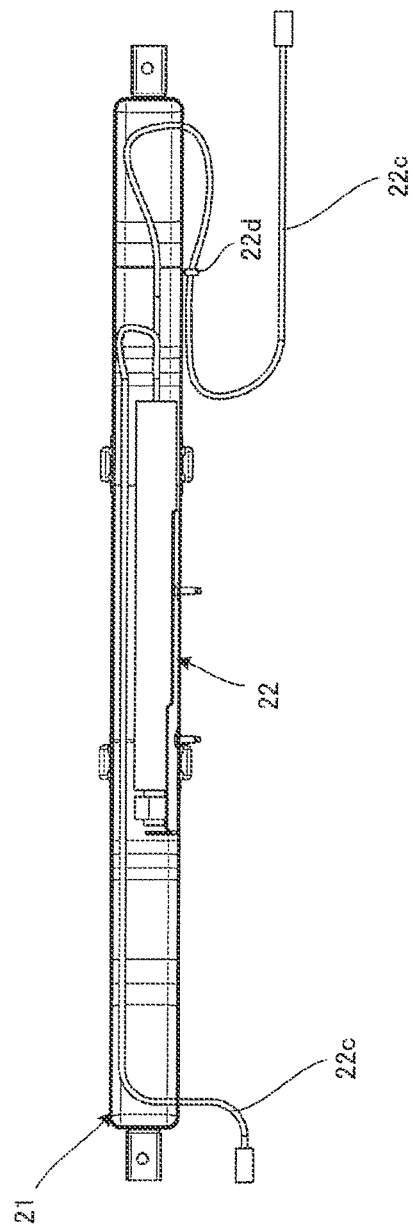
FIG. 7 shows how a gas generator 22 is stored.

FIG. 4 is a perspective view showing an airbag unit 20 according to the first embodiment. FIG. 5 is a perspective view from the opposite side of FIG. 4, showing the airbag unit 20. FIGS. 6(a) to 6(d) are exploded perspective views of the airbag unit 20. FIG. 7 illustrates how the gas generator 22 is stored.

The airbag unit 20 according to the first embodiment includes a lower cover unit 21, the gas generator 22, a bag case 23, and an upper cover unit 24.

The lower cover unit 21 includes a cover bottom 21a, and a cover sidewall 21b projecting from the cover bottom 21a. The lower cover unit 21 accommodates therein the gas generator 22 and a bag case 23 in which the airbag 10 shown in FIG. 1 is stored in a folded state. The cover bottom 21a and the cover sidewall 21b of the lower cover unit 21 may be integrally formed.

The cover sidewall 21b includes a water escape hole 21c formed at a lower end portion of a predetermined position, through which a harness 22c of the gas generator 22 is routed and water that has intruded into the lower cover unit 21 is discharged. It is preferable that the cover bottom 21a is inclined toward the water escape hole 21c, because the water that has intruded can be easily discharged. Here, the water escape hole 21c may be formed in the cover bottom 21a.

The cover sidewall 21b also includes a first recess 21d and a second recess 21e formed at predetermined positions, so as to avoid interference with obstacles composed of functional parts of the vehicle such as a wiper 7, a washer nozzle N, and a windshield 6, when the airbag unit 20 is installed in the vehicle.

The gas generator 22 includes a gas generator main body 22a, gas generator holders 22b, and the harness 22c. Preferably, the gas generator 22 may be water-proof.

The gas generator main body 22a is configured to eject gas according to a signal from a non-illustrated detector or control unit, provided when an impact of collision of the vehicle is detected. The gas generator holders 22b serve to fix the gas generator main body 22a to a frame of the vehicle.

The harness 22c is connected to the non-illustrated detector or control unit, to receive signals from the detector or control unit. The harness 22c is longer than the longitudinal size of the lower cover unit 21 as shown in FIG. 7, and it is preferable that 80% or more of the length of the harness 22c is accommodated inside the lower cover unit 21. Preferably, the harness 22c may be fixed to the outer face of the cover bottom 21a or the cover sidewall 21b of the lower cover unit 21, with a fastener 22d. In the case of forming a hole for passing the harness 22c therethrough apart from the water escape hole 21c because of the routing arrangement of the harness 22c, a grommet made of rubber or the like may be fitted to the hole so that the harness 22c is passed through the grommet thus to improve water-tightness.

The harness 22c can thus be properly routed despite being longer than the longitudinal size of the lower cover unit 21. In addition, since 80% or more of the length of the harness 22c is accommodated inside the lower cover unit 21, disturbance by an unnecessary excess of the harness can be avoided.

A structure for installing the gas generator 22 inside the airbag 10 will be described hereunder.

FIGS. 8(a) and 8(b) illustrate how the gas generator 22 is installed in the airbag 10 according to the first embodiment. FIG. 8(a) illustrates the gas generator 22 installed in the airbag 10 viewed from above, and FIG. 8(b) illustrates the gas generator 22 installed in the airbag 10 viewed from a lateral position.

In this example, the gas generator 22 is wrapped in a spacer cloth 25 and inserted through the insertion hole 11a formed in the base cloth 11 of the airbag 10. Then the holders 22b for the gas generator 22 are inserted outwardly of the base cloth 11 through the respective holder holes 11b. The harness 22c is also inserted outwardly of the base cloth 11 through a non-illustrated hole. These holes are tightly sealed so as to restrict leakage of the gas. Here, a plurality of spacer cloths 25 may be stacked, and another slit-shaped hole may be formed in a different angle so as to intersect the slit-shaped insertion hole 11a. Like the case of the insertion hole 11a for passing the gas generator 22 therethrough, an additional slit-shaped hole for the harness 22c may also be formed so as to intersect the existing one.

As shown in FIG. 8(b), the spacer cloth 25 is disposed so as to cover the insertion hole 11a formed in the base cloth 11 with a pressure from the gas generator 22 superposed thereon, and therefore leakage of the gas through the insertion hole 11a can be suppressed.

Figure 9:
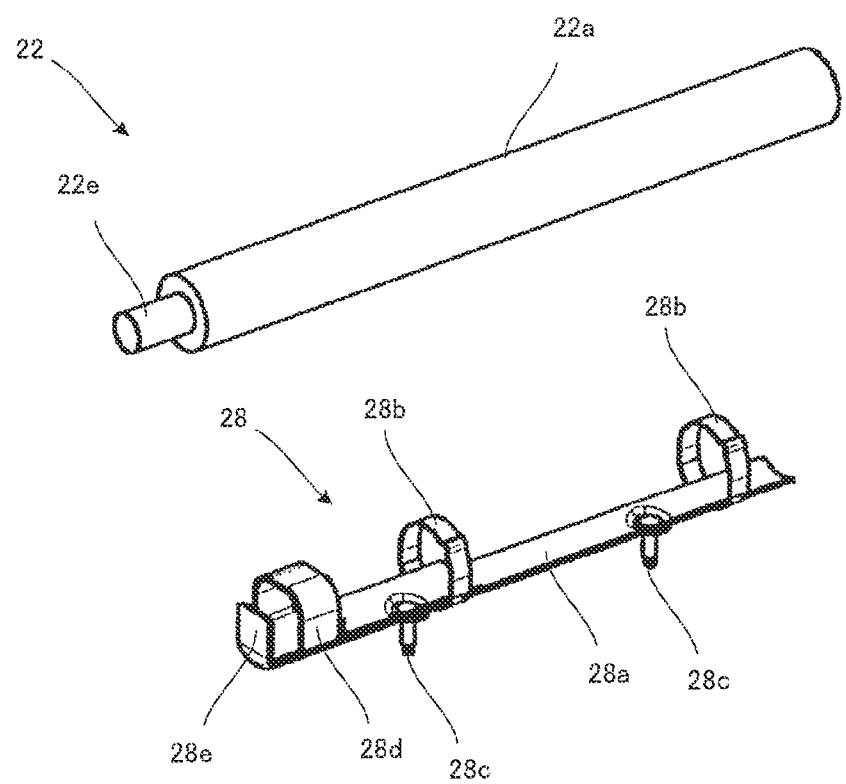
FIG. 9 is a perspective view showing how the gas generator 22 according to the first embodiment is fixed.

FIG. 9 is a perspective view showing how the gas generator 22 according to the first embodiment is fixed.

In FIG. 9, a gas generator holder 28 made of a metal is employed. The gas generator holder 28 includes a mounting base 28a, fastening portions 28b, support portions 28c, a first diffuser element 28d, and a second diffuser element 28e.

The mounting base 28a has a shape that fits the curvature of the gas generator main body 22a, and serves as the base on which the gas generator main body 22a is mounted. The fastening portions 28b are each wound around the gas generator main body 22a placed on the mounting base 28a so as to hold the gas generator main body 22a. The support portions 28c are passed outwardly of the base cloth 11, like the example shown in FIGS. 8(a) and 8(b). The first diffuser element 28d is attached to the mounting base 28a so as to cover a gas ejection port 22e of the gas generator 22 in a tubular shape, and serves to lead the gas in an ejection direction. The second diffuser element 28e is attached to the mounting base 28a so as to oppose the gas ejection port 22e of the gas generator 22, and serves to lead the ejected gas in a direction orthogonal to the ejection direction.

The gas generator holder 28 configured as above allows smooth ejection of the gas into the airbag.

The bag case 23 includes a case main body 23a as shown in FIGS. 6(a) to 6(d). The case main body 23a contains therein the gas generator 22 and the folded airbag 10. The case main body 23a includes a first recess 23b and a second recess 23c formed along the first recess 21d and the second recess 21e of the lower cover unit 21, so as to avoid interference with obstacles composed of the functional parts of the vehicle such as the wiper 7, the washer nozzle N, and the windshield 6, when the airbag unit 20 is installed in the vehicle.

The upper cover unit 24 includes, as shown in FIGS. 4 to 6(d), a cover lid 24a, and a flange 24b projecting from the end portion of the cover lid 24a.

The cover lid 24a covers the top portion of the lower cover unit 21 containing the gas generator 22 and the bag case 23. The cover lid 24a includes a first recess 24c and a second recess 24d formed along the first recess 21d and the second recess 21e of the lower cover unit 21, so as to avoid interference with obstacles composed of the functional parts of the vehicle such as the wiper 7, the washer nozzle N, and the windshield 6, when the airbag unit 20 is installed in the vehicle. The cover lid 24a also includes a groove 24e formed in the longitudinal direction. It is preferable that the cover lid 24a is inclined downward toward the groove 24e, because water that has fallen on the cover lid 24a can be made to flow downward.

The upper cover unit 24 is attached to the lower cover unit 21 with rivets 27. It is preferable that the rivets 27 are driven through the flange 24b of the upper cover unit 24 and the cover sidewall 21b of the lower cover unit 21.

Figure 10:
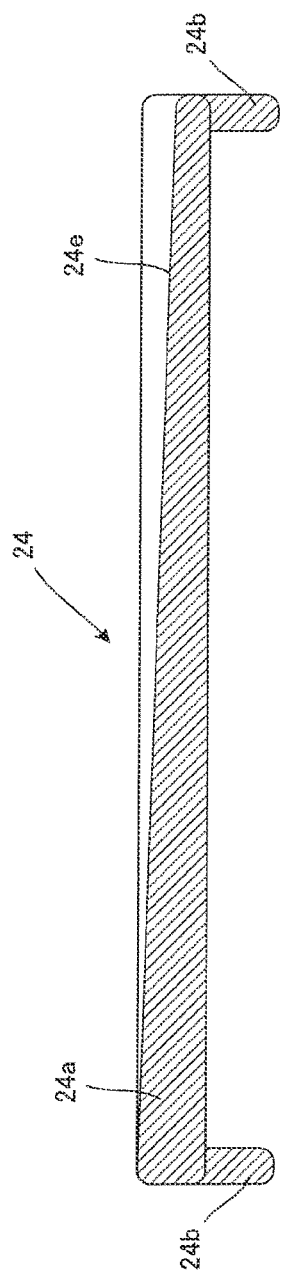
FIG. 10 is a schematic cross-sectional view of a portion of an upper cover unit 24 where a groove 24d is formed.

FIG. 10 is a schematic cross-sectional view of a portion of the upper cover unit 24 where the groove 24d is formed.

It is preferable that the groove 24e is inclined from one side to the other as shown in FIG. 10, because water that has fallen on the upper cover unit 24 can be made to flow downward. To be more detailed, when water falls on the upper cover unit 24 the water first flows into the groove 24e, and then flows from one side to the other along the slope, thus to be discharged from the airbag unit 20. The groove 24e may be formed in any different shape, provided that the groove 24e is capable of discharging water.

The flange 24b of the upper cover unit 24 includes, as shown in FIG. 4, a first recess 24c and a second recess 24d formed along the first recess 21d and the second recess 21e of the lower cover unit 21, so as to avoid interference with obstacles composed of the functional parts of the vehicle such as the wiper 7, the washer nozzle N, and the windshield 6, when the airbag unit 20 is installed in the vehicle. The flange 24b of the upper cover unit 24 also includes a cutaway portion 24f formed so as to oppose the water escape hole 21c of the lower cover unit 21 and to cover a part of the water escape hole 21c, so that the harness 22c is routed through a position in the cutaway portion 24f opposing the water escape hole 21c or deviated therefrom.

With the mentioned configuration of the flange 24b of the upper cover unit 24, the cutaway portion 24f and the water escape hole 21c constitute a labyrinth structure, so that water that has intruded inside the airbag unit 20 can be efficiently discharged through the water escape hole 21c, and intrusion of water from outside can be suppressed.

Figure 11:
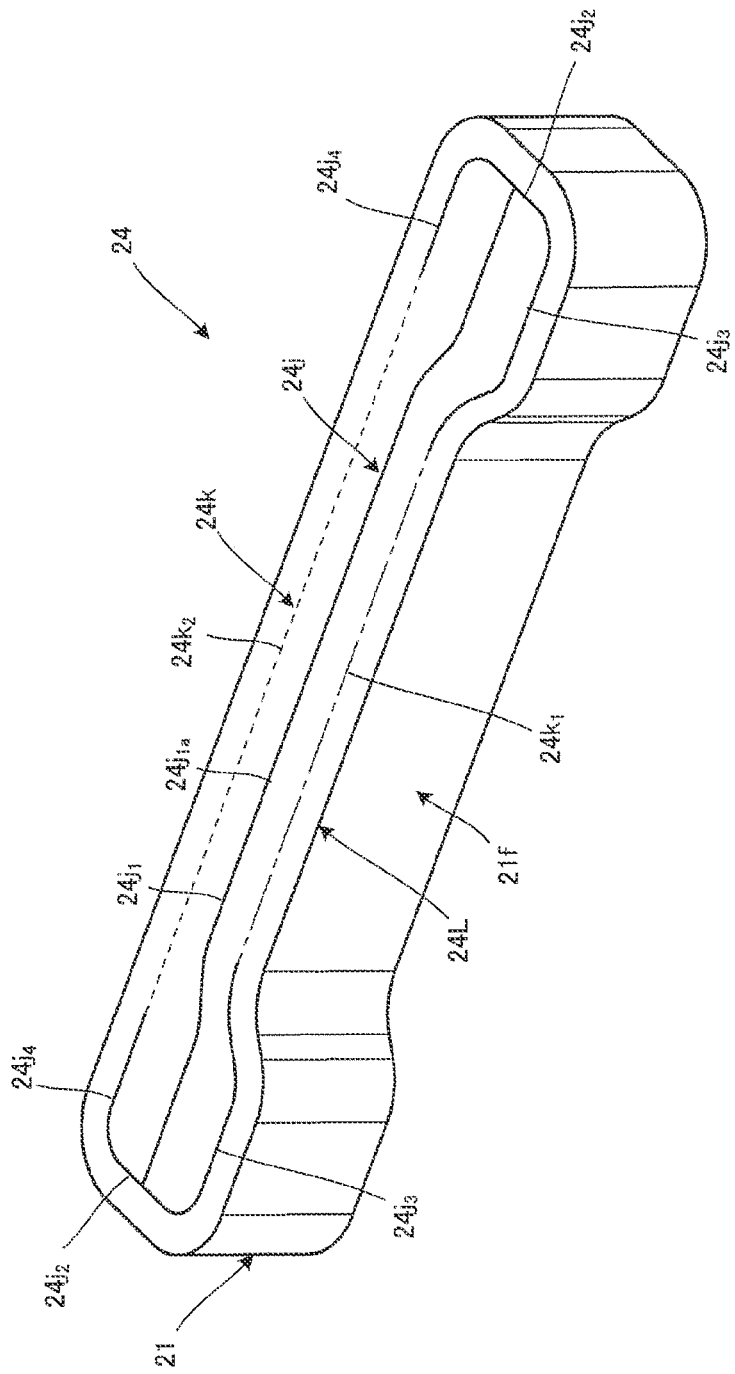
FIG. 11 is a schematic perspective view showing another example of the upper cover unit 24 and a lower cover unit 21.

FIG. 11 is a schematic perspective view showing another example of the upper cover unit 24 and the lower cover unit 21.

It is preferable that the upper cover unit 24 according to the first embodiment includes a tear line 24j that includes a hole and a thinned portion formed in advance at predetermined positions, to facilitate the upper cover unit 24 to be torn apart. In addition, it is preferable that the upper cover unit 24 includes a hinge 24k having a reduced thickness so as to allow the upper cover unit 24 to be bent at the time of expansion. In this case, the upper cover unit 24 is bent along the hinge 24k and opens along the tear line 24j, when the airbag 10 shown in FIG. 1 is expanded.

In the example shown in FIG. 11, the tear line 24j is formed generally in an H-shape, for opening to both sides. The tear line 24j includes a first tear line $24j_1$ extending in the longitudinal direction of the upper cover unit 24, a pair of second tear lines $24j_2$ extending from the respective end portions of the first tear line $24j_1$ in a direction intersecting the longitudinal direction, a pair of third tear lines $24j_3$ extending toward each other from the opposing end portions on one side of the respective second tear lines $24j_2$, and a pair of fourth tear lines $24j_4$ extending toward each other from the opposing end portions on the other side of the respective second tear lines $24j_2$.

Preferably, the first tear line $24j_1$ and the second tear lines $24j_2$ may be orthogonal to each other, and the second tear lines $24j_2$ may be orthogonal to the third tear lines $24j_3$ and the fourth tear line $24j_4$. In addition, it is preferable that the first tear line $24j_1$, the third tear lines $24j_3$, and the fourth tear lines $24j_4$ are parallel to each other. The joints between the second tear line $24j_2$ and the third tear line $24j_3$ or the fourth tear line $24j_4$ may be rounded. A distance between fourth tear line $24j_4$ and the intersection of the first tear line $24j_1$ and the second tear line $24j_2$ is shorter than a distance between the third tear line $24j_3$ and the same intersection.

The hinge $24k$ includes a first hinge $24k_1$ connecting between the respective end portions of the pair of third tear lines $24j_3$, and a second hinge $24k_2$ connecting between the respective end portions of the pair of fourth tear lines $24j_4$. The first tear line $24j_1$ is longer than the first hinge $24k_1$ and the second hinge $24k_2$.

The first tear line $24j_1$ is thinner in the central portion than in the end portions, so that the upper cover unit 24 can be smoothly opened. The hinge $24k$ is slightly thinner than the remaining portions, so as to be easily bent.

In the example shown in FIG. 11, the lower cover unit 21 and the upper cover unit 24 include offset portions $21f$, 24L, respectively, to circumvent the functional parts of the vehicle, such as the washer nozzle N. However, in the case where the first tear line $24j_1$ is a straight line, the upper cover unit 24 may fail to reach the hood when the first tear line $24j_1$ is torn apart and the upper cover unit 24 is bent along the first hinge $24k_1$, despite the lower cover unit 21 and the upper cover unit 24 respectively including the offset portions $21f$, 24L, and resultantly the airbag 10 may intrude into a space under the hood.

Accordingly, it is preferable to form an offset portion $24j_{1a}$ in the first tear line $24j_1$ along the shape of the offset portions $21f$, 24L of the lower cover unit 21 and the upper cover unit 24, and to extend the end portions of the pair of third tear lines $24j_3$ as far as the offset portion 24L and form the first hinge $24k_1$ in a linear shape. Forming the offset portion $24j_{1a}$ in the first tear line $24j_1$ allows the upper cover unit 24 to reach the hood when the first tear line $24j_1$ is torn apart and the upper cover unit 24 is bent along the first hinge $24k_1$, thereby preventing the airbag 10 from intruding into the space under the hood.

Figure 12:
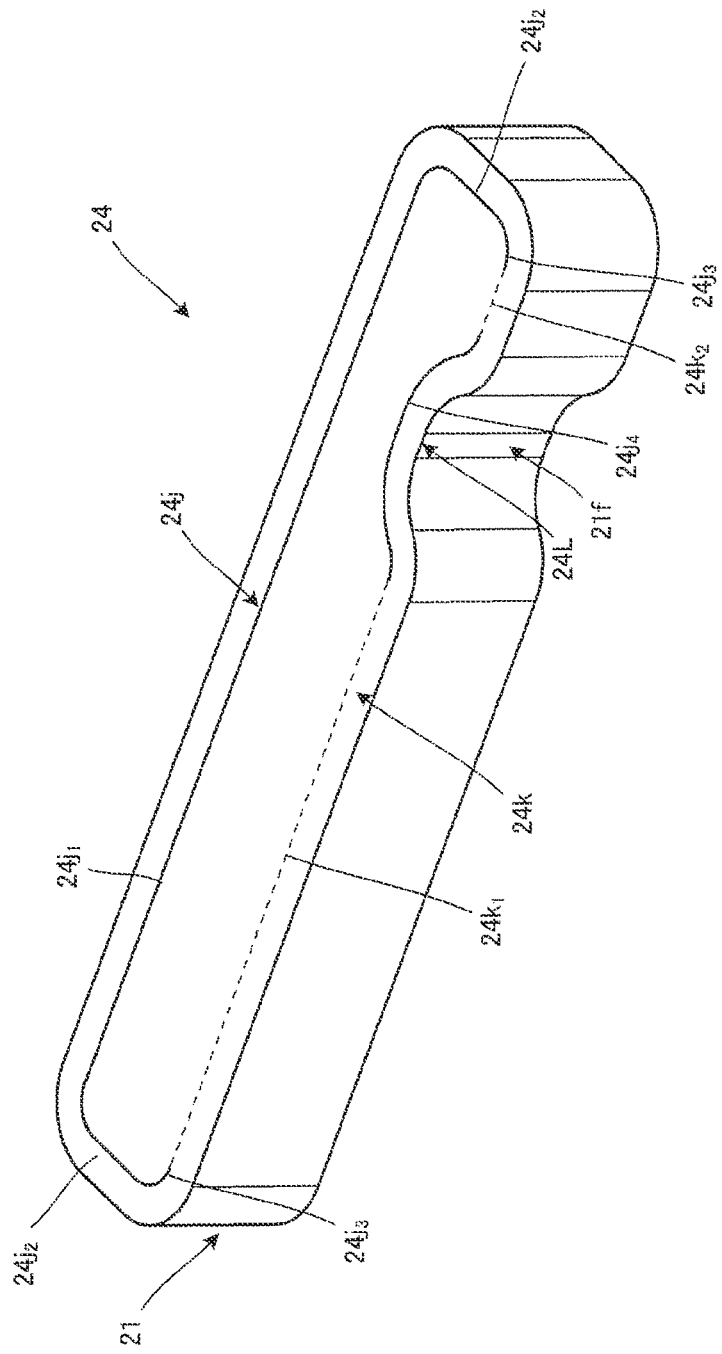
FIG. 12 is a schematic perspective view showing still another example of the upper cover unit 24 and the lower cover unit 21.

FIG. 12 is a schematic perspective view showing still another example of the upper cover unit 24 and the lower cover unit 21.

In the example shown in FIG. 12, the tear line $24j$ is formed generally in a C-shape, for opening to one side. The tear line $24j$ includes a first tear line $24j_1$ extending in the longitudinal direction of the upper cover unit 24, a pair of second tear lines $24j_2$ extending from the respective end portions of the first tear line $24j_1$ in a direction intersecting the longitudinal direction, and a pair of third tear lines $24j_3$ extending toward each other from the opposing end portions of the respective second tear lines $24j_2$.

Preferably, the first tear line $24j_1$ and the second tear lines $24j_2$ may be orthogonal to each other, and the second tear lines $24j_2$ and the third tear lines $24j_3$ may be orthogonal to each other. In addition, it is preferable that the first tear line $24j_1$ and the third tear lines $24j_3$ are parallel to each other. The joints between the first tear line $24j_1$ and the second tear line $24j_2$, and between the second tear line $24j_2$ and the third tear line $24j_3$ may be rounded.

In the example shown in FIG. 12, the lower cover unit 21 and the upper cover unit 24 respectively include the offset portions $21f$, 24L, to circumvent the functional parts of the vehicle, such as the washer nozzle N. However, the upper cover unit 24 may fail to be properly opened in the case where the hinge is offset because of the presence of the offset portions $21f$, 24L of the lower cover unit 21 and the upper cover unit 24.

Accordingly, it is preferable form a fourth tear line $24j_4$ along the shape of the offset portions $21f$, 24L of the lower cover unit 21 and the upper cover unit 24, and to form the first hinge $24k_1$ and the second hinge $24k_2$ in a linear shape on the respective sides of the fourth tear line $24j_4$, so as to constitute the hinge $24k$. The first hinge $24k_1$ connects between the end portion of one of the third tear lines $24j_3$ and an end portion of the fourth tear line $24j_4$, and the second hinge $24k_2$ connects between the end portion of the other third tear line $24j_3$ and the other end portion of the fourth tear line $24j_4$. The first tear line $24j_1$ is longer than the total length of the first hinge $24k_1$ and the second hinge $24k_2$.

Forming thus the fourth tear line $24j_4$ along the shape of the offset portions $21f$, 24L of the lower cover unit 21 and the upper cover unit 24, and the linear-shaped first hinge $24k_1$ and the second hinge $24k_2$ on the respective sides of the fourth tear line $24j_4$ so as to constitute the hinge $24k$ allows the upper cover unit 24 to be bent along the first hinge $24k_1$ and the second hinge $24k_2$ at the time of expansion, thus allowing the upper cover unit 24 to be smoothly opened.

The first tear line $24j_1$ is thinner in the central portion than in the end portions, so that the upper cover unit 24 can be smoothly opened. The hinge $24k$ is slightly thinner than the remaining portions, so as to be easily bent.

Figure 13:
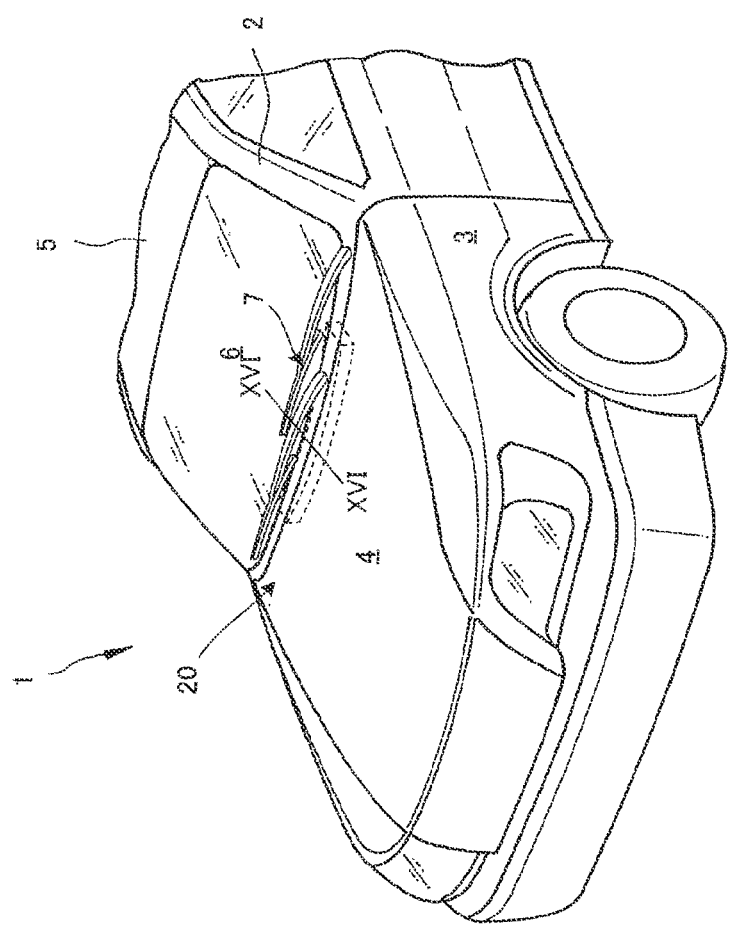
FIG. 13 is a fragmentary perspective view of a vehicle 1 in which the airbag unit 20 according to the first embodiment is installed.
Figure 14:
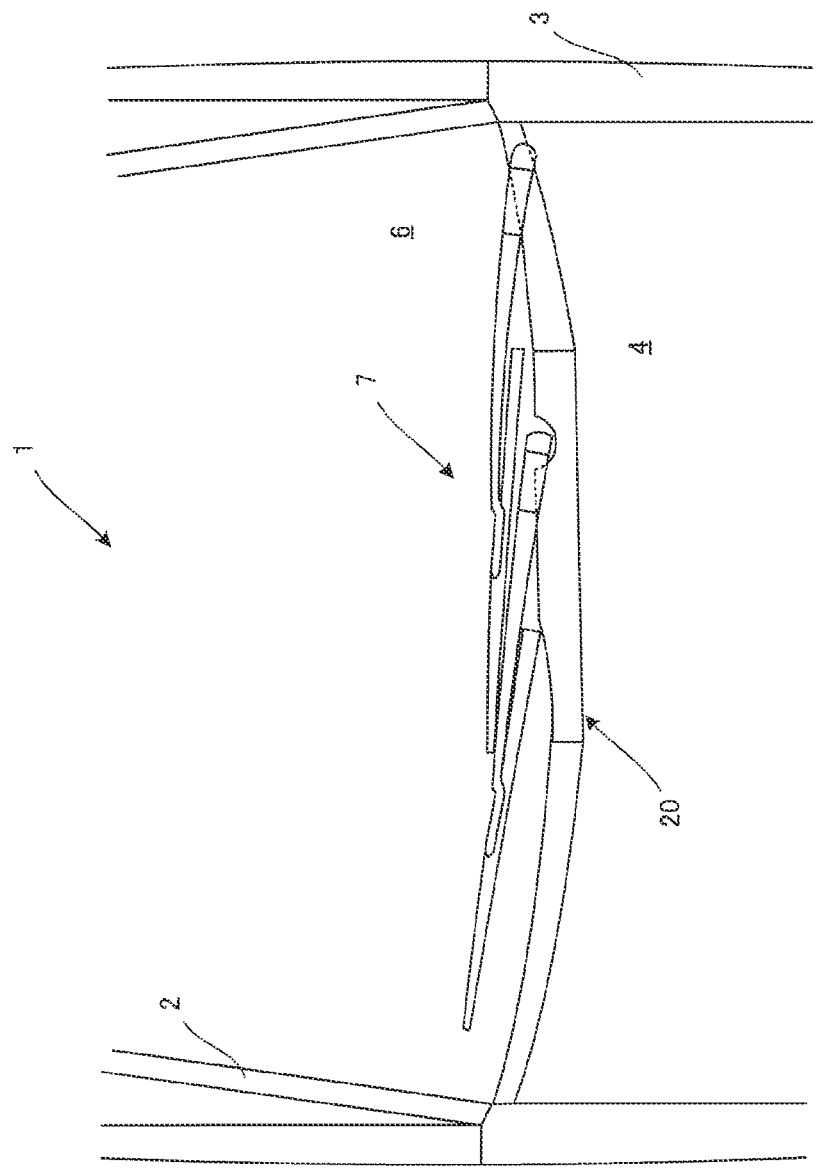
FIG. 14 is a fragmentary plan view of the vehicle 1 in which the airbag unit 20 according to the first embodiment is installed.

FIG. 13 illustrates a vehicle 1 in which the airbag unit 20 according to the first embodiment is installed. FIG. 14 illustrates a part of the vehicle 1 in which the airbag unit 20 is installed, viewed from above.

The vehicle 1 includes a pair of front pillars 2 connecting between a non-illustrated member or an engine room frame and a roof 5. The vehicle 1 also includes a pair of fenders 3, a hood 4, and a windshield 6 surrounded by the hood 4, the roof 5, and the front pillars 2, and the wiper 7 that wipes off rain drops on the windshield 6.

The airbag unit 20 according to the first embodiment is installed between the hood 4 and the windshield 6, so as to partially overlap the windshield 6 and the wiper 7 in a view from above. It is preferable to place the airbag unit 20 to be as close as possible to symmetric with respect to the midpoint of the vehicle 1 in the width direction. In addition, it is preferable to form the airbag unit 20 in a shape that fits the rear edge of the hood 4, and to place the airbag unit 20 along the rear edge of the hood 4.

Figure 15:
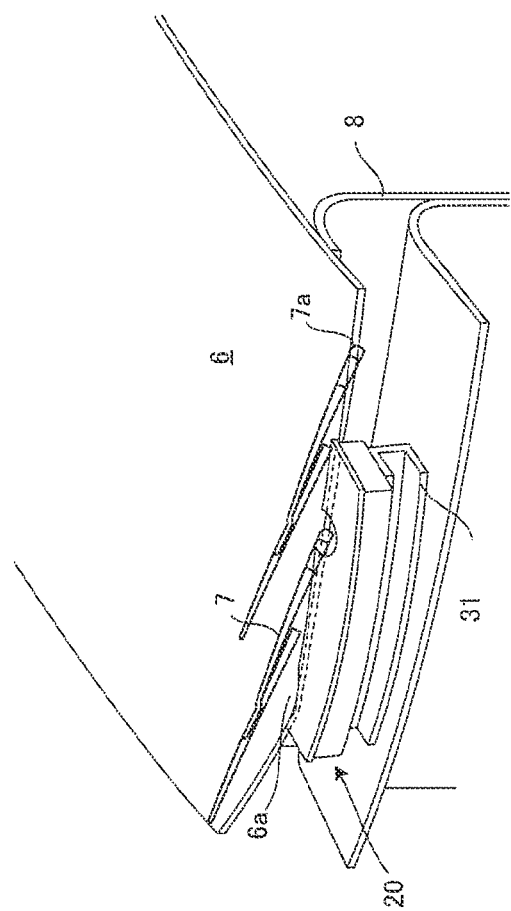
FIG. 15 is a perspective view showing a support structure for the airbag unit 20 according to the first embodiment, with respect to the vehicle 1.
Figure 16:
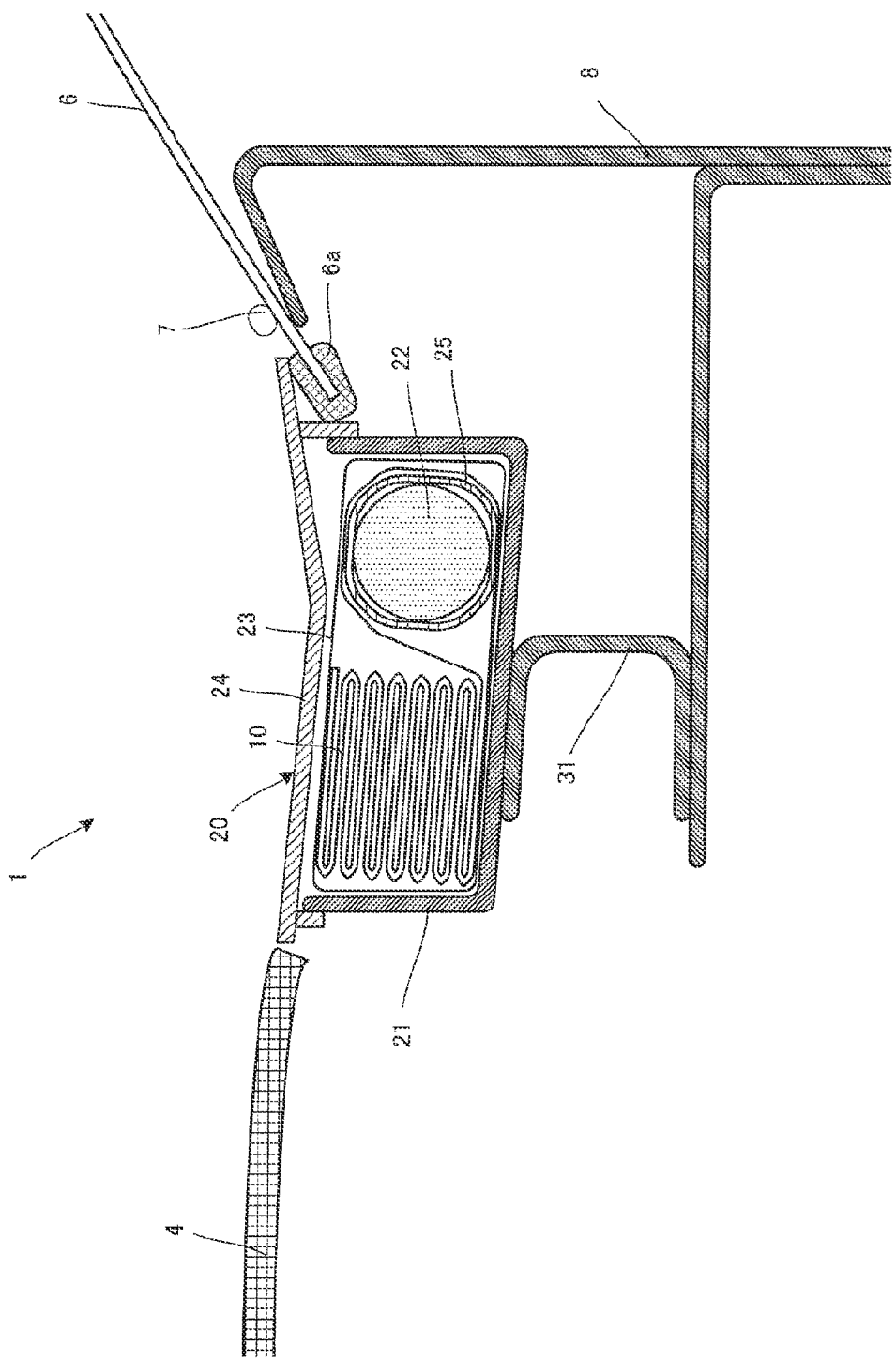
FIG. 16 is a cross-sectional view taken along a line XVI-XVI in FIG. 13.

FIG. 15 illustrates a support structure for the airbag unit 20 according to the first embodiment, with respect to the vehicle 1. FIG. 16 is a cross-sectional view taken along a line XVI-XVI in FIG. 13.

The airbag unit 20 is supported by a bracket 31 attached to a bulkhead 8 of the vehicle 1. The bulkhead 8 is a structural part of the vehicle body, serving as a partition between the engine room and the cabin of the vehicle 1. The bracket 31 has one end attached to the bulkhead 8, and the other end attached to the lower cover unit 21 of the airbag unit 20. The bracket 31 also supports the windshield 6.

Attaching thus the lower cover unit 21 to the bulkhead 8 of the vehicle 1 allows the airbag unit 20 to be stably retained.

In the airbag unit 20 according to the first embodiment, as shown in FIG. 16, the gas generator 22 is located on the rear side of the folded airbag 10. In the airbag unit 20 according to the first embodiment, the airbag 10 is located between the hood 4 and the windshield 6, so that the airbag 10 is expanded through between the hood 4 and the windshield 6. Further, the recesses in the airbag unit 20 shown in FIG. 4 are formed so as to circumvent, as shown in FIG. 15, the lower end portion 6a of the windshield 6 and the wiper 7. Here, the airbag unit 20 may be installed such that the upper face becomes lower than a position 7a where the arm of the wiper 7 is connected.

Accordingly, the airbag unit 20 can be installed at the position corresponding to the cowl top of an ordinary vehicle, and therefore the space can be efficiently utilized and the distance between the airbag 10 and the windshield 6 and the front pillars 2 is shortened, which allows the airbag 10 to be rapidly and accurately unfolded over the windshield 6 and the front pillars 2.

The lower cover unit 21 of the airbag unit 20 is downwardly inclined toward the rear side of the vehicle 1. Accordingly, water that has intruded inside the lower cover unit 21 flows backward along the slope of the lower cover unit 21, and is discharged through the water escape hole 21c shown in FIGS. 6(*a*) to 6(*d*).

Figure 17:
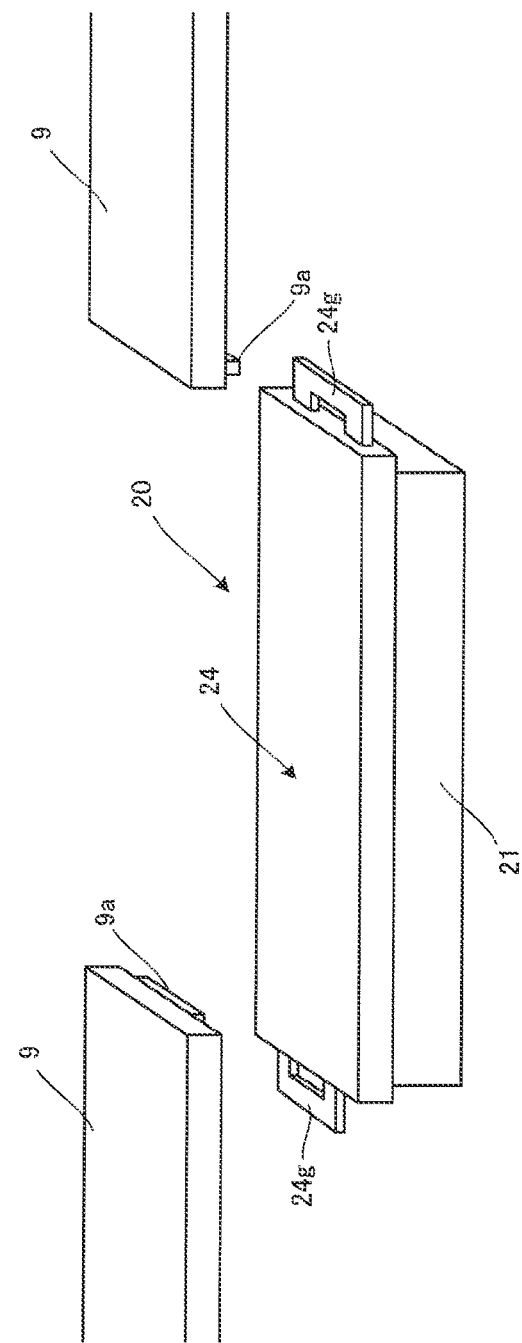
FIG. 17 is a perspective view showing a joint structure between the airbag unit 20 according to the first embodiment and a cowl top 9.

FIG. 17 is a perspective view showing a joint structure between the airbag unit 20 according to the first embodiment and a cowl top 9.

Preferably, the upper cover unit 24 of the airbag unit 20 according to the first embodiment may include a pair of joint lugs 24g provided on the respective end portions in the longitudinal direction, so as to be engaged with respective projections 9a formed on the cowl top 9. Connecting thus the upper cover unit 24 of the airbag unit 20 and the cowl top 9 allows the upper cover unit 24 to serve as a part of the cowl top 9, i.e., allows the airbag unit to be located at the position of the cowl top 9. Therefore, the space can be efficiently utilized. In addition, since the airbag unit 20 can be installed simply by processing the cowl top 9, the airbag unit 20 can be attached to an existing vehicle.

Further, it is preferable that the upper face of the upper cover unit 24 and the upper face of the cowl top 9 are flush with each other, and connected to each other so as to facilitate water to flow thereon. For example, the upper face of the upper cover unit 24 may be inclined, and also the upper face of the cowl top 9 may be inclined in alignment with the inclination of the upper cover unit 24. A groove may be formed on the respective upper faces of the upper cover unit 24 and the cowl top 9, so as to be connected to each other.

Figure 18:
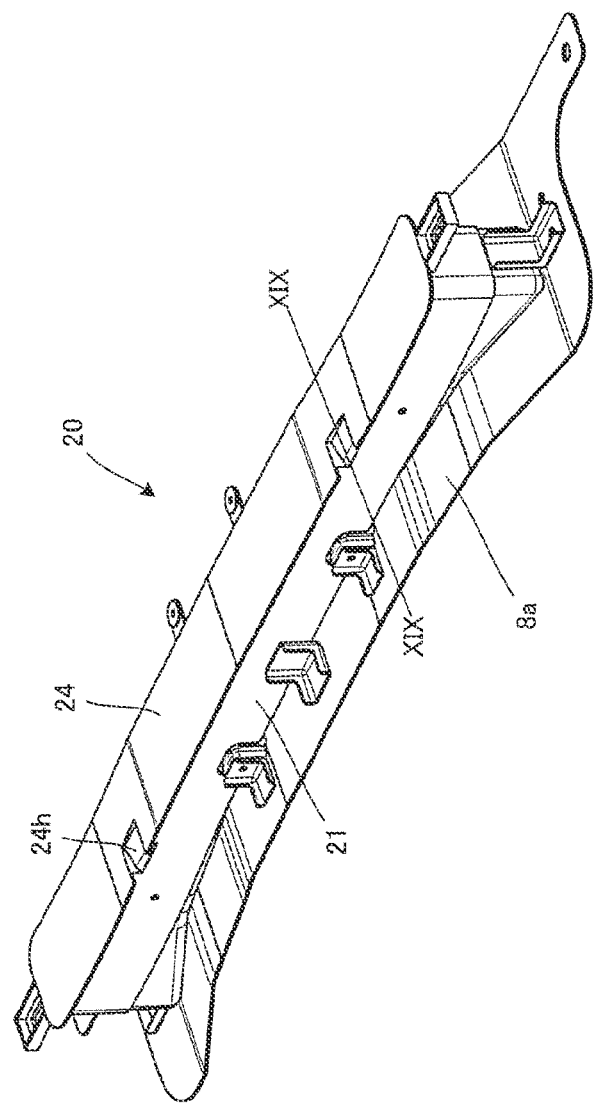
FIG. 18 is a perspective view showing a variation of the airbag unit 20 according to the first embodiment.
Figure 19:
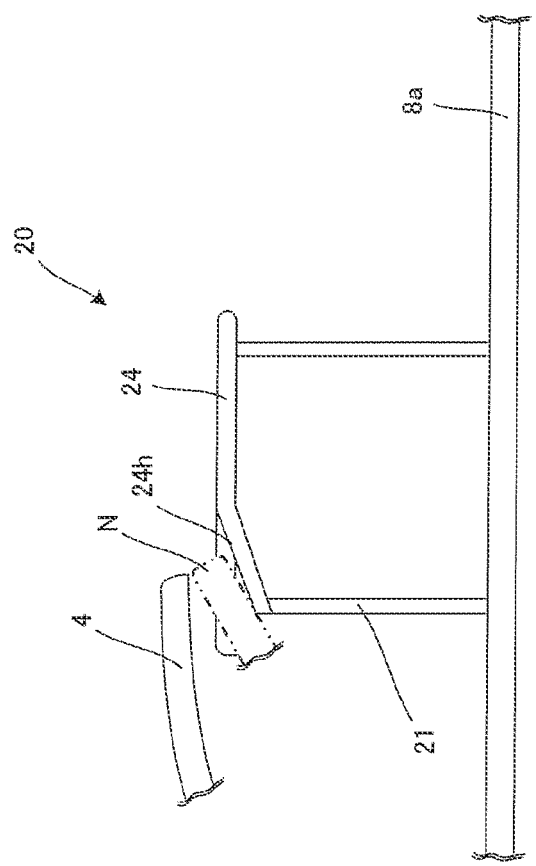
FIG. 19 is a cross-sectional view taken along a line XIX-XIX in FIG. 18.

FIG. 18 is a perspective view showing a variation of the airbag unit 20 according to the first embodiment. FIG. 19 is a cross-sectional view taken along a line XIX-XIX in FIG. 18.

In the example shown in FIG. 18, the airbag unit 20 is attached to a bracket 8a. The bracket 8a is attached to the vehicle body, for example at the bulkhead 8.

In the example shown in FIG. 18, the upper cover unit 24 of the airbag unit 20 includes a recess 24h formed on the upper face. In the recess 24h, the washer nozzle N for ejecting window washer fluid is disposed. It is preferable that the upper face of the recess 24h is inclined along the inclination of the washer nozzle N. In addition, it is preferable that a region above the washer nozzle N is covered with the hood 4.

Hereunder, an expanding process of the airbag unit 20 will be described.

Figure 20:
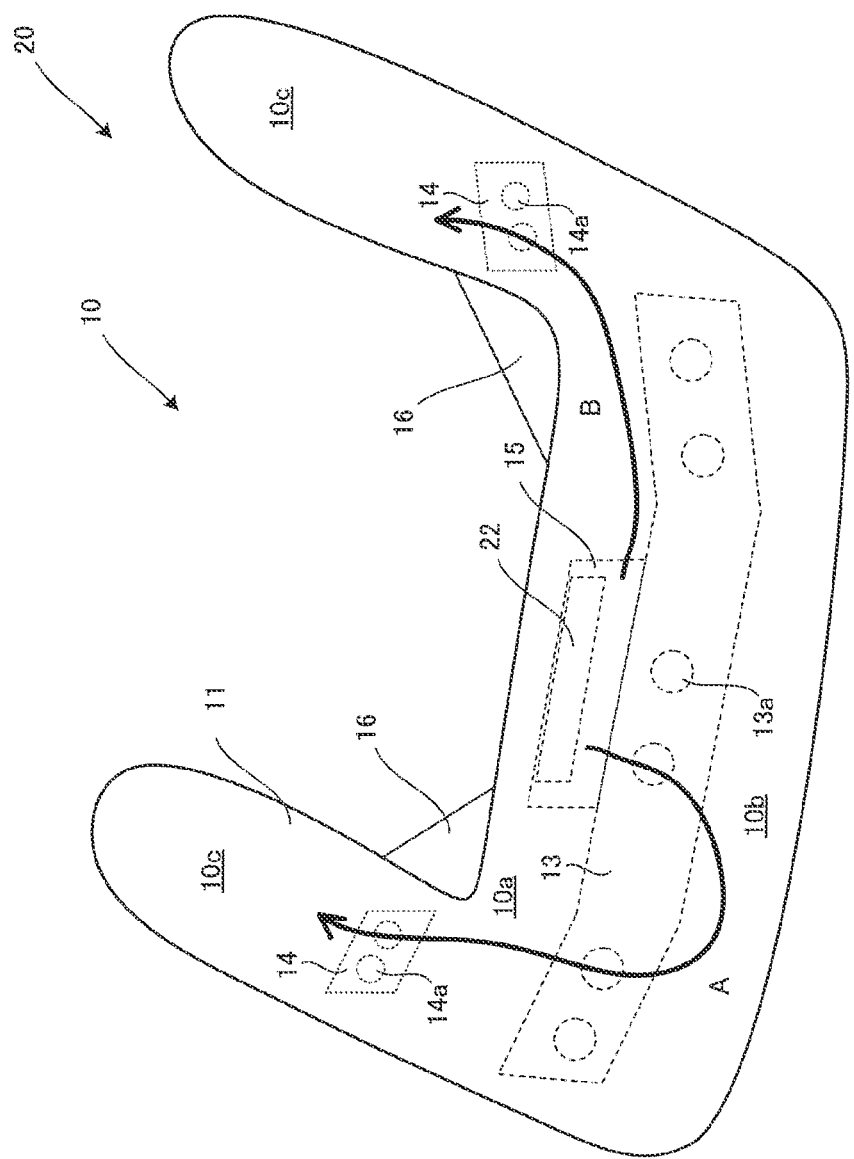
FIG. 20 is a schematic perspective view showing how gas flows in the airbag 10 when the airbag unit 20 according to the first embodiment is expanded.
Figure 21:
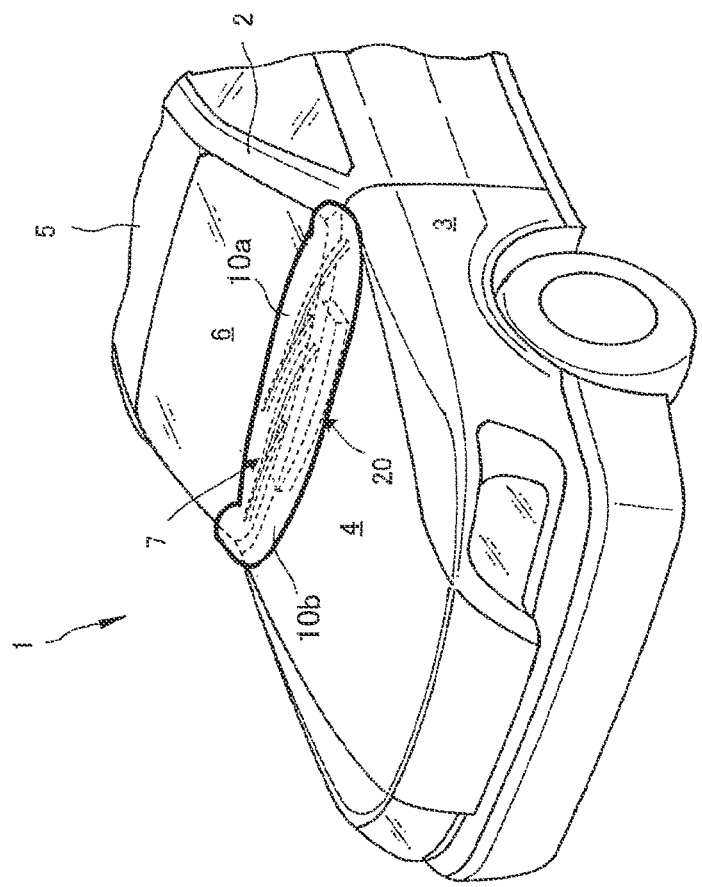
FIG. 21 is a fragmentary perspective view showing the state of the vehicle 1 at the time that the airbag unit 20 according to the first embodiment is being expanded.
Figure 22:
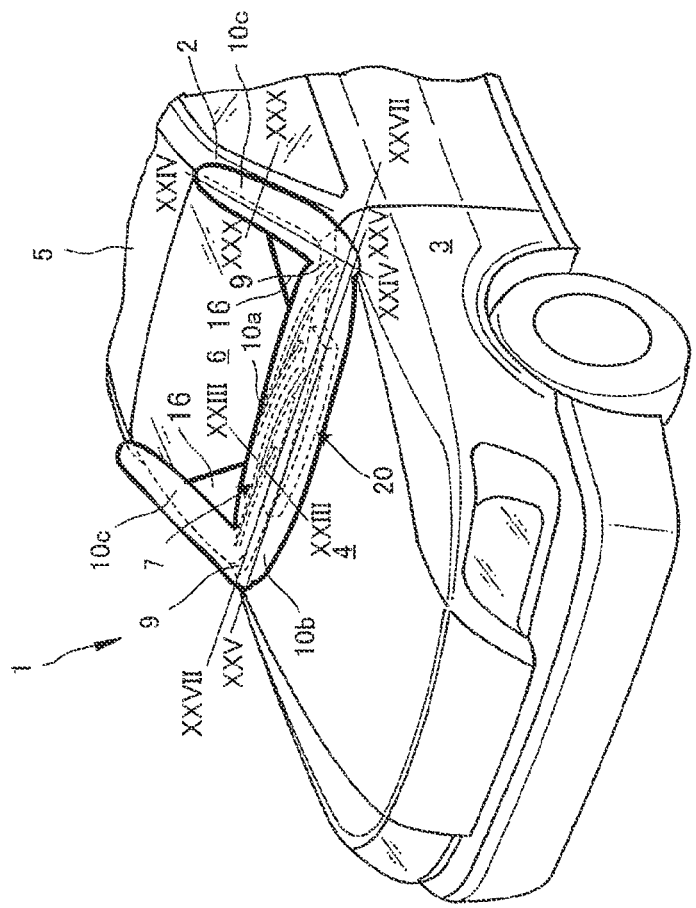
FIG. 22 is a fragmentary perspective view showing the state of the vehicle 1 after the airbag unit 20 according to the first embodiment is unfolded.
Figure 23:
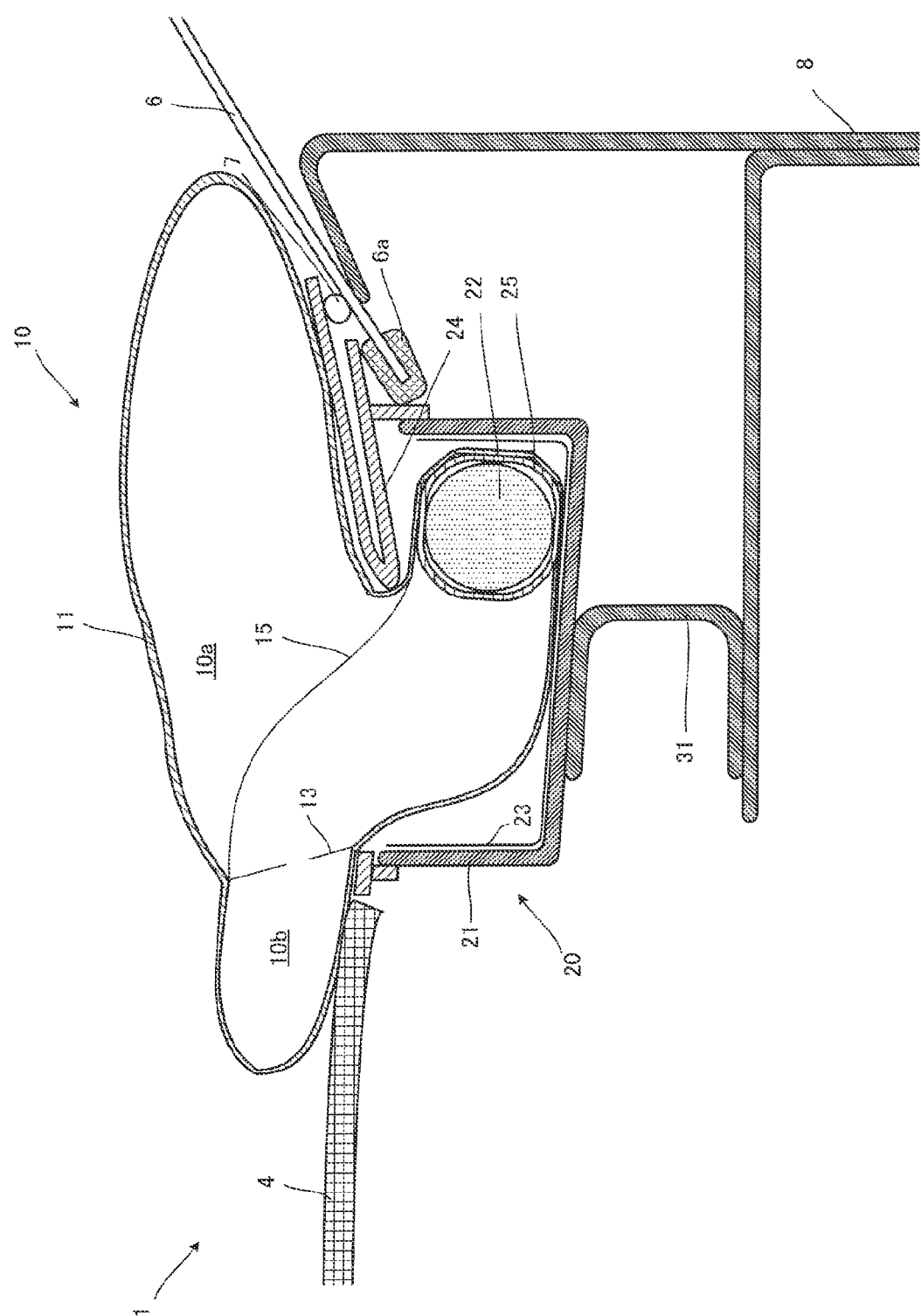
FIG. 23 is a cross-sectional view taken along a line XXIII-XXIII in FIG. 22.
Figure 24:
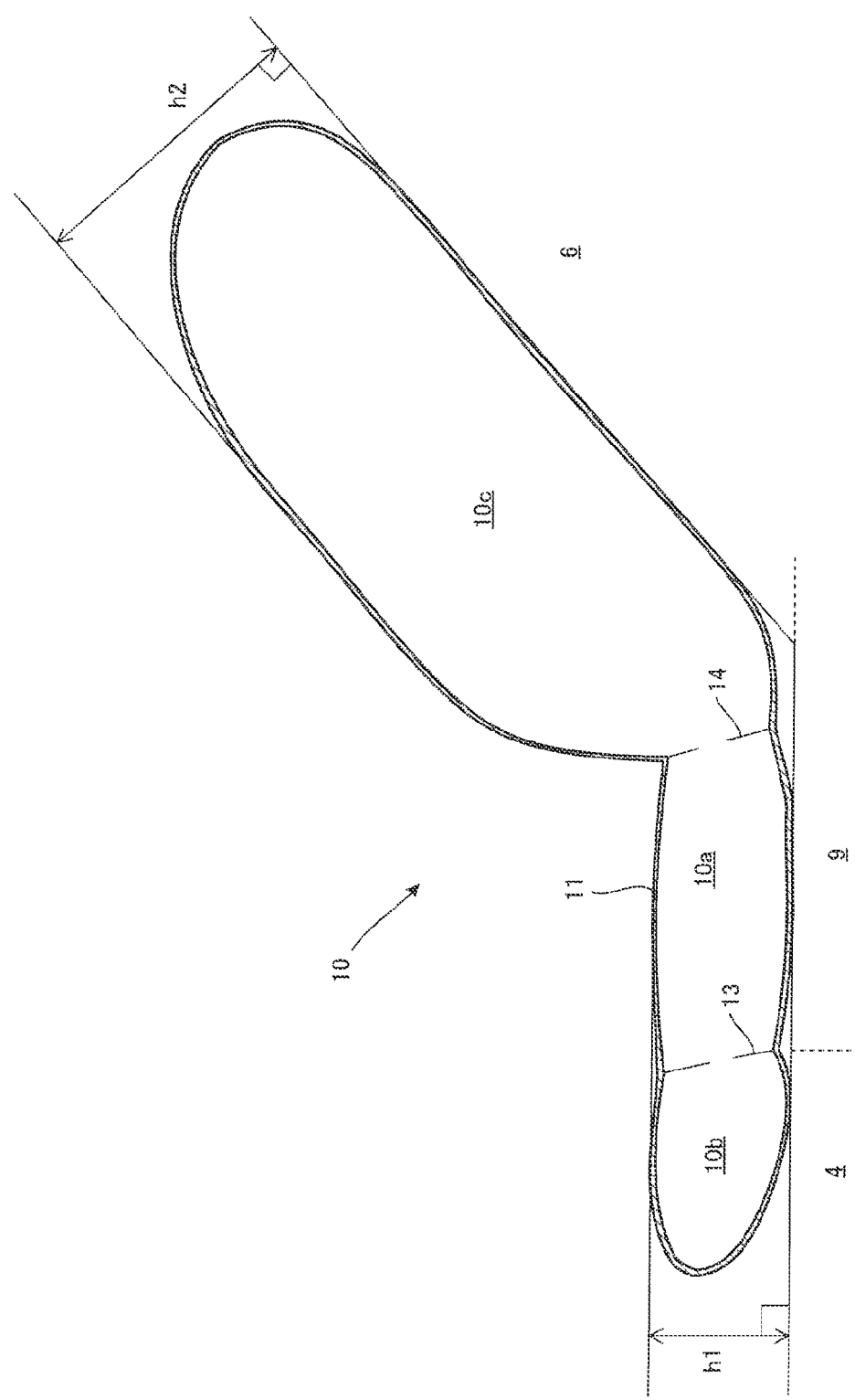
FIG. 24 is a cross-sectional view of the airbag 10 taken along a line XXIV-XXIV in FIG. 22.
Figure 25:
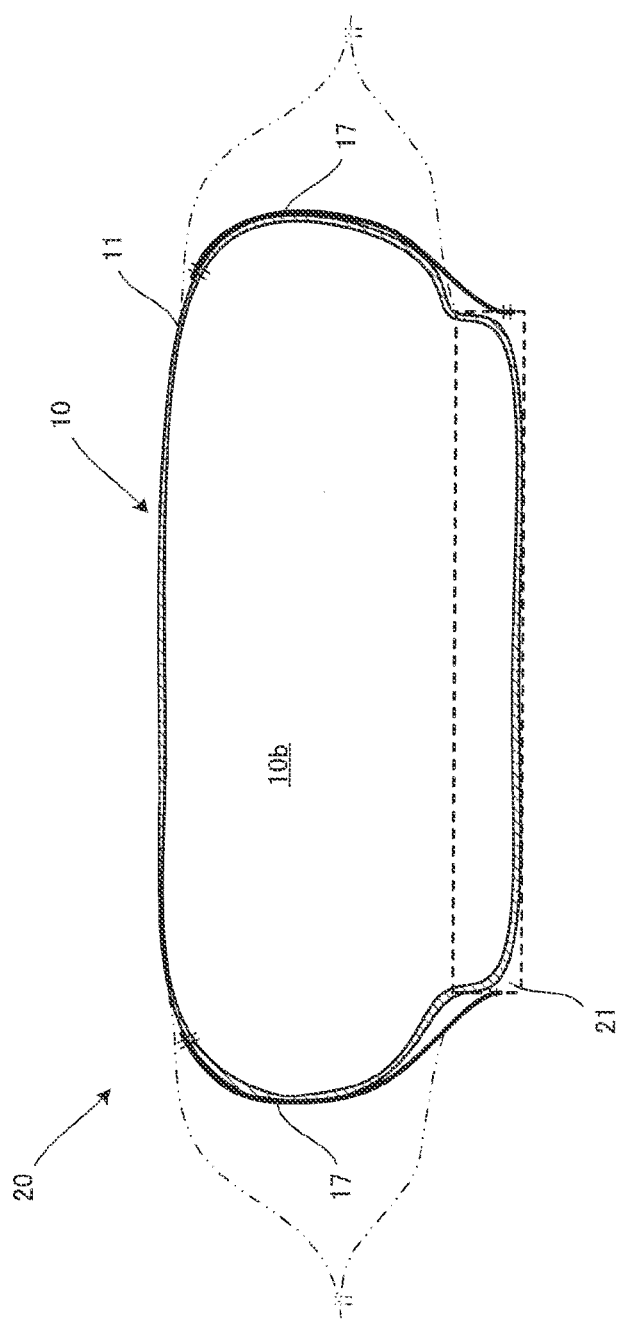
FIG. 25 is a cross-sectional view taken along a line XXV-XXV in FIG. 22.

FIG. 20 is a schematic perspective view showing how gas flows in the airbag 10 when the airbag unit 20 according to the first embodiment is expanded. FIG. 21 is a fragmentary perspective view showing the state of the vehicle 1 at the time that the airbag unit 20 according to the first embodiment is being expanded. FIG. 22 is a fragmentary perspective view showing the state of the vehicle 1 after the airbag unit 20 according to the first embodiment is unfolded. FIG. 23 is a cross-sectional view taken along a line XXIII-XXIII in FIG. 22. FIG. 24 is a cross-sectional view of the airbag 10 taken along a line XXIV-XXIV in FIG. 22. FIG. 25 is a cross-sectional view taken along a line XXV-XXV in FIG. 22.

In the airbag unit 20 according to the first embodiment, the gas is mainly supplied along a first route A and a second route B shown in FIG. 20. The gas ejected from the gas generator 22 first flows through the first unfolding portion 10a. Here, although FIG. 20 shows a single arrow indicating each of the first route A and the second route B, these arrows merely indicate a typical flow of the gas and actually various gas flows are formed in each gas passage.

Along the first route A, the gas first flows along the diffuser cloth 15, passes through the gas passage 13a from the side of the first unfolding portion 10a, and flows into the second unfolding portion 10b. The gas then passes through another gas passage 13a from the side of the second unfolding portion 10b and flows into the first unfolding portion 10a. Thereafter, the gas passes through the gas passage 14a from the side of the first unfolding portion 10a and flows into the third unfolding portion 10c.

Along the second route B, the gas flows in a lateral direction without passing through the gas passage 13a from the side of the first unfolding portion 10a, and passes through the gas passage 14a and flows into the third unfolding portion 10c. In addition, a minor amount of gas may flow along a route different from the first route A and the second route B.

In the airbag unit 20 according to the first embodiment, the majority of the gas flows along the first route A and the second route B as shown in FIG. 20. Accordingly, the first unfolding portion 10a of the airbag 10 first starts to expand, owing to the presence of the first tether 13 and the second tether 14.

Then a large amount of gas flows from the first unfolding portion 10a to the second unfolding portion 10b owing to the presence of the diffuser cloth 15, and hence the second unfolding portion 10b starts to expand.

Then the first unfolding portion 10a is unfolded, as shown in FIG. 21, so as to cover the wiper 7 and a part of the windshield 6, and the second unfolding portion 10b is unfolded so as to cover a part of the hood 4. The action up to this point is performed within approximately 30 ms.

In the airbag unit 20, the gas then flows from the first unfolding portion 10a to the third unfolding portion 10c as shown in FIG. 20, and hence the pair of third unfolding portions 10c each start to expand.

Thus, the pair of third unfolding portions 10c each expand as shown in FIG. 22. The third unfolding portions 10c expand so as to cover the respective front pillars 2. The action up to this point is performed within approximately 40 ms.

As above, the airbag unit 20 according to the first embodiment is configured such that the third unfolding portion 10c is expanded after the first unfolding portion 10a and the second unfolding portion 10b are unfolded. Therefore, in the event of collision with a pedestrian the airbag 10 is rapidly unfolded from the side closer to the pedestrian, thus enabling the pedestrian to be effectively protected.

After the airbag 10 is unfolded, the airbag unit 20 according to the first embodiment assumes the U-shape so as to cover the front pillars 2, the hood 4, and a part of the windshield 6 as shown in FIG. 22. It is preferable that the airbag 10 includes the pair of collapse prevention tethers 16 shown in FIGS. 3(*a*) and 3(*b*), each connecting between the first unfolding portion 10a and the third unfolding portion 10c.

The pair of collapse prevention tethers 16 provided in the airbag 10 so as to connect between the first unfolding portion 10a and the third unfolding portion 10c serve to suppress the third unfolding portion 10c from shaking, thereby allowing the airbag 10 to be stably unfolded over the front pillars 2.

In the airbag unit 20 according to the first embodiment, the upper cover unit 24 is overlaid onto the wiper 7 as shown in FIG. 23, when the airbag 10 is expanded. Accordingly, the base cloth 11 of the airbag 10 is kept from contacting the wiper 7, and thus exempted from being damaged owing to the contact with the wiper 7.

In the airbag unit 20 according to the first embodiment, further, the diffuser cloth 15 serves to rectify the gas flow as shown in FIG. 23 when the airbag 10 is expanded, so that the gas generated by the gas generator 22 passes through the gas passage 13a formed in the bottom inner tether 13 and flows into the second unfolding portion 10b. Therefore, the gas ejected from the gas generator 22 can be smoothly led to the second unfolding portion 10b.

Still further, in the airbag 10 according to the first embodiment, an effective stroke h1 of the first unfolding portion 10a and the second unfolding portion 10b may be smaller than an effective stroke h2 of the third unfolding portion 10c, as shown in FIG. 24. Here, the effective stroke of the first unfolding portion 10a corresponds to the thickness of the airbag 10 in a vertical direction from the upper cover unit 24 in the expanded state, the effective stroke of the second unfolding portion 10b corresponds to the thickness of the airbag 10 in a vertical direction from the hood 4, and the effective stroke of the third unfolding portion 10c corresponds to the thickness of the airbag 10 in a vertical direction from the windshield 6.

The third unfolding portion 10c is unfolded so as to cover the front pillar 2 as shown in FIG. 22. Since the front pillar 2 is a rigid member, the third unfolding portion 10c has to absorb the impact solely in the effective stroke. For this reason, the third unfolding portion 10c needs to have a larger effective stroke.

In contrast, the first unfolding portion 10a is unfolded over the cowl top 9 and the upper cover unit 24, and the second unfolding portion 10b is unfolded over the hood 4. Here, the cowl top 9 and the upper cover unit 24, as well as the hood 4, are deformable members on the side of the vehicle.

Accordingly, the cowl top 9 and the upper cover unit 24, as well as the hood 4, serve as a buffer material, and therefore the total buffer capacity of the cowl top 9/the upper cover unit 24 and the first unfolding portion 10a, and total buffer capacity of the hood 4 and the second unfolding portion 10b can be sufficient for absorbing the impact, despite the effective stroke h1 of the second unfolding portion 10b being smaller than the effective stroke h2 of the third unfolding portion 10c.

In the first embodiment, for example, while the effective stroke h2 of the third unfolding portion 10c shown in FIG. 24 has to be in a range of 180 mm≤h2≤280 mm, or 200 mm≤h2≤250 mm, it suffices that the effective stroke of the first unfolding portion 10a and the second unfolding portion 10b is in a range of 80 mm≤h1≤230 mm, or 80 mm≤h1≤180 mm.

In the airbag unit 20 according to the first embodiment, further, an end portion of each of the crushing tether 17 is attached to an upper position of the second unfolding portion 10b so as to crush an end portion thereof in the width direction of the vehicle body, and the other end portion of the crushing tether 17 is attached to the lower cover unit 21, as shown in FIG. 25.

An end portion of the crushing tether 17 may be attached to an upper portion of the first unfolding portion 10a, instead of the second unfolding portion 10b, so as to crush an end portion of the first unfolding portion 10a in the width direction of the vehicle body. Likewise, the other end portion of the crushing tether 17 may be attached to a rigid member of the vehicle body such as the bulkhead 8, instead of the lower cover unit 21. Further, the other end portion of the crushing tether 17 may be attached to a lower portion of the first unfolding portion 10a or the second unfolding portion 10b. Thus, the crushing tether 17 may be disposed as desired, provided that the end portion of the airbag in the width direction of the vehicle body can be effectively crushed.

Employing thus the crushing tether 17 to attach the end portions of the airbag 10 in the width direction of the vehicle body to the member on the side of the vehicle body, for example the lower cover unit 21, and to apply a tension to the airbag 10 suppresses the airbag 10 from shaking thereby allowing the airbag 10 to be stably unfolded. In addition, the end portions narrower than the effective stroke and unable to withstand the load, as indicated by imaginary dash-dot-dot lines in FIG. 25, can be crushed by pulling with the crushing tether 17.

Accordingly, the end portions of the airbag 10 can be crushed so as to reduce the capacity of the airbag 10, thus reducing the gas consumption, without the need to change the size of an effective area possessing the effective stroke. Therefore, the airbag unit 20 can be realized at a lower cost.

Figure 26:
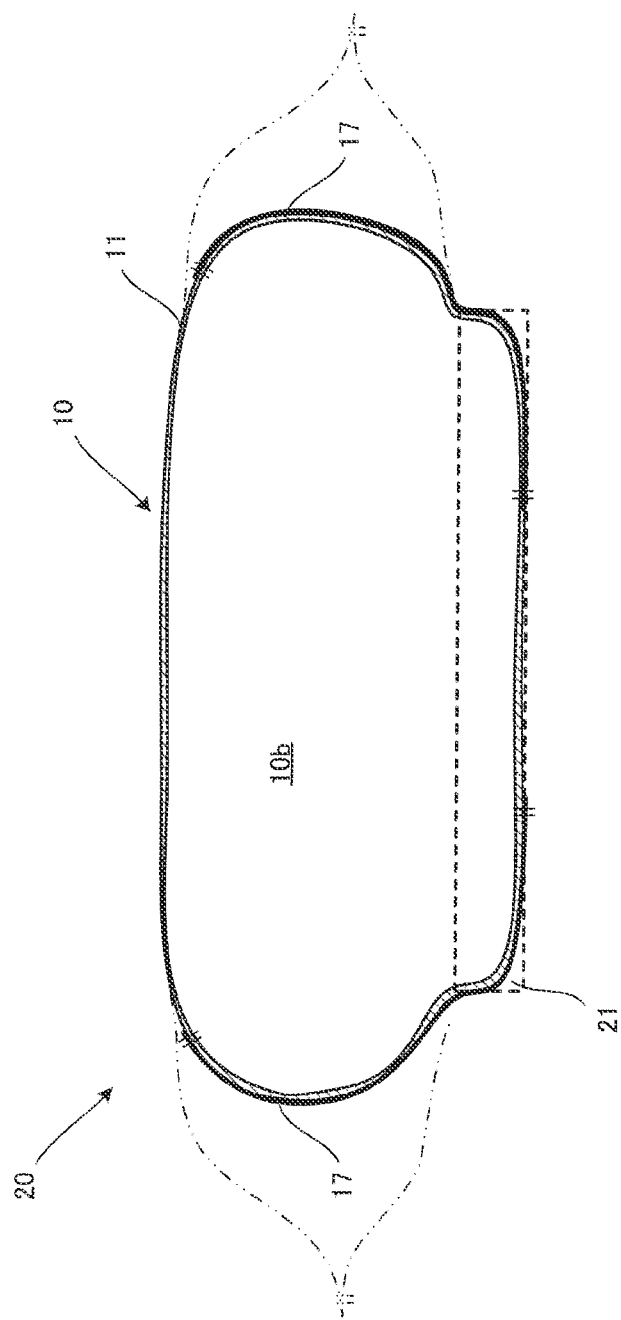
FIG. 26 is a cross-sectional view showing a variation of FIG. 25.

FIG. 26 illustrates a variation of FIG. 25.

As shown in FIG. 26, an end portion of the crushing tether 17 may be attached to the end portion of the second unfolding portion 10b in the width direction of the vehicle body, and the other end portion of the crushing tether 17 may be attached to the lower cover unit 21 together with the airbag 10. In this case, it is preferable to attach the tether 13 shown in FIG. 20 to the lower cover unit 21 together with the airbag 10 and the crushing tether 17, because the attaching strength is increased. An attaching bracket or the like may be employed for attaching the crushing tether 17 to the lower cover unit 21. In this case, it is preferable to locate the attaching bracket inside the airbag 10, because the bracket is kept from sticking out from the lower cover unit 21 and therefore interference with other parts can be avoided. Here, an end portion of the crushing tether 17 may be attached, for example, to the end portion of the first unfolding portion 10a in the width direction of the vehicle body, instead of the second unfolding portion 10b.

Thus, in the airbag unit 20 the crushing tether 17 is attached to the lower cover unit 21 together with the airbag 10, which allows a step in the manufacturing process to be skipped, thereby facilitating the assembly of the airbag unit.

Figure 27:
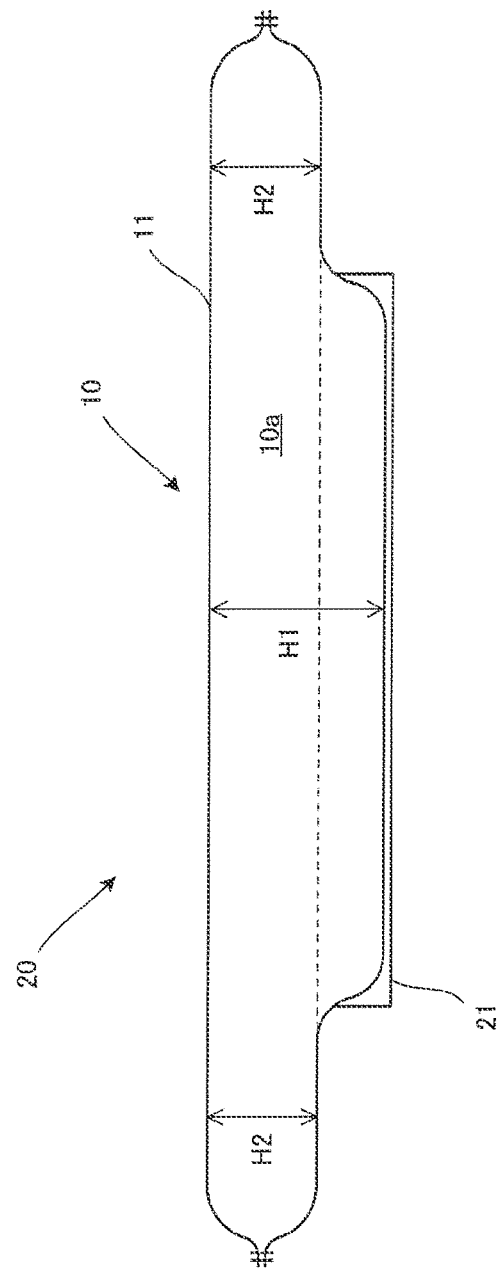
FIG. 27 is a cross-sectional view taken along a line XXVII-XXVII in FIG. 22.
Figure 28:
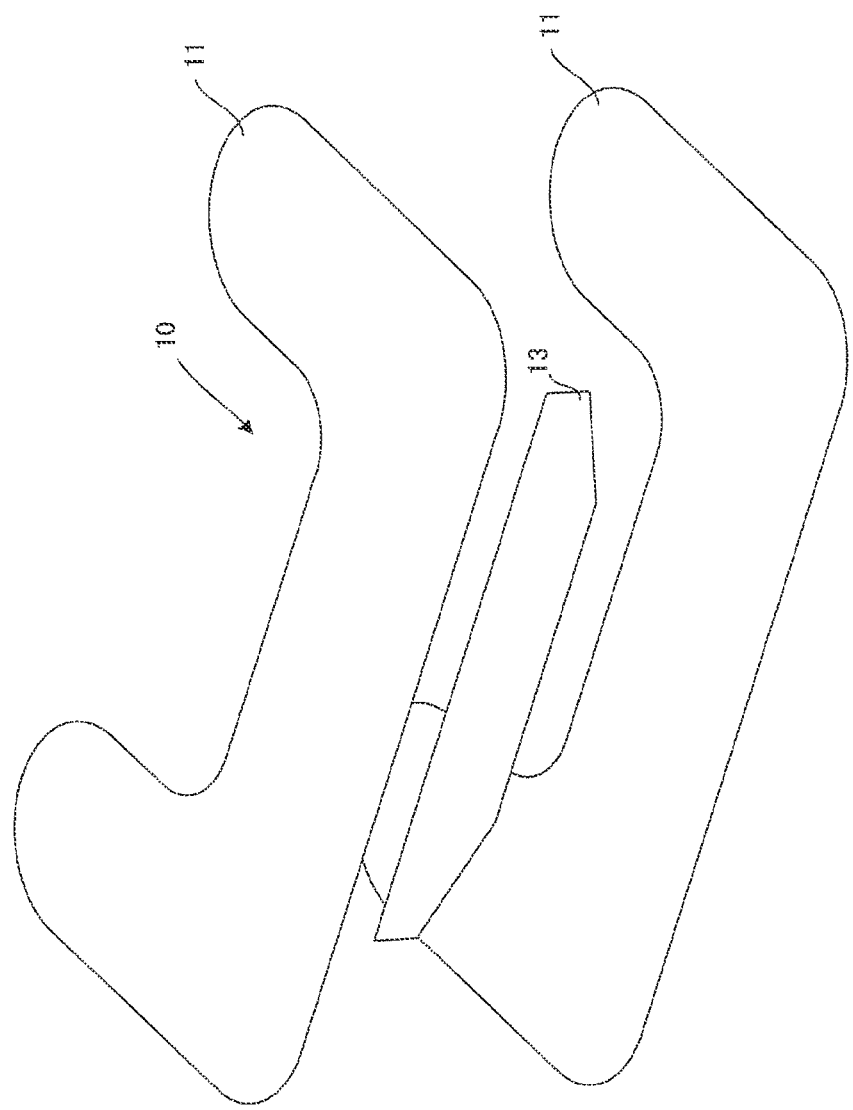
FIG. 28 is a perspective view showing a tether in FIG. 27.

FIG. 27 is a cross-sectional view taken along a line XXVII-XXVII in FIG. 22. FIG. 28 is a perspective view showing a tether in FIG. 27.

In the example shown in FIG. 27, the first unfolding portion 10a of the airbag 10 is formed such that a height H1 of the portion corresponding to the lower cover unit 21 becomes higher than a height H2 of the end portions, in the unfolded state. Therefore, the upper face of the airbag 10 in the unfolded state becomes generally horizontal over the entire width.

In this case, it is preferable to form the tether 13, as shown in FIG. 28, with a higher height in the portion corresponding to the lower cover unit 21 than in the end portions in accordance with the shape of the airbag 10 in the unfolded state. Forming thus the tether 13 in the shape that fits the shape of the airbag 10 in the unfolded state further facilitates the upper face of the airbag 10 to be horizontal over the entire width in the unfolded state.

Figure 29:
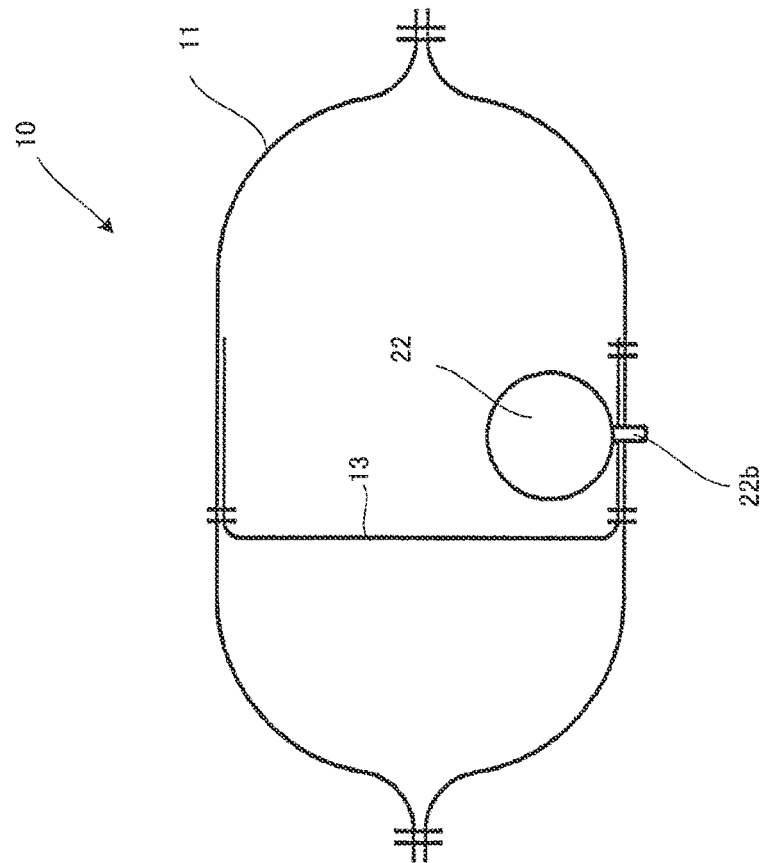
FIG. 29 is a schematic drawing for explaining an attaching method of the tether.

FIG. 29 is a schematic drawing for explaining an attaching method of the tether.

The tether 13 shown in FIG. 29 is sewn to the base cloth 11 of the airbag 10, and inserted through the gas generator holder 22b for the gas generator 22, together with the base cloth 11. Accordingly, the tether 13 serves as a patch that increases the strength, thereby increasing the attaching strength of the airbag 10.

Figure 30:
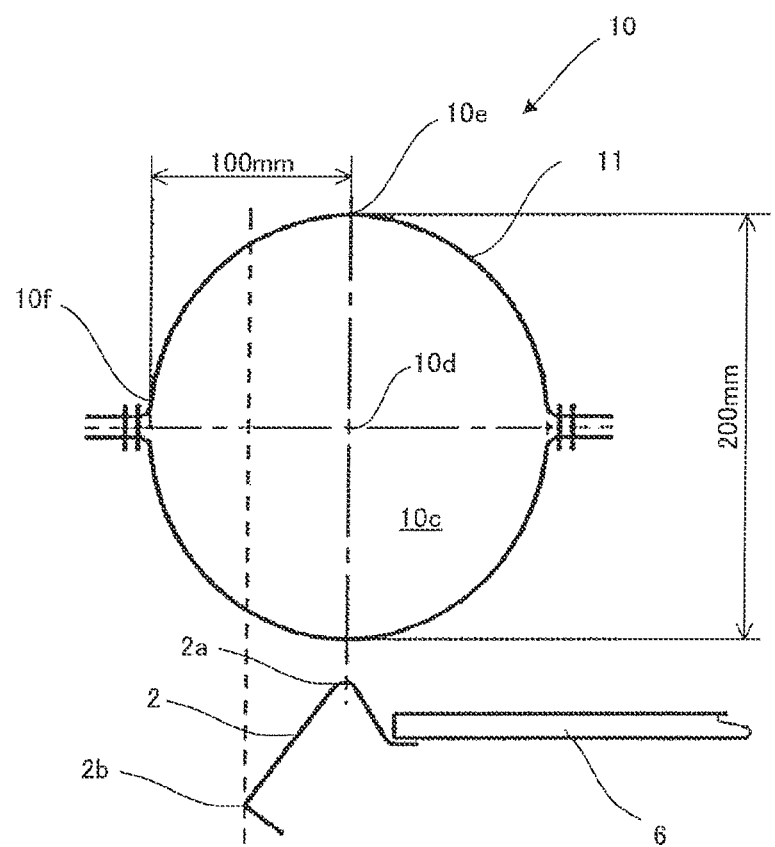
FIG. 30 is a cross-sectional view taken along a line XXX-XXX in FIG. 22.

FIG. 30 is a cross-sectional view taken along a line XXX-XXX in FIG. 22.

It is preferable that the size of the projecting portion 10c of the airbag 10 in the vehicle width direction, the projecting portion 10c having been unfolded in a radius of approximately 100 mm over the front pillar 2, is larger than the size of the front pillar 2 in the vehicle width direction. For example, it is preferable that the center 10d of the airbag 10 in the cross-section orthogonal to the longitudinal direction of the front pillar 2 generally corresponds to the front edge 2a of the front pillar 2. In this case, the front end 10e of the airbag 10 has a height of 200 mm or more from the front edge 2a of the front pillar 2. Further, the outer end 10f of the airbag 10 is approximately 100 mm away from the front edge 2a of the front pillar 2 in the vehicle width direction, and at a farther outer position in the vehicle width direction with respect to the outer end 2b of the front pillar 2. Here, the outer end 10f of the airbag 10 may be in a range of 50 mm to 150 mm from the front end 2a of the front pillar 2.

Thus, the size of the projecting portion 10c of the airbag 10 in the vehicle width direction in the unfolded state is larger than the size of the front pillar 2 in the vehicle width direction. Therefore, pedestrians or objects can be effectively protected.

Hereunder, other embodiments of the airbag unit 20 will be described.

Figure 31:
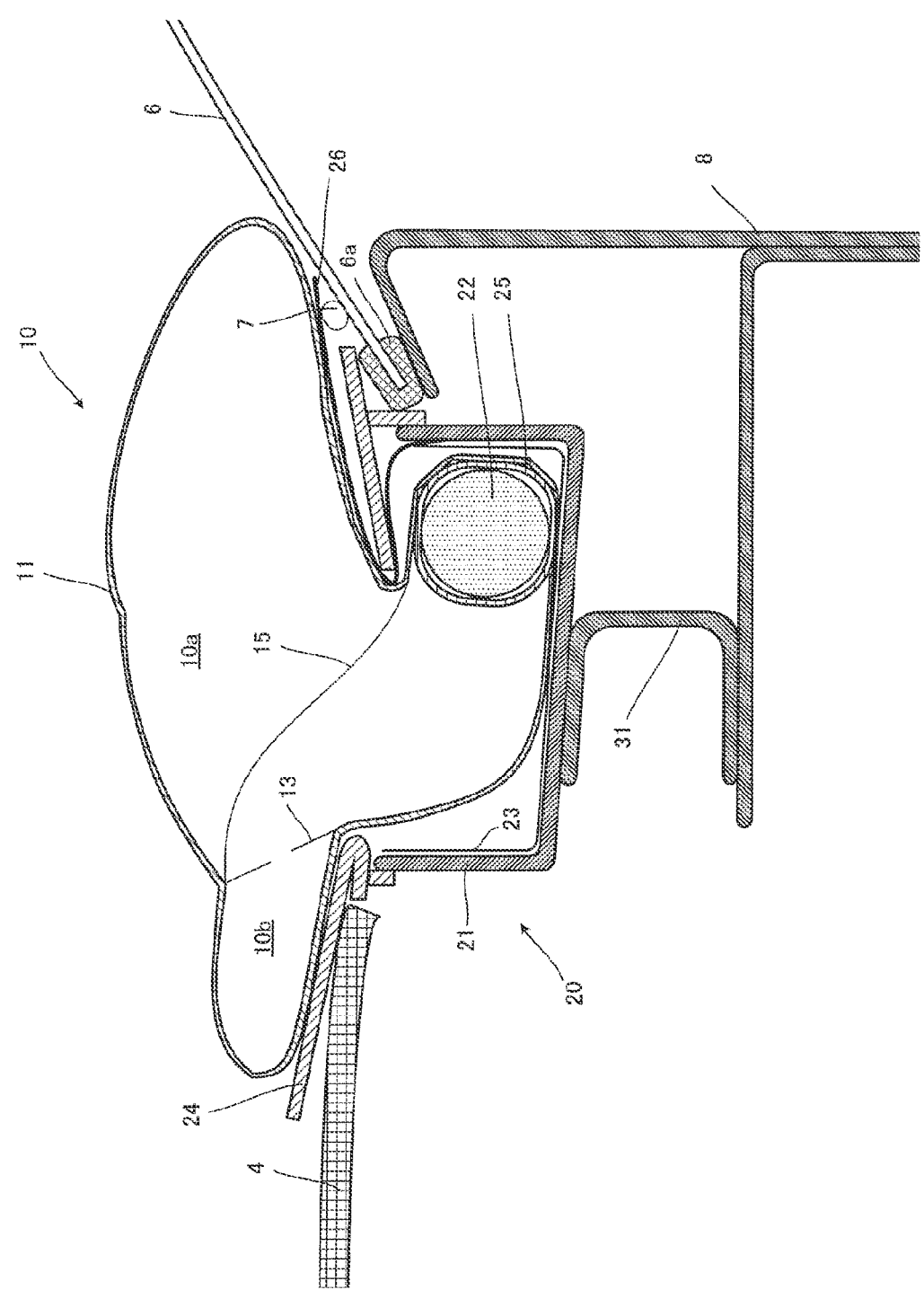
FIG. 31 is a cross-sectional view showing an unfolded state of the airbag unit 20 according to a second embodiment.

FIG. 31 is a cross-sectional view showing the unfolded state of the airbag unit 20 according to a second embodiment.

The airbag unit 20 according to the second embodiment is configured such that the upper cover unit 24 is opened to the side of the hood 4, at the time of expansion. The upper cover unit 24 is opened so as to cover a part of the hood 4. In this case, it is preferable to provide a cover cloth 26 to the outer face of the base cloth 11, to keep the base cloth 11 from contacting the wiper 7.

Since the upper cover unit 24 is thus opened to the side of the hood 4 at the time of expansion, the airbag 10 can be prevented from intruding in the space under the hood 4 and being damaged.

Figure 32:
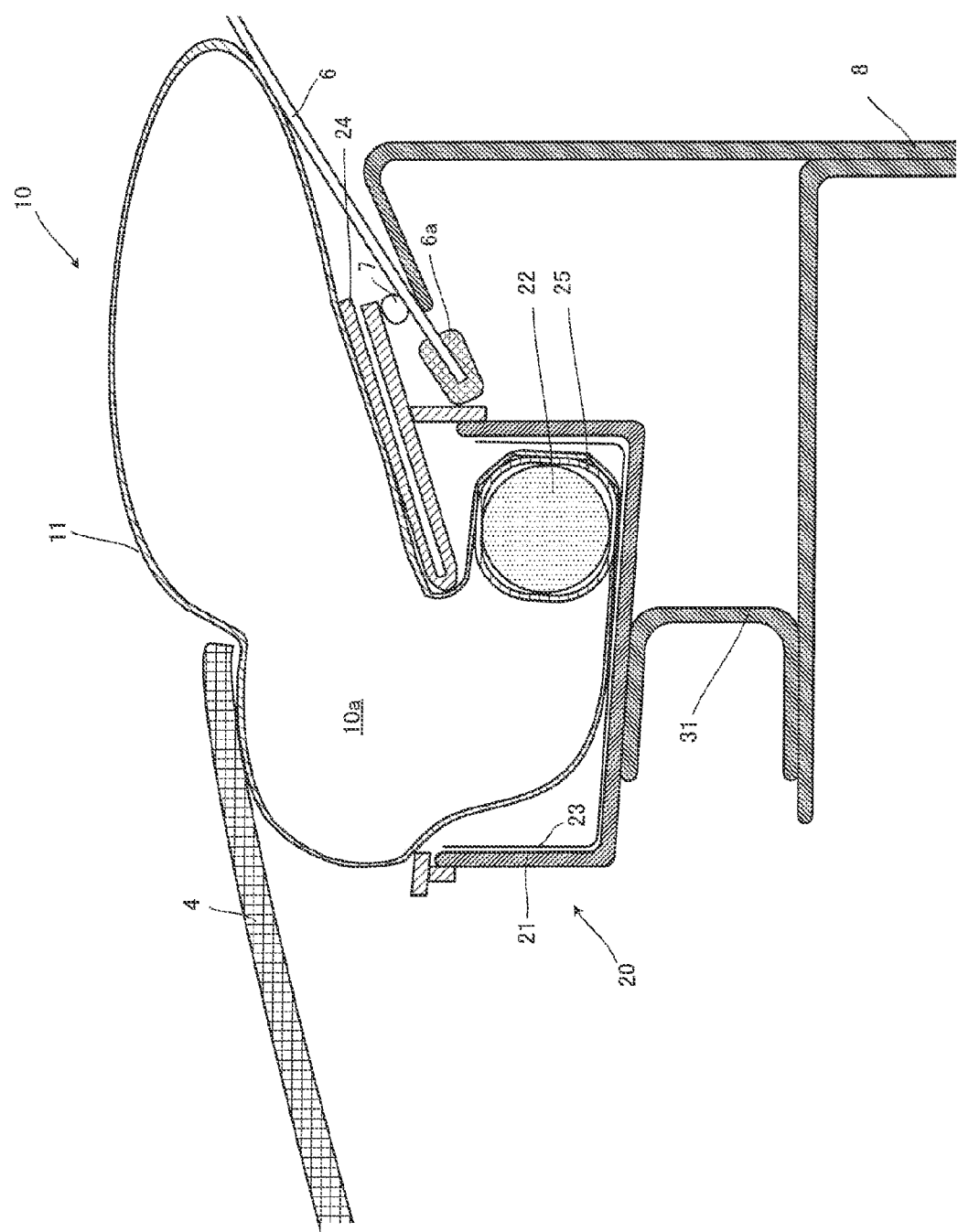
FIG. 32 is a cross-sectional view showing an unfolded state of the airbag unit 20 according to a third embodiment.

FIG. 32 is a cross-sectional view showing the unfolded state of the airbag unit 20 according to a third embodiment.

In the airbag unit 20 according to the third embodiment, the airbag 10 is configured so as to expand through between the hood 4 and the windshield 6, while lifting the hood 4 upward.

The hood 4 is a deformable member and has a high buffer capacity as mentioned above, and therefore the hood 4 serves as a buffer material as it is upon being lifted up by the airbag 10. Accordingly, the impact can be rapidly absorbed in the event of collision.

Figure 33:
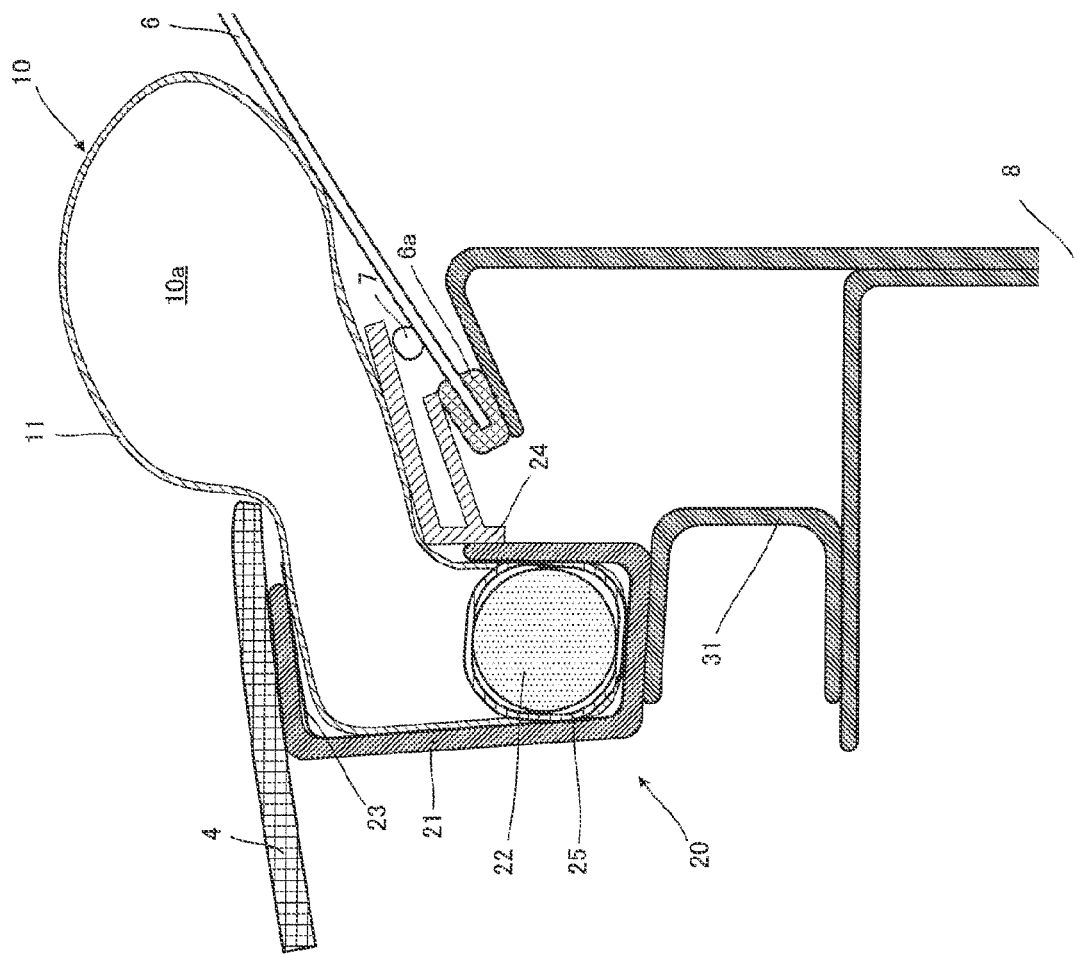
FIG. 33 is a cross-sectional view showing an unfolded state of the airbag unit 20 according to a fourth embodiment.

FIG. 33 is a cross-sectional view showing the unfolded state of the airbag unit 20 according to a fourth embodiment.

The airbag unit 20 according to the fourth embodiment is installed under the hood 4. In the airbag unit 20 according to the fourth embodiment, the airbag 10 is configured to be expanded through between the hood 4 and the windshield 6. In addition, the airbag 10 includes a portion expanded under the hood 4.

The hood 4 is a deformable member and has a high buffer capacity as mentioned above, and therefore the hood 4 and the airbag 10 expanded under the hood 4 can collaborate to serve as a buffer material. Accordingly, the impact can be rapidly absorbed in the event of collision.

Figure 34:
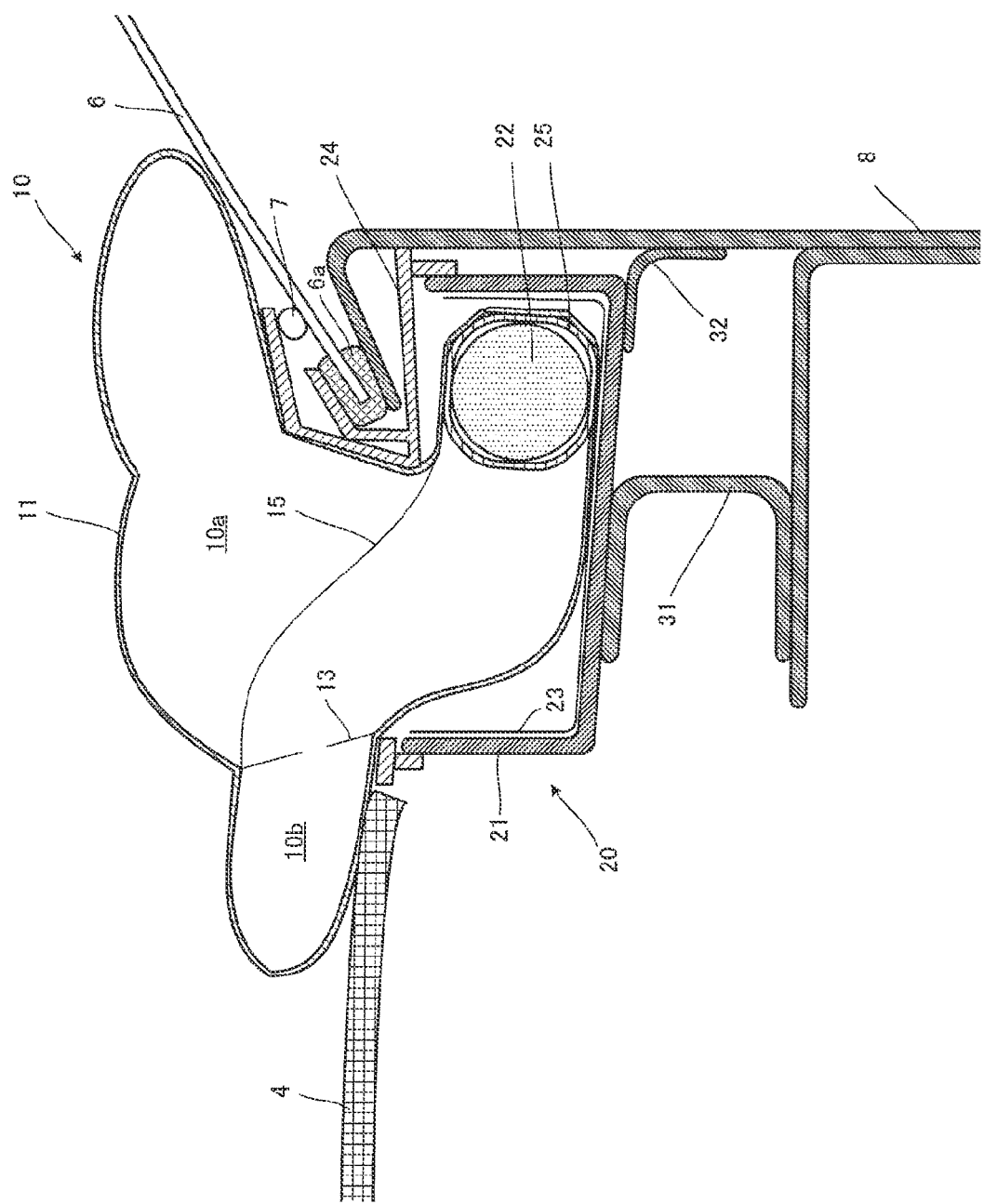
FIG. 34 is a cross-sectional view showing an unfolded state of the airbag unit 20 according to a fifth embodiment.

FIG. 34 is a cross-sectional view showing the unfolded state of the airbag unit 20 according to a fifth embodiment.

In the airbag unit 20 according to the fifth embodiment, the gas generator 22 is located on the rear side of the folded airbag 10 as shown in FIG. 34, and at a lower position such that a part of the gas generator 22 overlaps the windshield 6 and the wiper 7 in a view from above. In addition, in the airbag unit 20 according to the fifth embodiment the airbag 10 is located between the hood 4 and the windshield 6 so that the airbag 10 is expanded through between the hood 4 and the windshield 6. Further, the lower cover unit 21 is attached to the bulkhead 8 via a second bracket 32, and therefore the airbag unit 20 can be more firmly attached to the bulkhead 8, which is a member on the side of the vehicle body.

Figure 35:
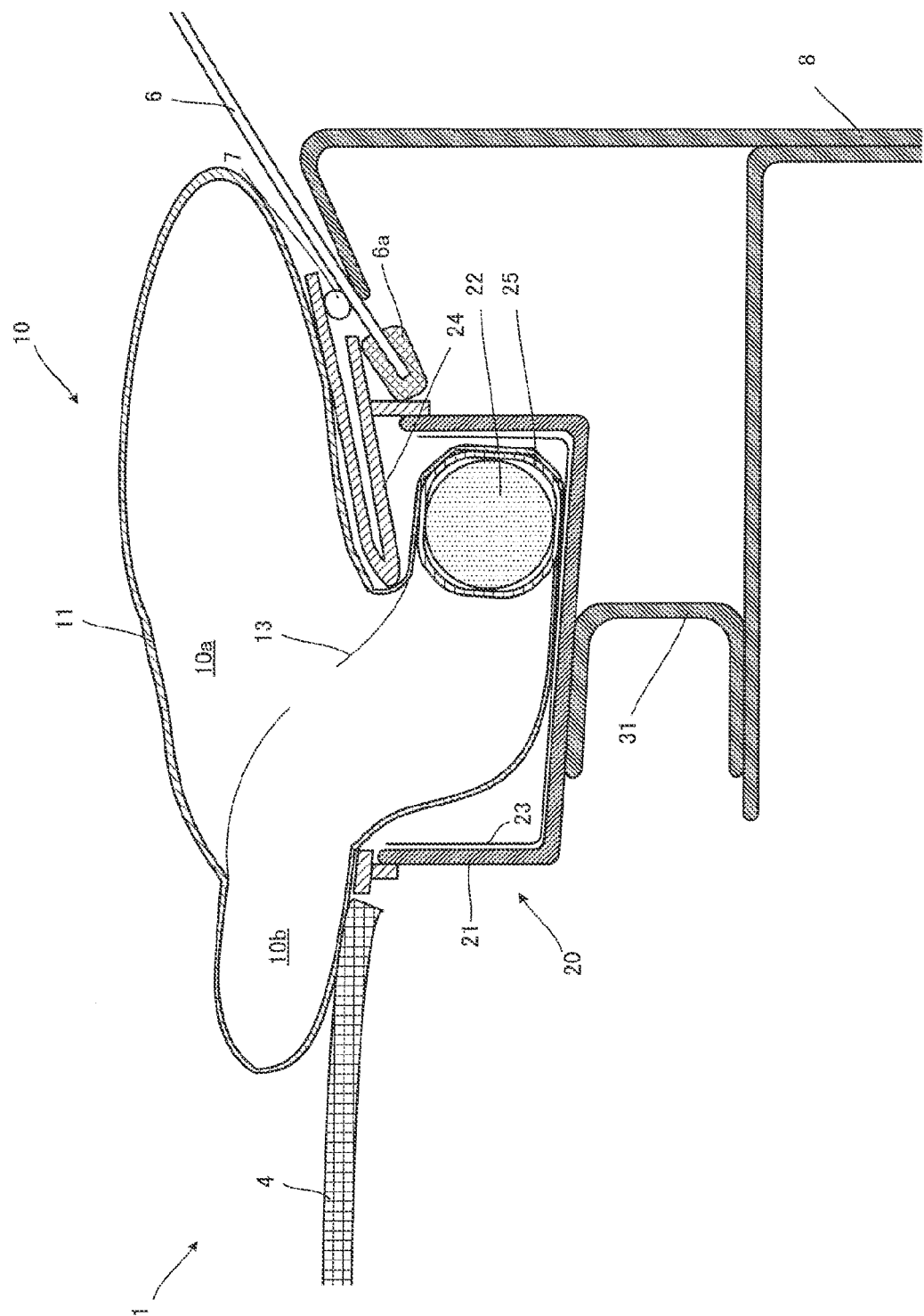
FIG. 35 is a cross-sectional view showing an unfolded state of the airbag unit 20 according to a sixth embodiment.
Figure 36:
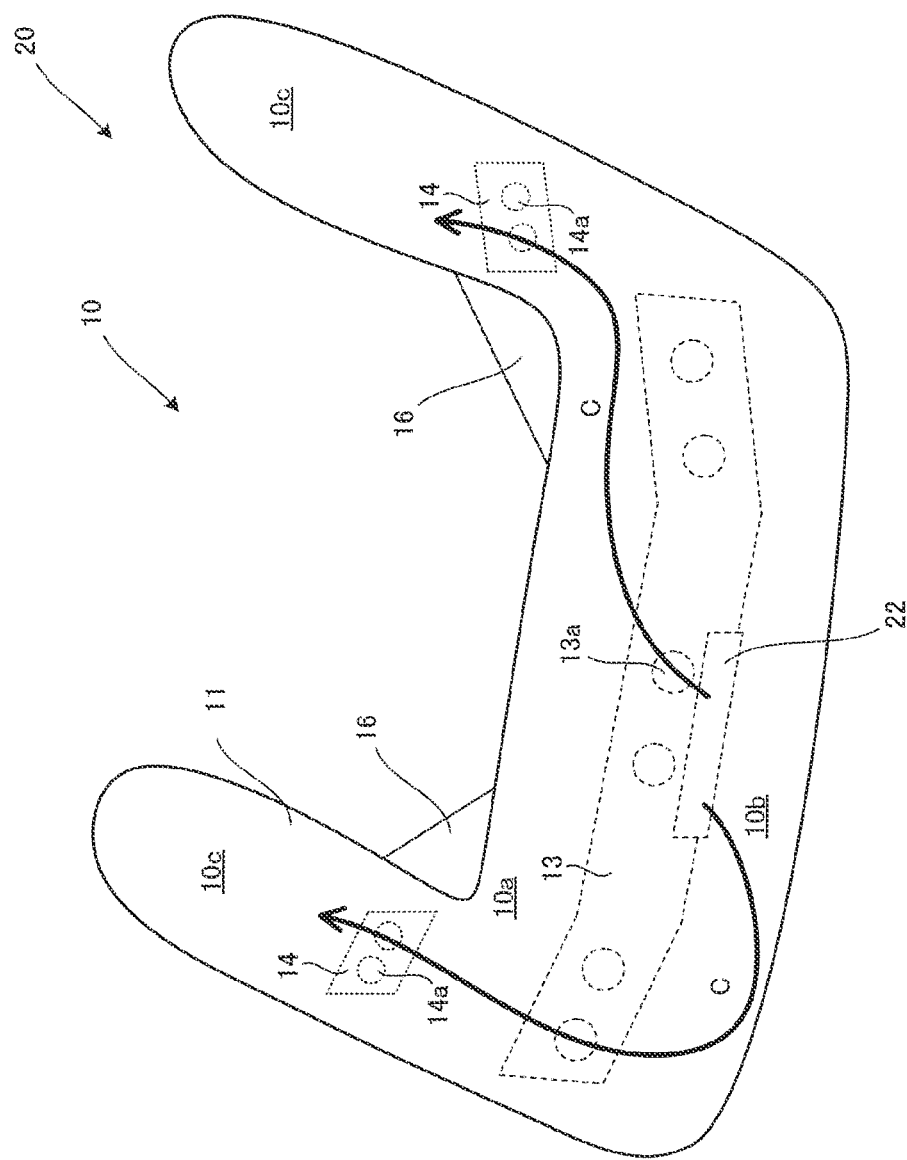
FIG. 36 is a schematic perspective view showing how gas flows in the airbag 10 when the airbag unit 20 according to the sixth embodiment is expanded.

FIG. 35 is a cross-sectional view showing the unfolded state of the airbag unit 20 according to a sixth embodiment. FIG. 36 is a schematic perspective view showing how the gas flows in the airbag 10 when the airbag unit 20 according to the sixth embodiment is unfolded.

In the airbag unit 20 according to the sixth embodiment, the gas generator 22 is located inside the second unfolding portion 10b, and the diffuser cloth 15 of the first embodiment shown in FIG. 23 is excluded.

Because of such a configuration, in the airbag unit 20 according to the sixth embodiment the gas mainly flows along a third route C shown in FIG. 36. The gas ejected from the gas generator 22 first flows to the second unfolding portion 10b. Here, although FIG. 36 shows two arrows indicating the third route C, these arrows merely indicate a typical flow of the gas and actually various gas flows are formed in each gas passage.

Along the third route C, the gas passes through the gas passage 13a from the side of the second unfolding portion 10b and flows into the first unfolding portion 10a. Then the gas passes through the gas passage 14a from the side of the first unfolding portion 10a and flows into the third unfolding portion 10c.

As shown in FIG. 36, the gas flows along the third route C in the airbag unit 20 according to the sixth embodiment. Therefore, the second unfolding portion 10b first starts to expand and then the first unfolding portion 10a starts to expand, after which the third unfolding portion 10c starts to expand.

Figure 37:
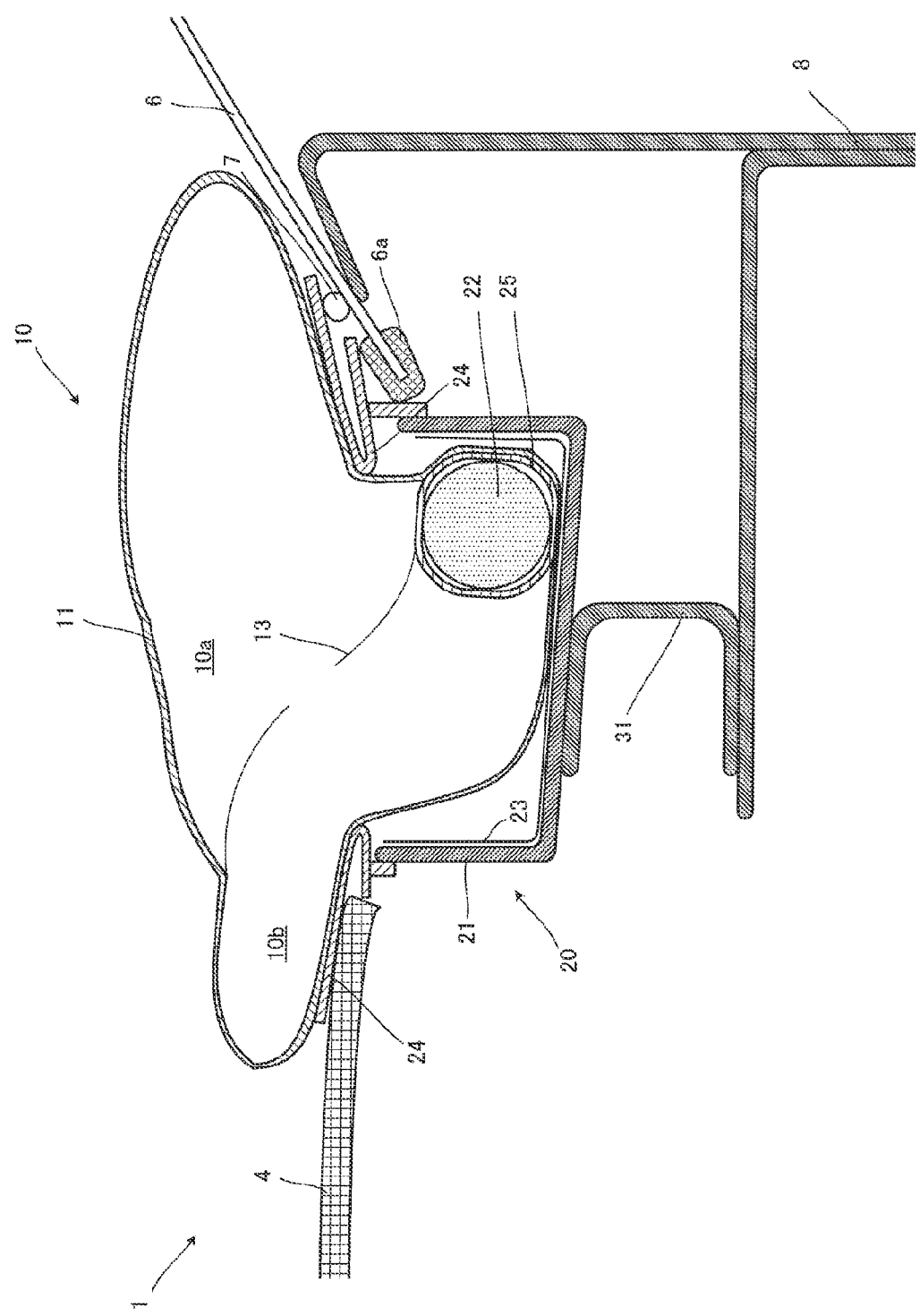
FIG. 37 is a cross-sectional view showing an unfolded state of the airbag unit 20 according to a seventh embodiment.

FIG. 37 is a cross-sectional view showing the unfolded state of the airbag unit 20 according to a seventh embodiment.

The airbag unit 20 according to the seventh embodiment is configured such that the upper cover unit 24 is opened both to the side of the hood 4 and to the side of the windshield 6 at the time of expansion. In other words, the upper cover unit 24 includes the tear lines arranged in an H-shape. Therefore, the upper cover unit 24 is opened so as to be overlaid onto a part of the hood 4 and the wiper 7.

Since the upper cover unit 24 is thus opened both to the side of the hood 4 and to the side of the windshield 6 at the time of expansion, the airbag 10 can be prevented from intruding in the space under the hood 4 and being damaged, and also the wiper 7 can be prevented from being damaged.

Folding methods of the airbag 10 will now be described hereunder.

FIGS. 38(a) to 38(c) and FIGS. 39(a) to 39(d) are schematic perspective views for explaining a folding method of the airbag 10 according to a first working example.

Figure 38:
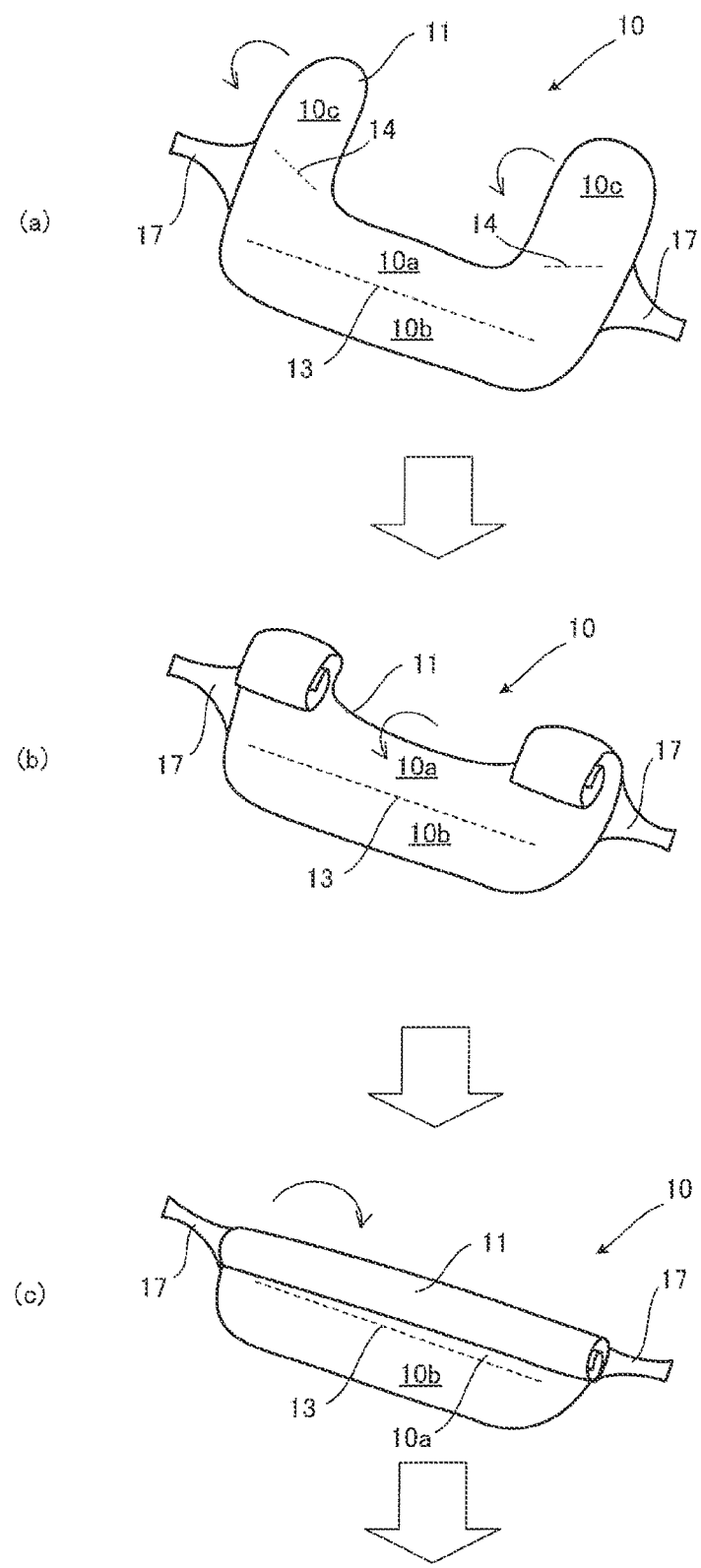
FIGS. 38(a) to 38(c) are schematic perspective views for explaining a folding method of the airbag 10 according to a first working example.

First, the airbag 10 according to the first embodiment is spread as shown in FIG. 38(a). Then the pair of third unfolding portions 10c are folded from the distal end toward the first unfolding portion 10a, to a position close to the projection inner tether 14 as shown in FIG. 38(b). To fold the third unfolding portion 10c, it is preferable to first roll the distal end of the third unfolding portion 10c in one direction away from the vehicle body. Rolling the third unfolding portion 10c in one direction facilitates the airbag to be accommodated in the cover units, and allows smooth expansion of the airbag along the front pillars 2 and the windshield 6 shown in FIG. 13. Alternatively, the third unfolding portion 10c may be folded in a bellows shape.

Then as shown in FIG. 38(c), the airbag 10, including a part of the first unfolding portion 10a, is folded to a position close to the bottom inner tether 13.

Figure 39:
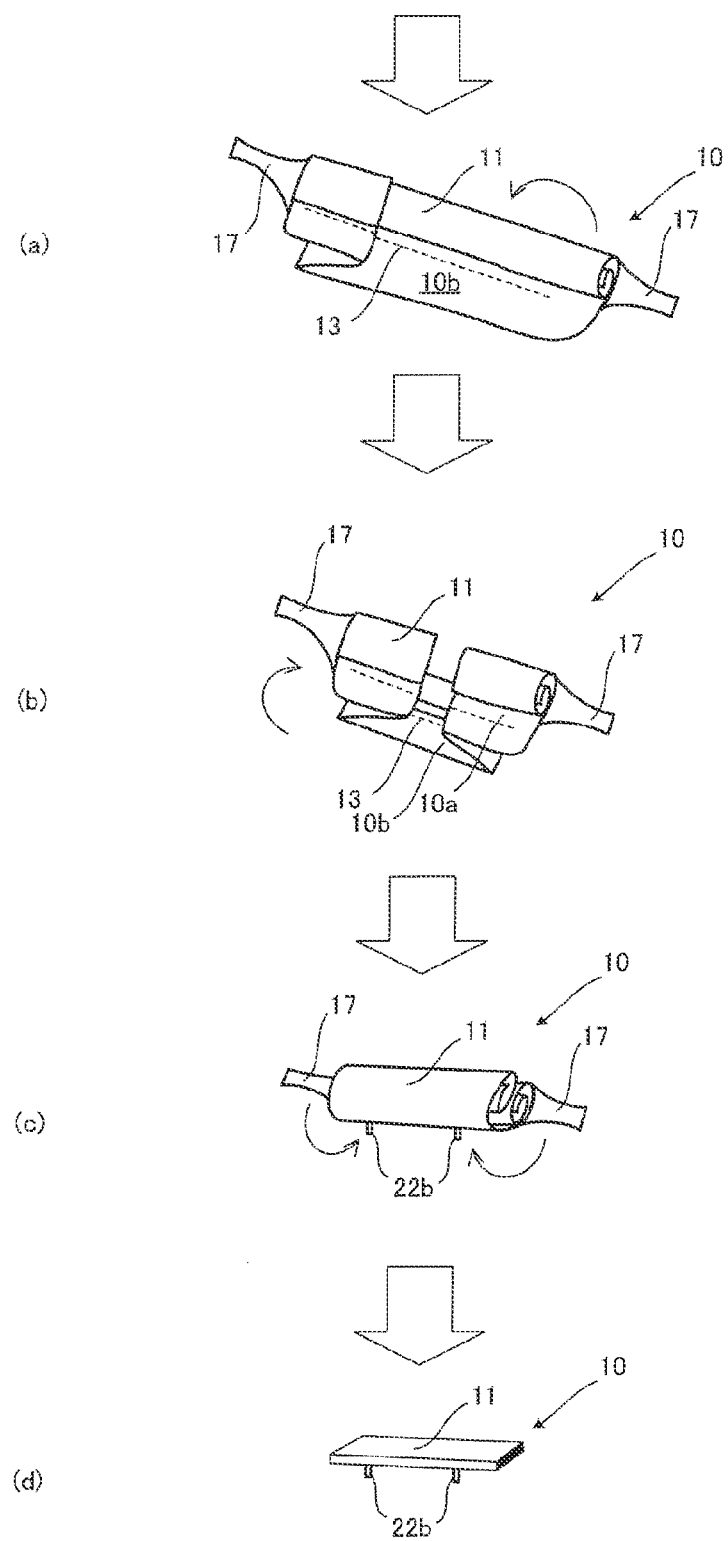
FIGS. 39(a) to 39(d) are schematic perspective views for explaining the folding method of the airbag 10 according to the first working example.

Proceeding to FIG. 39(a), an end portion of each of the first unfolding portion 10a and the second unfolding portion 10b of the airbag 10 on the same side in the longitudinal direction is folded in a bellows shape, in other words in a Z-shape. Then the other end portion of each of the first unfolding portion 10a and the second unfolding portion 10b of the airbag 10 in the longitudinal direction is folded in a Z-shape, as shown in FIG. 39(b).

Preferably, the number of folding times of the third unfolding portion 10c toward the first unfolding portion 10a may be greater than the number of folding times of the longitudinal end portions of the first unfolding portion 10a, the second unfolding portion 10b, and the third unfolding portion 10c.

The second unfolding portion 10b of the airbag 10 is then folded toward the first unfolding portion 10a, as shown in FIG. 39(c).

Finally, as shown in FIG. 39(d), after the crushing tethers 17 are attached to the bolt portion of the gas generator holder 22b, the shape of the folded airbag 10 is adjusted for placing the airbag 10 in the bag case 23 shown in FIG. 6(b). To adjust the shape of the airbag 10, a packing cloth or the like may be employed to wrap the airbag 10. In this case, it is preferable to hook the packing cloth on the attaching bracket for fastening the gas generator holder 22b and the crushing tether 17.

Folding thus the airbag 10 according to the first working example as illustrated in FIGS. 38(a) to 38(c) and FIGS. 39(a) to 39(d) enables the airbag 10 to be unfolded according to the sequence of the gas flow shown in FIG. 20 and FIG. 36.

In the case of the example shown in FIG. 20, when the gas is ejected from the gas generator 22, the majority of the gas is immediately made to flow by the diffuser cloth 15 from the first unfolding portion 10a into the second unfolding portion 10b, and therefore the second unfolding portion 10b of the airbag 10, to be unfolded over the hood 4 of the vehicle 1 shown in FIG. 21, is first unfolded. In the case of the sixth embodiment shown in FIG. 36, since the gas starts to flow from the side of the second unfolding portion 10b, the second unfolding portion 10b of the airbag 10, to be unfolded over the hood 4 of the vehicle 1 shown in FIG. 21, is first unfolded.

Folding thus the second unfolding portion 10b of the airbag 10 at the final step allows the second unfolding portion 10b to be first unfolded. Therefore, in the event of collision with a pedestrian, the airbag is rapidly unfolded from the portion corresponding to a region over the hood, which is closer to the pedestrian, so that the pedestrian can be effectively protected.

In addition, an end portion of each of the first unfolding portion 10a and the second unfolding portion 10b of the airbag 10 on the same side in the longitudinal direction is folded in a Z-shape. The mentioned folding method increases the expanding speed of the airbag 10 in the width direction of the vehicle 1 shown in FIG. 21, thereby allowing the airbag 10 to be rapidly unfolded over the entire width of the hood 4. As a result, the third unfolding portion 10c supposed to cover the front pillar 2 shown in FIG. 22 can also be rapidly unfolded.

Further, it is known that the airbag 10 imposes a strongest impact on the peripheral parts in the initial stage of the expansion when the first lot of the gas is ejected from the gas generator 22. However, in the airbag 10 configured as above the first unfolding portion 10a to be unfolded over the wiper 7 shown in FIG. 21 starts to expand after the second unfolding portion 10b is expanded, and therefore the impact of the first unfolding portion 10a against the wiper 7 can be mitigated.

FIGS. 40(a) to 40(d) are schematic perspective views for explaining a folding method of the airbag 10 according to a second working example.

Figure 40:
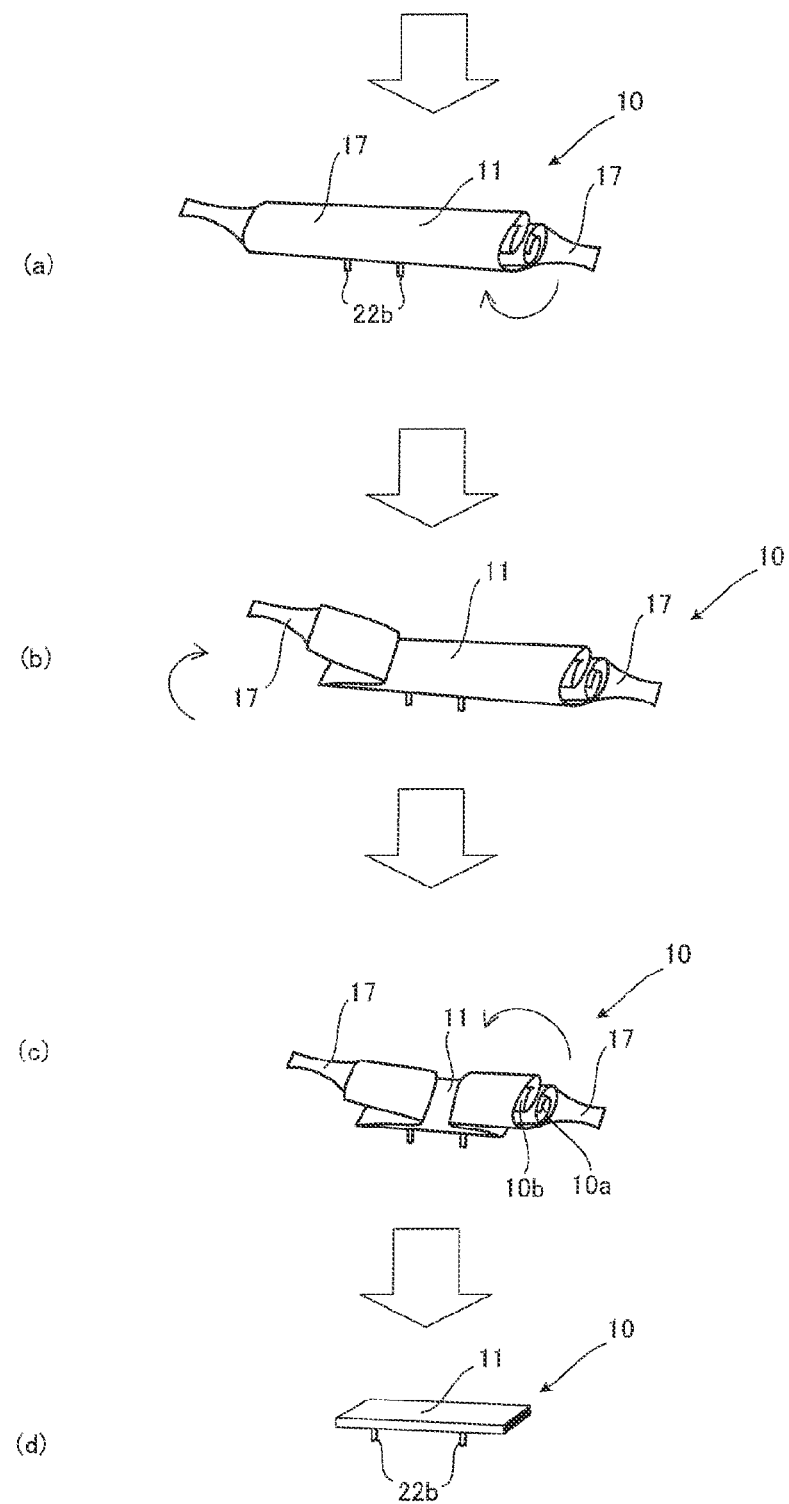
FIGS. 40(a) to 40(d) are schematic perspective views for explaining a folding method of the airbag 10 according to a second working example.

The example shown in FIGS. 40(a) to 40(d) may follow the step shown in FIG. 38(c). In other words, after the airbag 10 including a part of the first unfolding portion 10a is folded to a position close to the bottom inner tether 13 as shown in FIG. 38(c), the step shown in FIG. 40(a) is performed.

In the folding method of the airbag 10 according to the second working example, after the step shown in FIG. 38(c) the second unfolding portion 10b of the airbag 10 is folded toward the first unfolding portion 10a as shown in FIG. 40(a).

Then as shown in FIG. 40(b), an end portion of each of the first unfolding portion 10a, the second unfolding portion 10b, and the third unfolding portion 10c of the airbag 10 on the same side in the longitudinal direction is folded in a bellows shape, in other words in a Z-shape. Then the other end portion of each of the first unfolding portion 10a, the second unfolding portion 10b, and the third unfolding portion 10c of the airbag 10 in the longitudinal direction is folded in a Z-shape, as shown in FIG. 40(c).

Preferably, the number of folding times of the third unfolding portion 10c toward the first unfolding portion 10a as shown in FIG. 38(b) may be greater than the number of folding times of the longitudinal end portions of the first unfolding portion 10a, the second unfolding portion 10b, and the third unfolding portion 10c as shown in FIG. 40(c).

Finally, as shown in FIG. 40(d), after the crushing tethers 17 are attached to the bolt portion of the gas generator holder 22b, the shape of the folded airbag 10 is adjusted for placing the airbag 10 in the bag case 23 shown in FIG. 6(b).

Folding the airbag 10 according to the second working example shown in FIGS. 40(a) to 40(d) enables the gas to rapidly flow into the third unfolding portion 10c upon expanding the airbag 10.

FIGS. 41(a) to 41(c) and FIGS. 42(a) to 42(d) are schematic perspective views for explaining a folding method of the airbag 10 according to a third working example. For the sake of clearer understanding, some of the drawings are accompanied with a side view.

Figure 41:
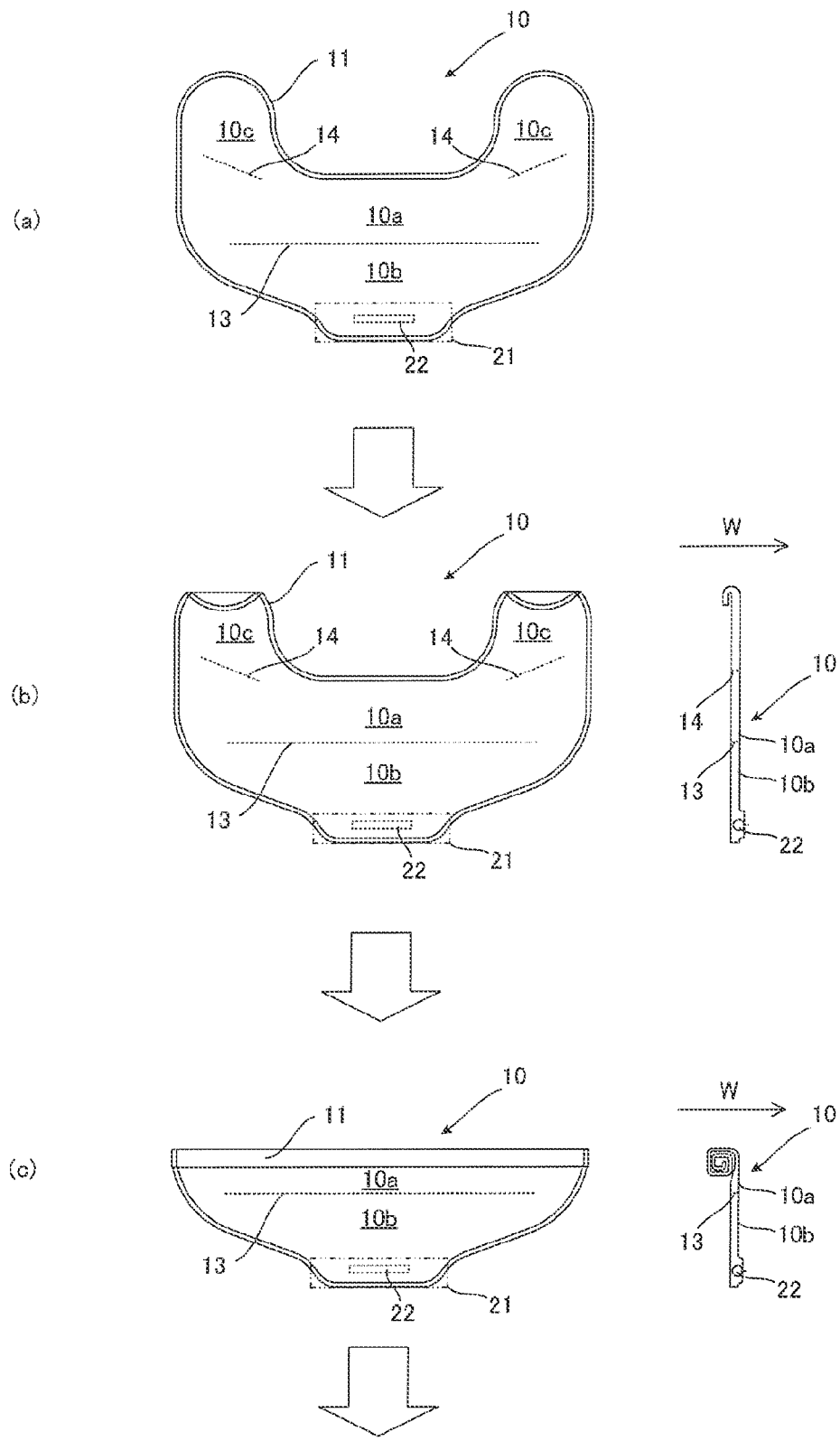
FIGS. 41(a) to 41(c) are schematic perspective views for explaining a folding method of the airbag 10 according to a third working example.

The folding method of the airbag 10 according to the third working example is appropriate for the airbag 10 that expands from under the hood 4 as shown in FIG. 32. First, the airbag 10 according to the first embodiment is spread as shown in FIG. 41(a). Then the pair of third unfolding portions 10c are folded from the distal end toward the first unfolding portion 10a in a roll shape, to a position close to the projection inner tether 14 as shown in FIG. 41(b). To fold the third unfolding portion 10c, it is preferable to first roll the distal end of the third unfolding portion 10c in one direction away from the vehicle body. In other words, the third unfolding portion 10c is rolled in a direction opposite to an arrow W in FIG. 41(b) indicating the direction of the windshield 6 shown in FIG. 13.

Then as shown in FIG. 41(c), the airbag 10, including a part of the first unfolding portion 10a, is folded to a position close to the bottom inner tether 13.

Figure 42:
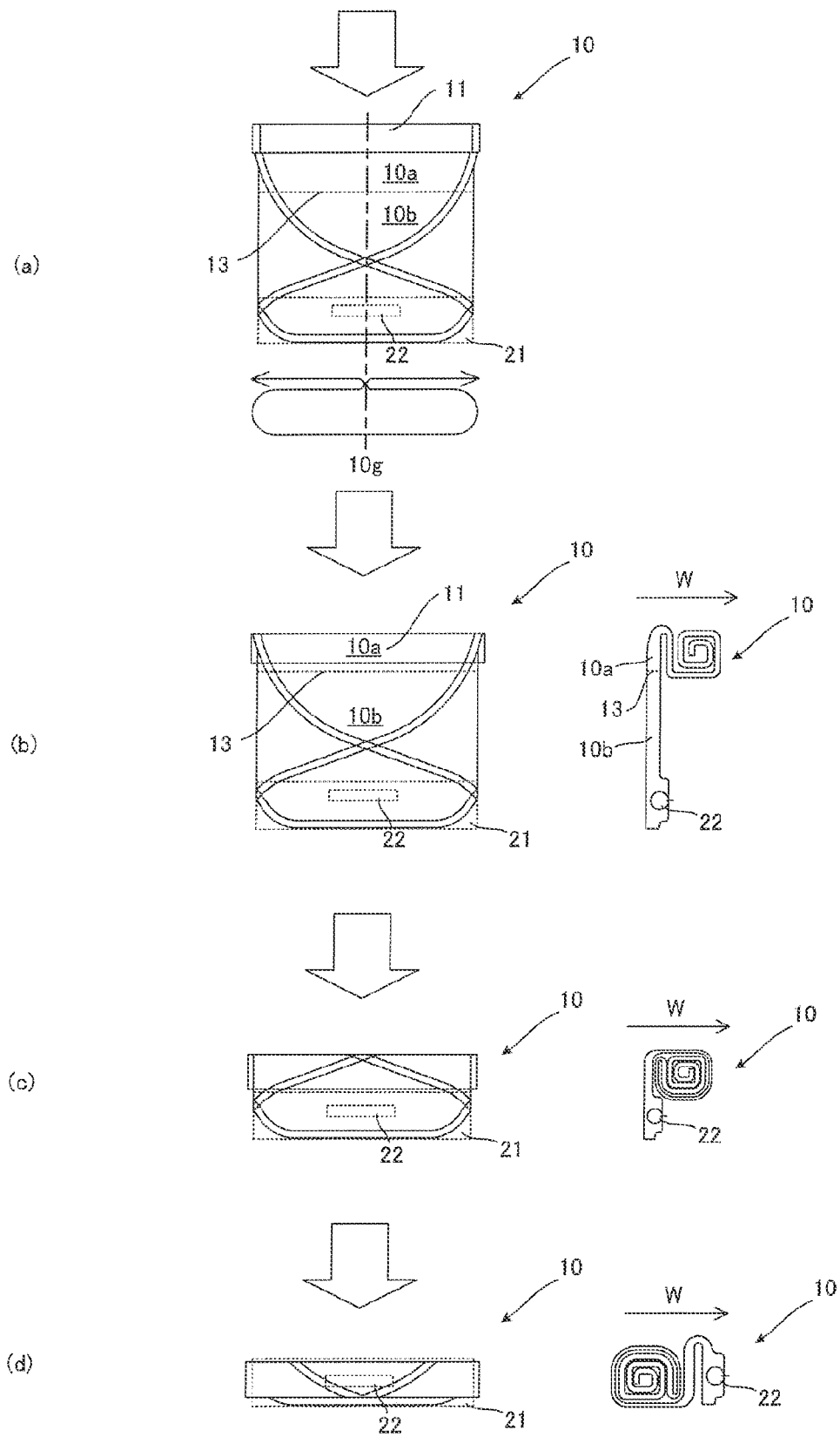
FIGS. 42(a) to 42(d) are schematic perspective views for explaining the folding method of the airbag 10 according to the third working example.

Proceeding to FIG. 42(a), the both end portions of the first unfolding portion 10a and the second unfolding portion 10b of the airbag 10 in the longitudinal direction are folded in a bellows shape, in other words in a Z-shape. In this case, it is preferable that the portions outwardly folded back meet at the center 10g in the left-right direction.

Then the upper portion of the airbag 10, thus far rolled in a direction away from the vehicle body, is rolled in the opposite direction, i.e., toward the vehicle body, as shown in FIG. 42(b). In other words, the upper portion of the airbag 10 is rolled in the direction of the arrow W in FIG. 42(b) indicating the direction of the windshield 6 shown in FIG. 13. The airbag 10 is then further rolled several times as shown in FIG. 42(c). Finally, as shown in FIG. 42(d), the airbag 10 set in a roll shape is turned by 180 degrees and placed on the rear side of the gas generator 22. Thereafter, the folded airbag 10 is placed in the lower cover unit 21.

By folding the both end portions of the first unfolding portion 10a and the second unfolding portion 10b of the airbag 10 in the longitudinal direction in a bellows shape, i.e., in a Z-shape as shown in FIGS. 41(a) to 41(c) and FIGS. 42(a) to 42(d) according to the third working example, the expanding speed in the width direction of the vehicle 1 shown in FIG. 21 can be increased, and therefore the airbag 10 can be rapidly unfolded over the entire width of the hood 4 of the vehicle 1. Consequently, the third unfolding portion 10c supposed to cover the front pillar 2 shown in FIG. 22 can also be rapidly unfolded.

In particular, changing the rolling direction of the airbag 10 as shown in FIG. 41(c) and FIG. 42(b) results in a change of the direction of moment in the unfolding motion of the roll, thereby assisting the first unfolding portion 10a to be unfolded halfway in the vehicle width direction, instead of allowing the first unfolding portion 10a to be straightly unfolded all the way at a time.

FIGS. 43(a) to 43(c) and FIGS. 44(a) to 44(d) are schematic perspective views for explaining a folding method of the airbag 10 according to a fourth working example. For the sake of clearer understanding, some of the drawings are accompanied with a side view.

Figure 43:
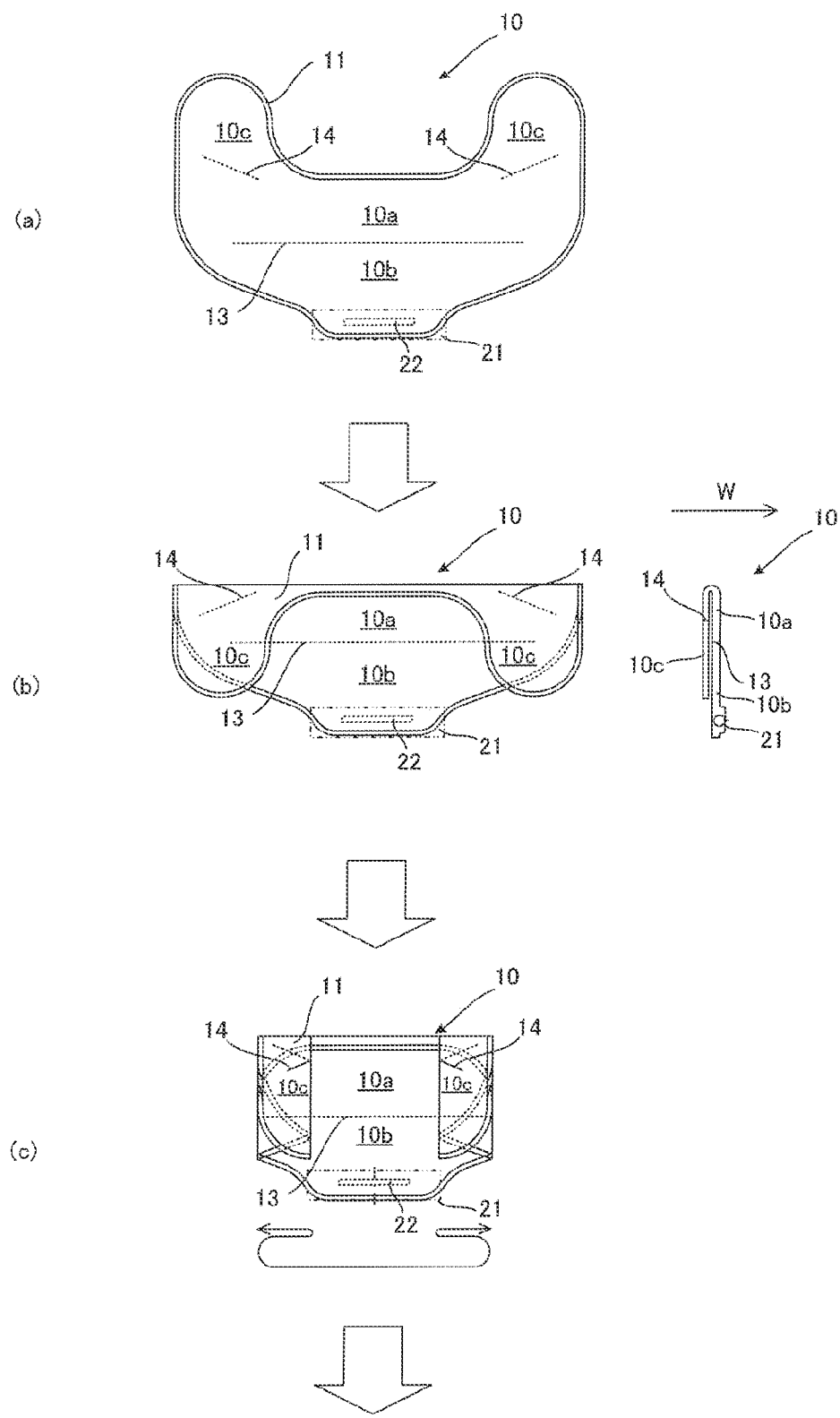
FIGS. 43(a) to 43(c) are schematic perspective views for explaining a folding method of the airbag 10 according to a fourth working example.

The folding method of the airbag 10 according to the fourth working example is appropriate for the airbag 10 that expands from under the hood 4 as shown in FIG. 32. First, the airbag 10 according to the first embodiment is spread as shown in FIG. 43(a). Then the pair of third unfolding portions 10c and a part of the upper portion of the first unfolding portion 10a are largely folded toward the second unfolding portion 10b as shown in FIG. 43(b). Here, the part of the upper portion of the first unfolding portion 10a may be left unfolded.

Then as shown in FIG. 43(c), the both end portions of the first unfolding portion 10a and the second unfolding portion 10b in the longitudinal direction are folded in a bellows shape, in other words in a Z-shape. At this step, it is preferable to fold such that the portions outwardly folded back are spaced from each other. For example, 300 mm of the end portions may be folded from the respective sides toward the center, and then 150 mm of the distal end portions on the respective sides may be folded back outwardly.

Figure 44:
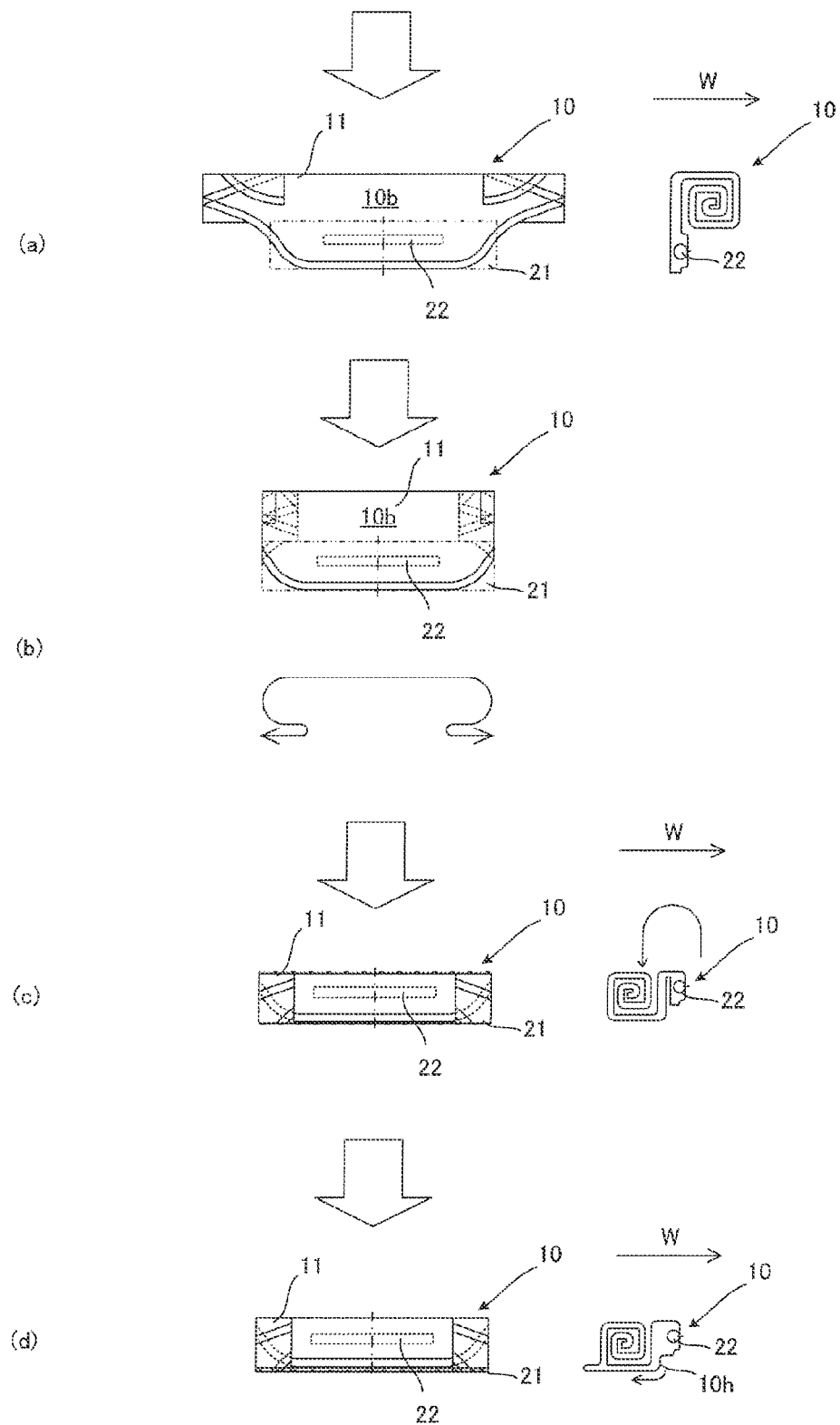
FIGS. 44(a) to 44(d) are schematic perspective views for explaining the folding method of the airbag 10 according to the fourth working example.

Proceeding to FIG. 44(a), the upper portion of the airbag 10 is rolled toward the vehicle body. In other words, the upper portion of the airbag 10 is rolled in the direction of an arrow W in FIG. 44(a) indicating the direction of the windshield 6 shown in FIG. 13. Then the both end portions of the first unfolding portion 10a and the second unfolding portion 10b in the longitudinal direction, which are already folded in the Z-shape, are again folded in a bellows shape, in other words in a Z-shape, as shown in FIG. 44(b).

Then as shown in FIG. 44(c), the airbag 10 set in the roll shape is turned by 180 degrees and placed on the rear side of the gas generator 22. Finally, a part 10h of the airbag 10 caught between the gas generator 22 and the portion set in the roll shape is drawn out to the opposite side of the gas generator 22, as shown in FIG. 44(d). Thereafter, the airbag 10 folded as above is placed in the lower cover unit 21 shown in FIG. 6(d).

By folding the both end portions of the first unfolding portion 10a and the second unfolding portion 10b of the airbag 10 in the longitudinal direction in a bellows shape, i.e., in a Z-shape as shown in FIGS. 43(a) to 43(c) and FIGS. 44(a) to 44(d) according to the fourth working example, the expanding speed in the width direction of the vehicle 1 shown in FIG. 21 can be increased, and therefore the airbag 10 can be rapidly unfolded over the entire width of the hood 4 of the vehicle 1. Consequently, the third unfolding portion 10c supposed to cover the front pillar 2 shown in FIG. 22 can also be rapidly unfolded.

In particular, the airbag 10 is folded in the vertical direction as shown in FIG. 43(b) and FIG. 44(a), and then the both end portions in the longitudinal direction are folded as shown in FIG. 43(c) and FIG. 44(b). Accordingly, the airbag 10 is alternately folded in the vertical direction and in the longitudinal direction, which improves the balance of the expanding performance. Further, at the step of FIG. 44(d), the part 10h of the airbag 10 caught between the gas generator 22 and the portion set in the roll shape is drawn out to the opposite side of the gas generator 22, and therefore the gas can smoothly flow in the airbag 10 upon being ejected from the gas generator 22, so as to rapidly unfold the airbag 10.

FIGS. 45(a) to 45(c) and FIGS. 46(a) to 46(c) are schematic perspective views for explaining a folding method of the airbag 10 according to a fifth working example. For the sake of clearer understanding, some of the drawings are accompanied with a side view.

Figure 45:
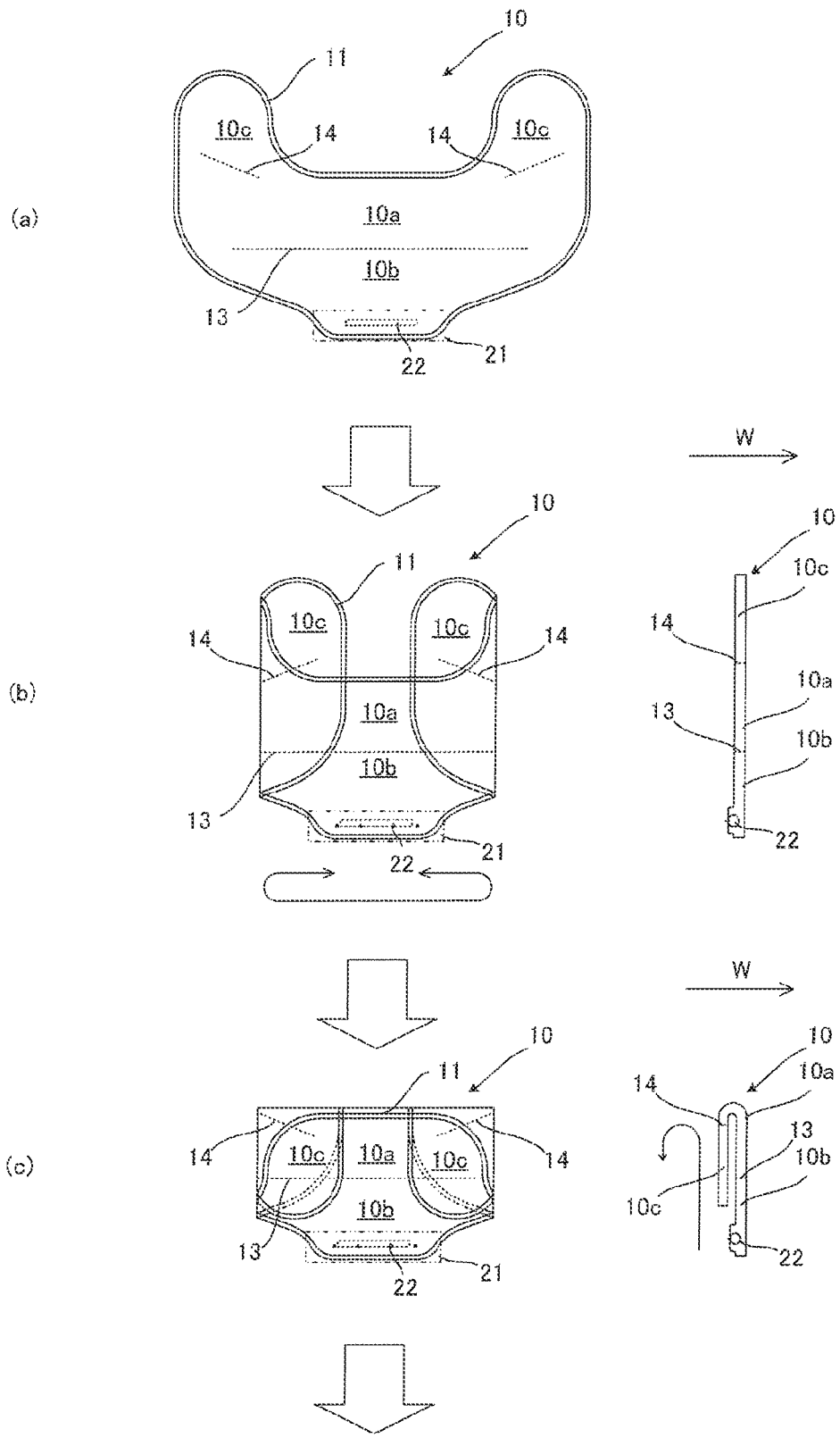
FIGS. 45(a) to 45(c) are schematic perspective views for explaining a folding method of the airbag 10 according to a fifth working example.

The folding method of the airbag 10 according to the fifth working example is appropriate for the airbag 10 that expands from under the hood 4 as shown in FIG. 32. First, the airbag 10 according to the first embodiment is spread as shown in FIG. 45(a). Then the both end portions of the pair of third unfolding portions 10c, the first unfolding portion 10a, and the second unfolding portion 10b are inwardly folded from the side of the windshield 6 shown in FIG. 13, as shown in FIG. 45(b). At this point, a gap is formed between the end portions folded as above. In addition, those end portions may be folded from the opposite side of the windshield 6.

Then as shown in FIG. 45(c), the pair of third unfolding portions 10c and a part of the first unfolding portion 10a are folded. Forming thus a large rectangular shape facilitates the subsequent folding steps.

Figure 46:
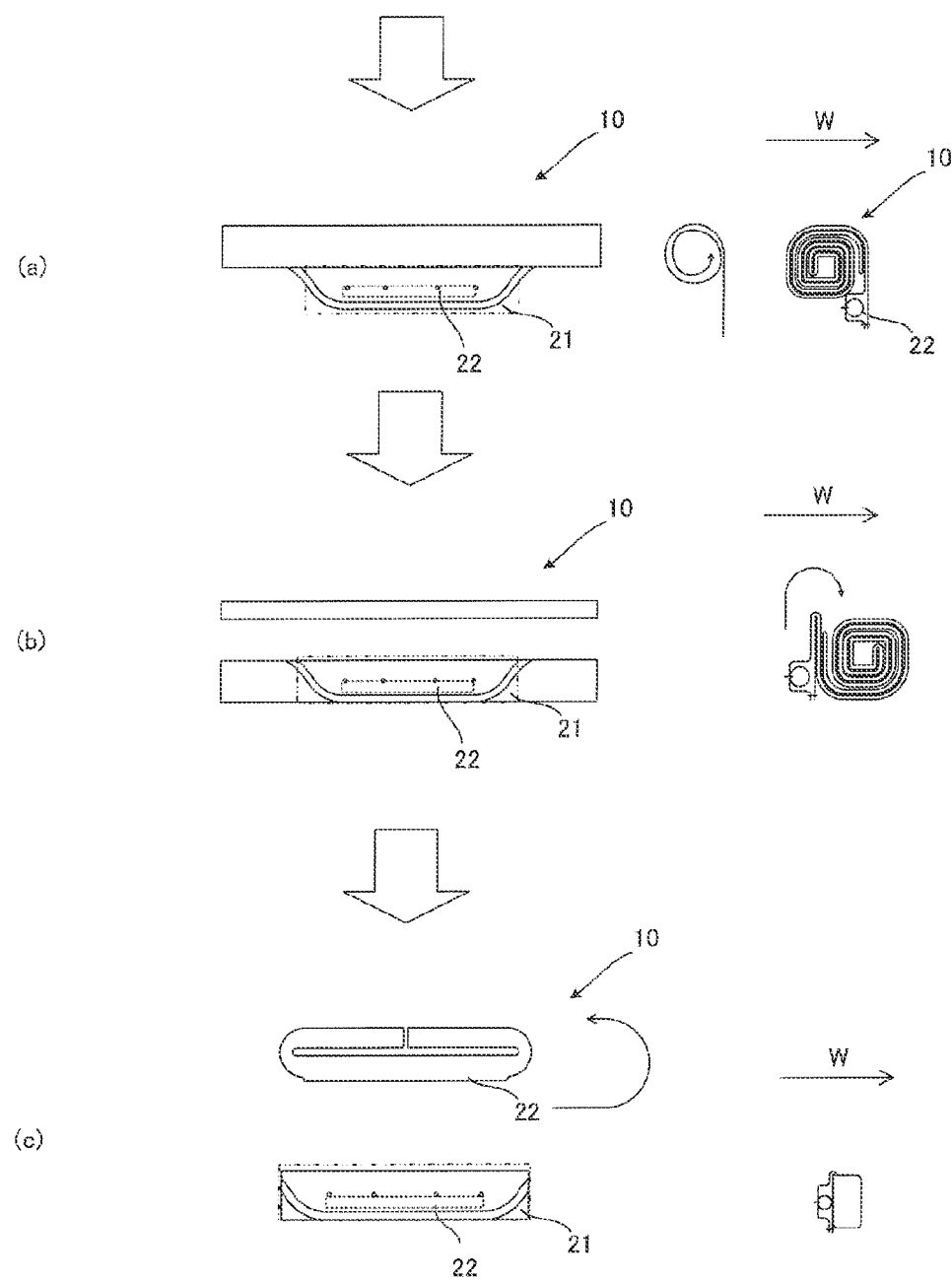
FIGS. 46(a) to 46(c) are schematic perspective views for explaining the folding method of the airbag 10 according to the fifth working example.

Proceeding to FIG. 46(a), an upper portion of the airbag 10 is rolled in the direction away from the vehicle body. In other words, the upper portion of the airbag 10 is rolled in the opposite direction of an arrow W in FIG. 46(a) indicating the direction of the windshield 6 shown in FIG. 13. Then as shown in FIG. 46(b), the airbag 10 set in the roll shape is turned by 180 degrees and placed on the rear side of the gas generator 22. Finally, the both sides of the airbag 10 set in the roll shape are inwardly folded on the opposite side of the gas generator 22, so that the airbag 10 can fit in the width of the lower cover unit 21, as shown in FIG. 46(c). Thereafter, the airbag 10 folded as above is placed in the lower cover unit 21 shown in FIG. 6(d).

According to the fifth working example shown in FIGS. 45(a) to 45(c) and FIGS. 46(a) to 46(c), the both sides of the airbag 10 are inwardly folded at the final step. Therefore, the expanding speed in the width direction of the vehicle 1 shown in FIG. 21 can be increased, and therefore the airbag 10 can be rapidly unfolded over the entire width of the hood 4 of the vehicle 1. Consequently, the third unfolding portion 10c supposed to cover the front pillar 2 shown in FIG. 22 can also be rapidly unfolded.

In addition, setting the airbag 10 in the roll shape as shown in FIG. 46(b) and squeezing out the airbag 10 as a rolled body at the time of expansion allows the airbag 10 to be properly ejected from the lower cover unit 21 thus to be smoothly expanded.

Figure 47:
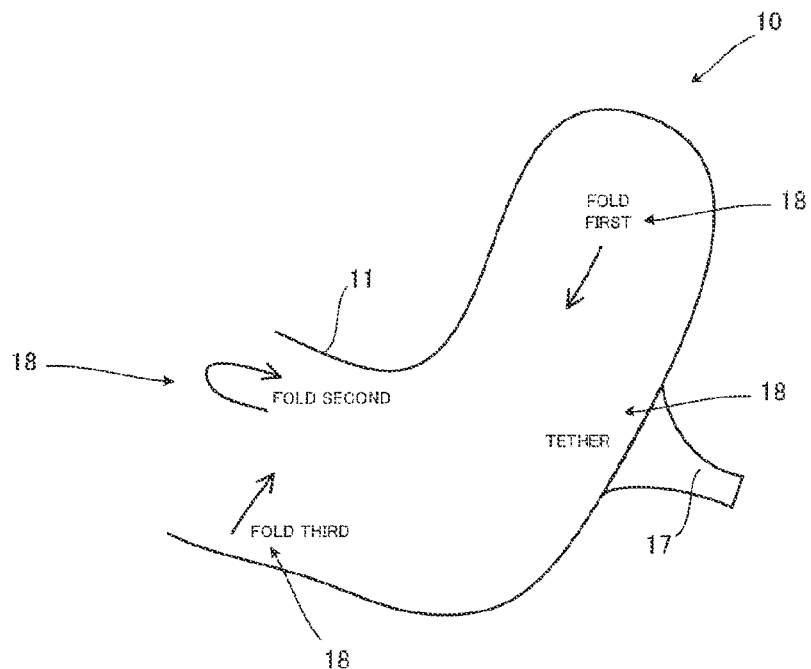
FIG. 47 is a schematic drawing showing a part of the airbag 10 indicating the folding method.

FIG. 47 is a schematic drawing showing a part of the airbag 10 indicating the folding method.

The airbag 10 may include, on the surface thereof, markings 18 indicating the folding method. It is preferable to provide, for example as shown in FIG. 47, at least one of the folding sequence such as "Fold first", a folding method such as an arrow, and the name of parts to be used such as "Tether". Examples of the method to provide the markings 18 on the surface of the airbag 10 include hand-writing with a pen, printing with a printer, and stamping.

With the markings 18 indicating the folding method and so forth provided on the surface of the airbag 10, the operator can confirm the folding method while working, to thereby rapidly and properly fold the airbag 10.

Figure 48:
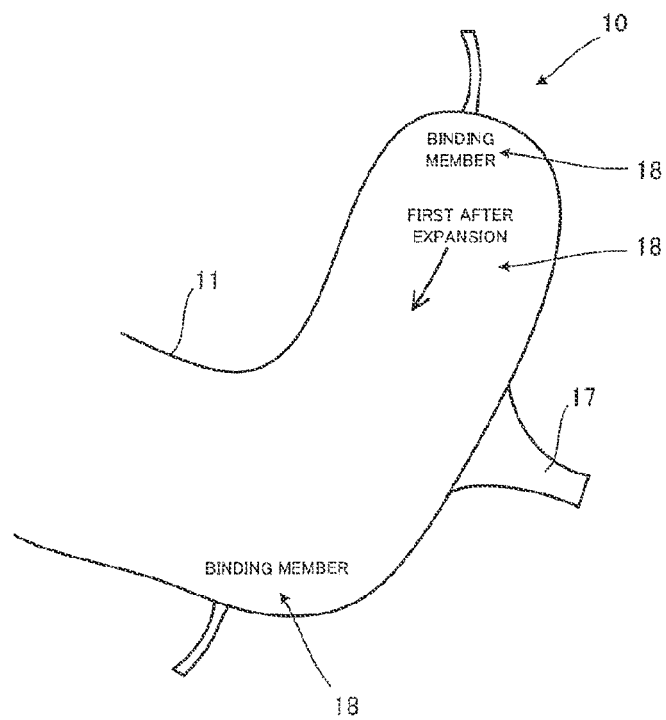
FIG. 48 is a schematic drawing showing a part of the airbag 10 indicating steps to be taken after the airbag 10 is unfolded.

FIG. 48 is a schematic drawing showing a part of the airbag 10 indicating steps to be followed after the airbag 10 is unfolded.

The airbag 10 may include, on the surface thereof, the markings 18 indicating the steps to be followed after the airbag 10 is unfolded. It is preferable to provide, for example as shown in FIG. 48, at least one of the sequence of the steps such as "First after expansion", a processing method after the expansion such as an arrow, and the name of parts to be used after the expansion such as "Binding member". Examples of the method to provide the marking 18 on the surface of the airbag 10 include hand-writing with a pen, printing with a printer, and stamping.

In this example, the airbag 10 that has been unfolded can be packed in a compact size by connecting or adhering a binding member such as a string or a tape, so that the visual field for the occupants can be secured.

With the markings 18 indicating the steps to be followed after the expansion provided on the surface of the airbag 10, the operator can confirm the steps to be followed after the expansion while working, to thereby rapidly and properly perform those steps after the expansion of the airbag 10.

The airbag 10 may display, on the surface thereof, both the folding method shown in FIG. 47 and the steps to be followed after the expansion shown in FIG. 48. In this case, it is preferable to use different colors or different fonts to display the folding method and the steps to be followed after the expansion.

Therefore, the airbag 10 can be located still closer to the windshield 6 and the front pillar 2, so that the space can be efficiently utilized and the airbag 10 can be rapidly and properly unfolded.

Hereunder, other techniques incorporated in the airbag 10 will be described.

Figure 49:
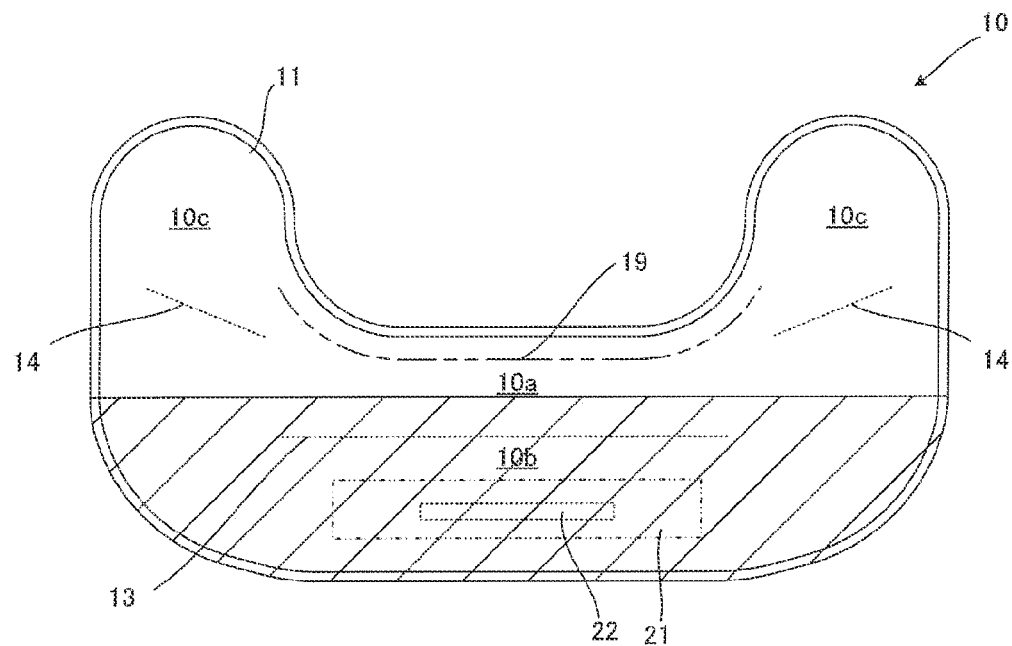
FIG. 49 is a schematic drawing showing an example of a vulnerable stitch portion provided in the airbag 10 according to the first embodiment.

FIG. 49 is a schematic drawing showing an example of a vulnerable stitch portion provided in the airbag 10 according to the first embodiment.

Since the airbag 10 according to the first embodiment is configured to largely spread in the vehicle width direction, the airbag 10 has to be folded into a size smaller than the width of the lower cover unit 21. On the other hand, the airbag 10 has to be capable of rapidly expanding, in order to protect a pedestrian or an object. In particular, the hatched portion of the airbag 10 shown in FIG. 49 is the portion closer to the pedestrian or object, and therefore has to be unfolded especially rapidly.

Accordingly, the airbag 10 according to the first embodiment may include, as shown in FIG. 49, a vulnerable stitch portion 19 formed so as to be torn apart by a predetermined force. The vulnerable stitch portion 19 is formed in an upper region of the first unfolding portion 10a, so as to withstand a low internal pressure in the initial stage of the expansion. When the internal pressure in the airbag 10 increases so that a predetermined force is imposed, the vulnerable stitch portion 19 is torn apart. After the vulnerable stitch portion 19 is torn apart the airbag 10 expands further, so as to assume a shape in which the outer peripheral stitch portion constitutes the outermost edge.

The vulnerable stitch portion 19 serves to substantially reduce the inner capacity of the airbag 10, more precisely the first unfolding portion 10a, at the initial stage of the expansion, and therefore the gas ejected from the gas generator 22 spreads in the width direction of the vehicle 1 shown in FIG. 21 before the vulnerable stitch portion 19 is torn apart. Accordingly, the expansion speed of the airbag 10 can be increased, so that the airbag 10 can be rapidly unfolded over the entire width of the hood 4 of the vehicle 1. In addition, the expanding speed can be increased without increasing the output of the gas generator 22, which allows the airbag unit 20 to be formed in a reduced size. Here, it is preferable that the vulnerable stitch portion 19 is configured to be torn apart within a range of approximately 40 ms to 80 ms.

Figure 50:
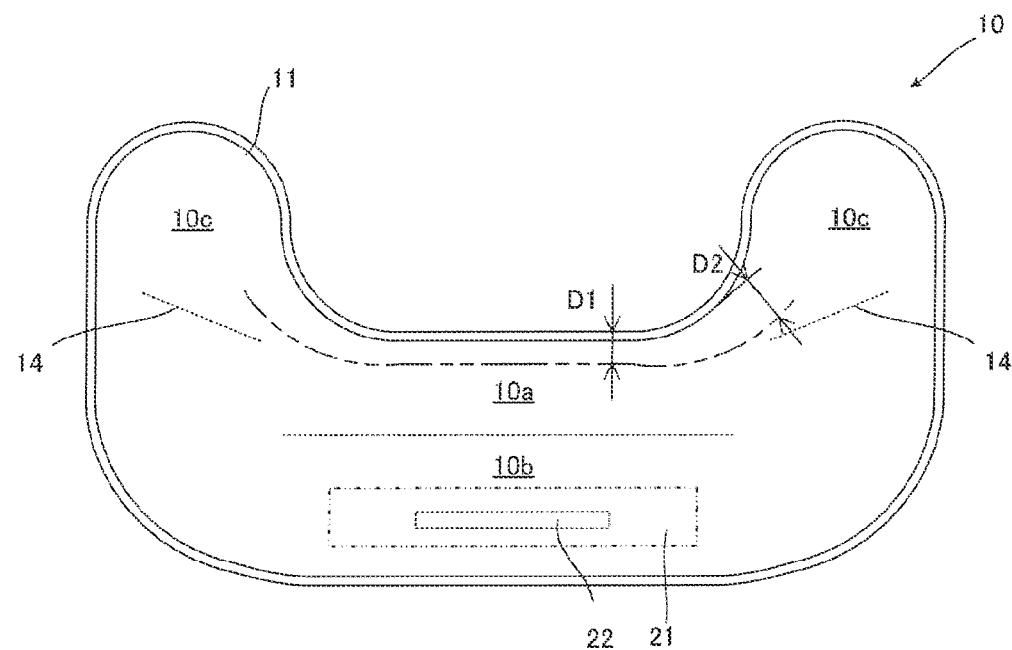
FIG. 50 is a schematic drawing showing another example of the vulnerable stitch portion provided in the airbag 10 according to the first embodiment.

FIG. 50 is a schematic drawing showing another example of the vulnerable stitch portion provided in the airbag 10 according to the first embodiment.

In the vulnerable stitch portion 19 of the airbag 10 according to the first embodiment shown in FIG. 50, a first distance D1 between the central portion of the vulnerable stitch portion 19 and the outer peripheral stitch portion and a second distance D2 between the end portion of the vulnerable stitch portion 19 and the outer peripheral stitch portion are different from each other. Setting the first distance D1 and the second distance D2 to be different from each other allows control of the length of time in which the gas ejected from the gas generator 22 spreads in the width direction of the vehicle 1 shown in FIG. 21.

In the example shown in FIG. 50, the second distance D2 is made longer than the first distance D1. In addition, the width of the vulnerable stitch portion 19 is made wider than the width of the gas generator 22. Accordingly, the end portions of the vulnerable stitch portion 19 are subjected to higher tension than the central portion, and hence apt to be torn apart at an earlier stage. However, while the vulnerable stitch portion 19 is required to be rapidly torn apart, it is also necessary that the vulnerable stitch portion 19 withstands the tension until the airbag 10 expands up to a predetermined size.

With the mentioned configuration, the gas ejected from the gas generator 22 can be caused to spread in the width direction of the vehicle 1 shown in FIG. 21 in a shorter time than in the case where the first distance D1 is equal to the second distance D2. The vulnerable stitch portion 19 may be arranged such that, for example, D1 becomes 50 mm and D2 becomes 100 mm.

Here, it is not mandatory to form the vulnerable stitch portion 19 as a continuous line. The vulnerable stitch portion 19 may be intermittently formed. Further, a plurality of rows of vulnerable stitch portions may be provided, instead of a single row.

Figure 51:
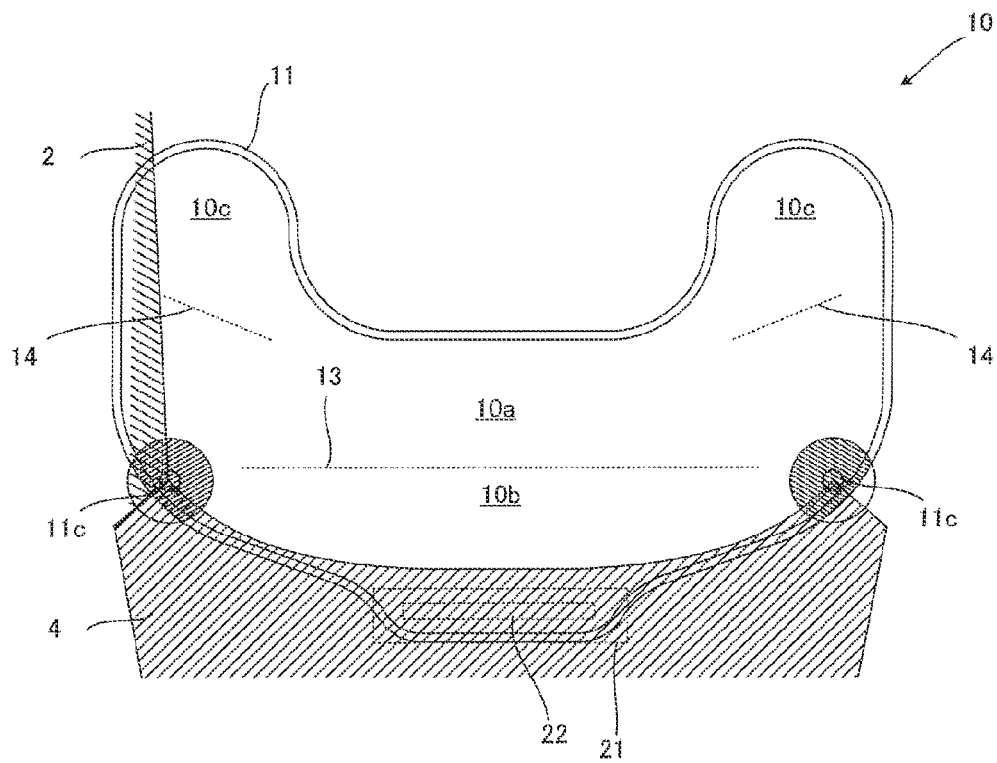
FIG. 51 is a schematic drawing showing an example of a patched portion 11c provided in the airbag 10 according to the first embodiment.
Figure 52:
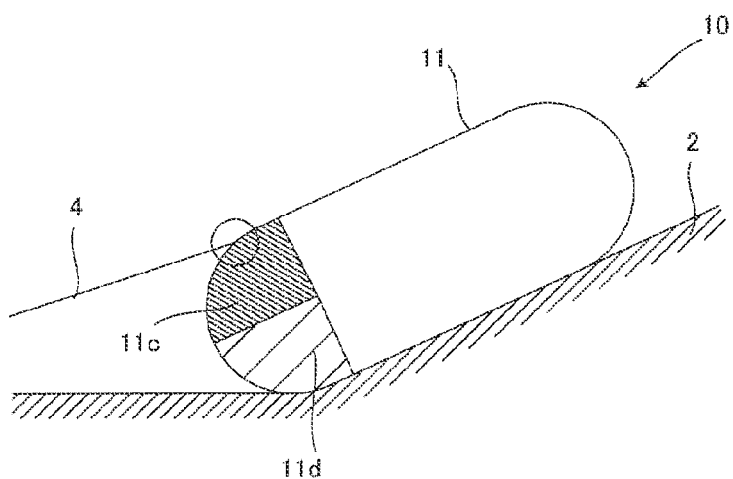
FIG. 52 is a schematic side view of the airbag 10 according to the first embodiment, with the patched portion 11c.

FIG. 51 is a schematic drawing showing an example of the patched portion 11c provided in the airbag 10 according to the first embodiment. FIG. 52 is a schematic side view of the airbag 10 according to the first embodiment, with the patched portion 11c.

The airbag 10 according to the first embodiment may include a patched portion 11c formed by attaching a patch cloth to a predetermined portion of the base cloth 11. It is preferable to form the patched portion 11c at a position of the base cloth 11 to be made to contact the upper edge of the hood 4 when the airbag 10 is unfolded. In addition, the patched portion 11c may include a pressing portion 11d to be made to contact the vehicle body on the back of the portion contacting the upper edge of the hood 4 when the airbag 10 is expanded. Forming thus the patched portion 11c increases the strength of the base cloth 11, thereby protecting the airbag 10 from damage due to the contact with the hood 4. Therefore, the airbag 10 can be properly unfolded.

Forming the patched portion 11c as above is appropriate, for example, for the airbag 10 that lifts up the hood 4 upon being expanded as shown in FIG. 32. The airbag 10 shown in FIG. 32 forms a clearance under the hood 4 by lifting up the hood 4, thus securing a deformation margin in the event of collision with a pedestrian or an object. In such a case, the impact of the collision between the pedestrian and the hood 4 is imposed on the airbag 10 via the hood 4 itself. Therefore, it is preferable to increase the strength of the portion of the airbag 10 to be made to contact the hood 4, by forming the patched portion 11c on the base cloth 11. The patched portion 11c may be formed with a radius of 100 mm to 200 mm for example, about the position corresponding to contact the upper edge of the hood 4.

Figure 53:
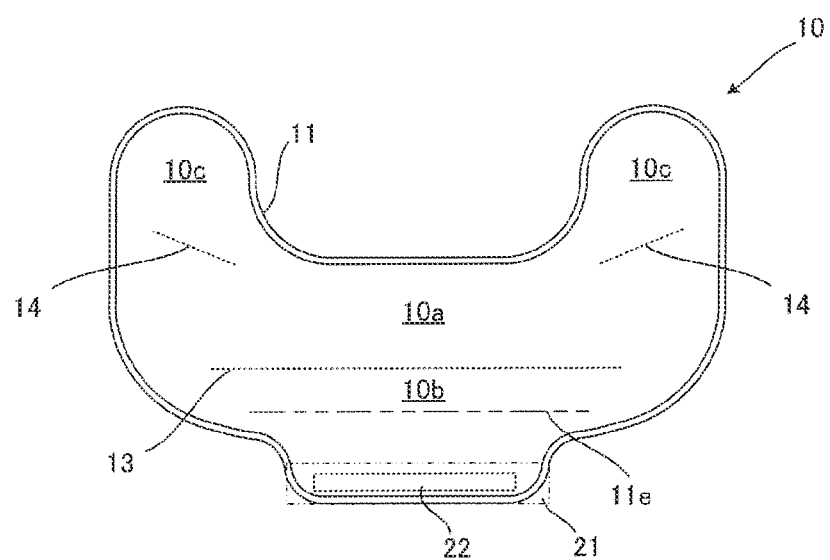
FIG. 53 is a schematic drawing showing an example of a tucked portion 11e provided in the airbag 10 according to the first embodiment.
Figure 54:
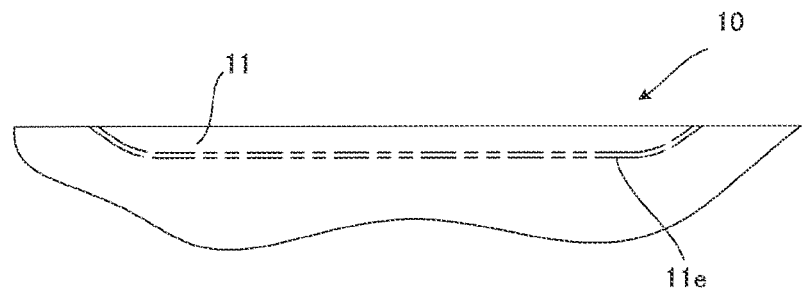
FIG. 54 is an enlarged drawing of a part of FIG. 53.
Figure 55:
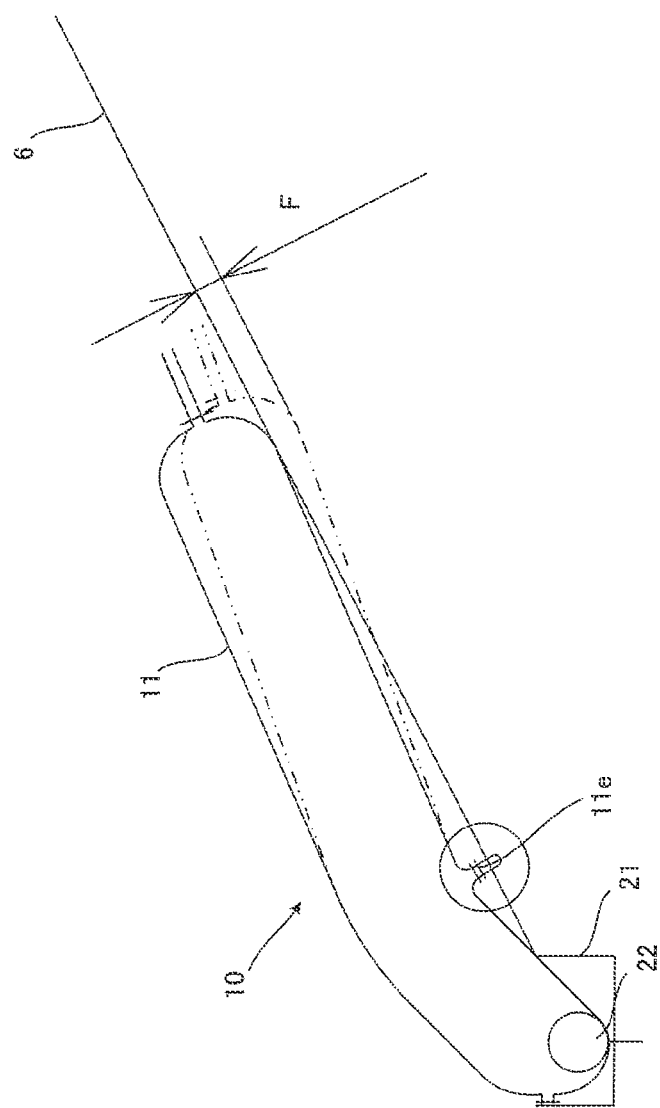
FIG. 55 is a schematic side view of the airbag 10 according to the first embodiment, with the tucked portion 11e.
Figure 56:
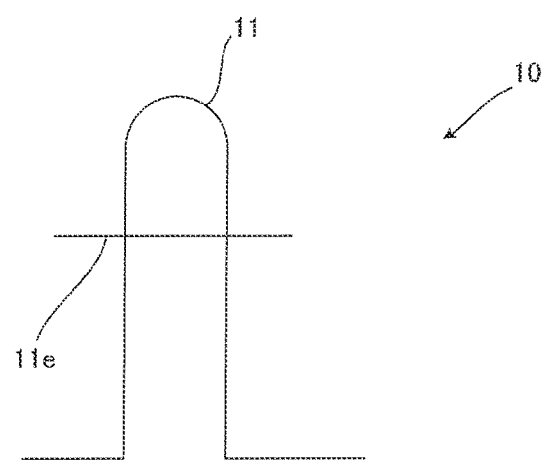
FIG. 56 is a schematic side view showing the tucked portion 11e.
Figure 57:
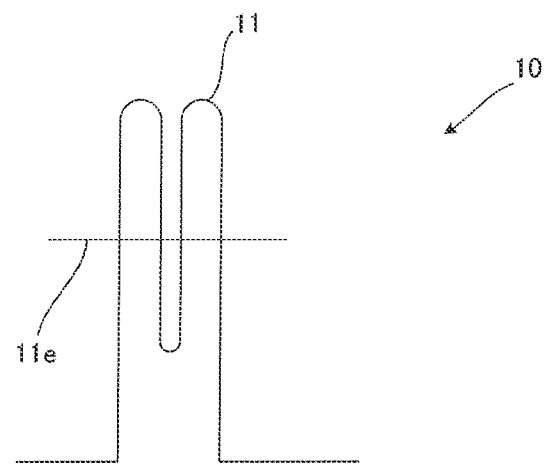
FIG. 57 is a schematic side view showing another example of the tucked portion 11e.

FIG. 53 is a schematic drawing showing an example of the tucked portion 11e provided in the airbag 10 according to the first embodiment. FIG. 54 is an enlarged drawing of a part of FIG. 53. FIG. 55 is a schematic side view of the airbag 10 according to the first embodiment, with the tucked portion 11e. FIG. 56 is a schematic side view showing the tucked portion 11e. FIG. 57 is a schematic side view showing another example of the tucked portion 11e.

In the case where the airbag 10 is unfolded along the front pillar 2 through between the hood 4 and the windshield 6 as shown in FIG. 22, the airbag 10 may rise while proceeding upward along the windshield 6 and the front pillar 2, thus floating therefrom. When the airbag 10 floats from the windshield 6 and the front pillar 2, the airbag 10 is prone to shake largely.

Accordingly, the airbag 10 according to the first embodiment may include a tucked portion 11e formed on a portion of the base cloth 11, by forming a tuck and sewing the same. It is preferable to form the tucked portion 11e on the side of the airbag 10 to be made to contact the vehicle body. Forming the tucked portion 11e on the side of the airbag 10 to be made to contact the vehicle body, allows the airbag 10 to be bent at the tucked portion 11e thus to be unfolded toward the vehicle body, as shown in FIG. 55.

It is preferable, for example, to form the tucked portion 11e such that the airbag 10 would be bent as indicated by dash-dot-dot lines in FIG. 55 if the windshield 6 was not there. Actually the windshield 6 is there, and hence the airbag 10 is located as indicated by solid lines. Accordingly, the airbag 10 is pressed against the windshield 6 by an amount corresponding to a gap F. Therefore, counterforce is generated between the airbag 10 and the vehicle body, so that the airbag 10 is immediately suppressed from shaking upon being expanded, thus to be stably unfolded.

It is preferable to form the tucked portion 11e with a length in the vehicle width direction longer than the length of the lower cover unit 21 in the vehicle width direction. Making the tucked portion 11e longer than the lower cover unit 21 in the vehicle width direction suppresses the airbag 10 from rising owing to contacting the lower cover unit 21.

In addition, it is preferable to form the tucked portion 11e at a position spaced from the lower cover unit 21 at least by 10 mm. Locating the tucked portion 11e at a position at least 10 mm away from the lower cover unit 21 allows the influence of the lower cover unit 21 to be minimized. On the other hand, it is not preferable to locate the tucked portion 11e excessively away from the lower cover unit 21. For example, it is preferable to form the tucked portion 11e at a position corresponding to the wiper, because in this case the airbag 10 can be unfolded so as to circumvent the wiper. Specifically, it is preferable to locate the tucked portion 11e at a position spaced from the end portions of the lower cover unit 21 by 10 mm to 250 mm. More preferably, the tucked portion 11e may be formed at a position 10 mm to 100 mm away from the end portions of the lower cover unit 21.

As shown in FIG. 56, the tucked portion 11e is formed by gathering a part of the base cloth 11 and sewing the gathered portion. The amount that the base cloth 11 is fooled back is the smaller the closer to the lower cover unit 21 the tucked portion 11e is, and the larger the farther away therefrom the tucked portion 11e is. It is preferable to fold back, for example, by an amount of 10 mm to 100 mm.

The tucked portion 11e also serves to restrict the direction in which the airbag 10 is unfolded, and therefore has to be sewn with high strength. In particular, the end portion of the stitch may act as a starting point of tearing, and therefore it is preferable to reduce the tension applied to the end portion of the stitch by the internal pressure of the airbag 10, for example by curving the end portion and sewing as far as the end portion of the fold-back portion of the airbag.

Further, folding back the base cloth 11 by a large amount to form the tucked portion 11e may cause interference with the peripheral parts. Therefore, the base cloth 11 may be folded back a plurality of times as shown in FIG. 57. By folding back the base cloth 11 a plurality of times to form the tucked portion 11e enables reduction of the folded excess of the base cloth 11 of the airbag 10.

The airbag unit 20 according to one or more embodiments is configured to cover at least a part of the windshield 6 and the front pillar 2 outside of the vehicle 1, and includes an airbag 10 formed in a U-shape including the bottom portion and the pair of projecting portions 10c respectively projecting from the bottom portion, the gas generator 22 that ejects gas into the airbag 10, the lower cover unit 21 that accommodates therein the unexpanded airbag 10 and the gas generator 22, and the upper cover unit 24 that covers the lower cover unit 21 containing therein the airbag 10, and the airbag 10 is expanded by the gas ejected from the gas generator 22 through between the hood 4 of the vehicle 1 and the windshield 6. The mentioned configuration allows efficient utilization of the space and enables the airbag 10 to rapidly expand to the desired position. Further, the airbag unit 20 can be built in a reduced size and weight, and be installed in an existing vehicle body.

In the airbag unit 20 configured as above, the airbag 10 covers at least a part of the hood 4 of the vehicle 1, and therefore the portion of the vehicle 1 most likely to collide with an object can be properly covered.

In the airbag unit 20 configured as above, the lower cover unit 21 and the upper cover unit 24 respectively include the recesses 21d, 21e and 24c, 24d for circumventing the functional parts of the vehicle 1 such as the wiper 7, the washer nozzle N, and the lower end portion 6a of the windshield 6. Therefore, the airbag unit 20 can be placed close to the windshield 6, so that the airbag 10 can rapidly expand to the desired position.

In the airbag unit 20 configured as above, the upper cover unit 24 is connected to the cowl top 9 of the vehicle 1. Accordingly, the upper cover unit 24 can also serve as the cowl top 9, and the airbag unit 20 can be placed at the position of the cowl top 9. Such a configuration allows efficient utilization of the space.

In the airbag unit 20 configured as above, since the upper cover unit 24 includes the groove formed on the upper face thereof, water that has fallen on the upper cover unit 24 can be drained along the groove.

In the airbag unit 20 configured as above, the upper cover unit 24 includes the tear line 24j that facilitates the upper cover unit 24 to be torn and the hinge 24k that facilitates the upper cover unit 24 to be bent, the lower cover unit 21 and the upper cover unit 24 respectively include the offset portion 21f and the offset portion 24L recessed backward and located on the side of the forward portion of the vehicle 1, and the tear line 24j is offset along the offset portions 21f, 24L. The mentioned configuration allows the upper cover unit 24 to reach the hood 4 when the tear line 24j is torn apart and the upper cover unit 24 is bent along the hinge 24k, thereby preventing the airbag 10 from intruding into the space under the hood 4.

In the airbag unit 20 configured as above, the upper cover unit 24 includes the sloped recess formed in the region of the upper face of the upper cover unit 24 on the side of the forward portion of the vehicle 1. The mentioned configuration prevents interference between the upper cover unit 24 and the peripheral parts such as the washer nozzle N for ejecting the window washer fluid.

In the airbag unit 20 configured as above, the lower cover unit 21 includes the sloped cover bottom 21a and the cover sidewall 21b projecting from the cover bottom 21a, and the water escape hole is provided in the cover bottom 21a or at the lower end portion of the cover sidewall 21b. Therefore, water that has intruded inside the lower cover unit 21 can be discharged.

In the airbag unit 20 configured as above, the bottom portion covers at least a part of the hood 4, and the thickness of the projecting portion 10c of the airbag 10 in the vertical direction from the windshield 6 is thicker than the thickness of the bottom portion of the airbag 10 in the vertical direction from the hood 4. The mentioned configuration allows reduction of the capacity of the portion of the airbag 10 to be unfolded over the hood 4 and the upper cover unit 24, which are capable of serving as a buffer material, thereby enabling the use amount of the gas to be reduced.

In the airbag unit 20 configured as above, the thickness h1 of the airbag 10 in the bottom portion in the vertical direction from the hood 4 satisfies 80 mm≤h1≤230 mm, or 80 mm≤h1≤180 mm, and the thickness h2 of the airbag 10 in the projecting portion 10c in the vertical direction from the windshield 6 satisfies 180 mm≤h2≤280 mm, or 200 mm≤h2≤250 mm. Thus, the airbag 10 can be made even smaller.

In the airbag unit 20 configured as above, since the airbag 10 includes the projection inner tether 14 constituting the partition between the bottom portion and the projecting portion 10c, the airbag 10 can be made to rapidly expand from the side closer to the object, so that the object can be properly protected.

In the airbag unit 20 configured as above, the projection inner tether 14 is inclined so as to be closer to the distal end of the projecting portion 10c in a direction away from the midpoint between the pair of projecting portions 10c formed in the U-shape. The mentioned configuration reduces fluctuation of the projecting portion 10c when the airbag 10 is unfolded, thereby allowing the projecting portion 10c to stably cover the front pillar 2.

In the airbag unit 20 configured as above, the airbag 10 further includes the bottom inner tether 13 that divides the bottom portion into two sections, and the section of the bottom portion of the airbag 10 on the side of the windshield 6 divided by the bottom inner tether 13 constitutes the first unfolding portion 10a, the section of the bottom portion of the airbag 10 on the side of the hood 4 divided by the bottom inner tether 13 constitutes the second unfolding portion 10b, and the projecting portion 10c of the airbag 10 constitutes the third unfolding portion. Therefore, the airbag 10 can be rapidly expanded from the side closer to the object, so that the object can be properly protected.

In the airbag unit 20 configured as above, the bottom inner tether 13 includes the gas passage 13a, and the airbag 10 includes the diffuser 15 that leads the gas generated by the gas generator 22 to the gas passage 13a. The mentioned configuration allows the gas to flow along the diffuser 15 thus to smoothly pass through the gas passage 13a. As a result, the airbag 10 can be properly expanded.

In the airbag unit 20 configured as above, since the bottom inner tether 13 is supported by the gas generator 22 together with the airbag 10, the bottom inner tether 13 serves as a patch that improves the strength, thereby increasing the attaching strength of the airbag 10.

In the airbag unit 20 configured as above, the central portion of the bottom inner tether 13 is made higher than the end portions thereof in the width direction of the vehicle 1. Therefore, the upper face of the airbag 10 becomes generally horizontal over the entire width, when the airbag 10 is unfolded.

In the airbag unit 20 configured as above, since the gas generator 22 is supported by the gas generator holder 28 that also serves as the diffuser 15, the gas can be smoothly ejected into the airbag 10.

In one or more embodiments, the airbag unit 20 further includes the harness 22c connected to the gas generator 22, the harness 22c being longer than the length of the lower cover unit 21 in the longitudinal direction thereof. The mentioned configuration allows the harness 22c to be properly routed.

In the airbag unit 20 configured as above, since 80% or more of the harness 22c is accommodated in the lower cover unit 21, disturbance by an unnecessary excess of the harness 22c can be avoided.

In the airbag unit 20 configured as above, the airbag 10 includes the collapse prevention tether 16 connecting between a part of the bottom portion on the side of the windshield 6 and a part of the projecting portion 10c on the side of the windshield 6. The mentioned configuration reduces fluctuation of the projecting portion 10c when the airbag 10 is unfolded, thereby allowing the projecting portion 10c to stably cover the front pillar 2.

In the airbag unit 20 configured as above, the airbag 10 includes the crushing tether 17 having one end attached to the bottom portion and the other end attached to the lower cover unit 21 or the bottom portion, so that the end portions of the bottom portion in the width direction of the vehicle body are crushed at the time of expansion of the airbag 10. The mentioned configuration reduces fluctuation of the airbag 10, thereby allowing the airbag 10 to be stably unfolded. Further, the capacity of the airbag 10 is reduced by crushing the end portions of the airbag 10, which leads to reduction in gas consumption.

In the airbag unit 20 configured as above, the airbag 10 includes the crushing tether 17 having one end attached to the bottom portion and the other end attached to both of the lower cover unit 21 and the bottom portion, so that the end portions of the bottom portion in the width direction of the vehicle body are crushed at the time of expansion of the airbag 10. The mentioned configuration allows a step in the manufacturing process to be skipped, thereby facilitating the assembly of the airbag unit 20.

In the airbag unit 20 configured as above, since the lower cover unit 21 is attached to the bulkhead of the vehicle 1, the airbag unit 20 can be stably retained.

In the airbag unit 20 configured as above, the airbag 10 includes the marking provided on the surface thereof and indicating steps to be followed before the expansion and after the unfolding. Therefore, the operator can confirm the process to be followed before the expansion and after the unfolding, to thereby rapidly and properly perform the work before the expansion and after the unfolding of the airbag 10.

In the airbag unit 20 configured as above, the unfolded size of the projecting portion 10c of the airbag 10 is longer in the width direction of the vehicle 1 than the size of the front pillar 2 in the width direction of the vehicle 1. Therefore, the pedestrians can be effectively protected.

In the airbag unit 20 configured as above, the airbag 10 includes the vulnerable stitch portion 19 provided in the upper portion of the bottom portion, to be torn apart by a predetermined internal pressure. The mentioned configuration substantially reduces the inner capacity at the initial stage of the expansion thereby increasing the expanding speed of the airbag 10, and resultantly enables the airbag 10 to be rapidly unfolded over the entire width of the hood 4 of the vehicle 1. In addition, the expanding speed can be increased without increasing the output of the gas generator 22.

In the airbag unit 20 configured as above, the airbag 10 includes the patched portion at a position interfering with other parts. Therefore, the strength of the base cloth 11 can be increased, and the airbag 10 can be properly unfolded because the main body of the airbag 10 is exempted from damage despite contacting the hood 4 in the expansion process.

In the airbag unit 20 configured as above, the airbag 10 includes the tucked portion folded back and sewn together, the tucked portion being located on the side of the vehicle 1. The mentioned configuration allows the airbag 10 to be bent at the tucked portion thus to be unfolded in the direction to contact the vehicle body. Therefore, the fluctuation of the airbag 10 after the expansion can be rapidly suppressed, so that the airbag 10 can be stably unfolded.

The foregoing folding method of the airbag 10, formed in the U-shape including the bottom portion and the pair of projecting portions 10c respectively projecting from the bottom portion, includes folding the projecting portion 10c of the airbag 10 onto the side of the bottom portion, folding the projecting portion 10c of the airbag 10 folded onto the side of the bottom portion and both end portions of the bottom portion in the longitudinal direction thereof, and folding the bottom portion of the airbag 10 the longitudinal end portions of which have been folded, from the opposite side of the projecting portion 10c. The mentioned folding method allows the bottom portion to be first expanded in the event of collision with the pedestrian, so that the airbag 10 is rapidly unfolded from the portion corresponding to a region over the hood 4, which is closer to the pedestrian, thus enabling the pedestrian to be effectively protected.

The foregoing folding method of the airbag 10, formed in the U-shape including the bottom portion and the pair of projecting portions 10c projecting from the bottom portion, includes folding the projecting portion 10c of the airbag 10 onto the side of the bottom portion, folding, from the opposite side of the projecting portion 10c, the bottom portion of the airbag 10 onto which the projecting portion 10c has been folded, and folding the projecting portion 10c of the airbag 10 folded onto the bottom portion, the bottom portion having been folded from the opposite side of the projecting portion 10c, and both end portions of the bottom portion in a longitudinal direction thereof. The mentioned folding method increases the expanding speed of the airbag 10 in the width direction of the vehicle 1, thereby allowing the airbag 10 to be rapidly unfolded over the entire width of the hood 4 of the vehicle 1. As a result, the projecting portion 10c supposed to cover the front pillar 2 can also be rapidly unfolded.

In the foregoing airbag 10 folding method, the bottom portion includes the first unfolding portion 10a located on the side of one of the projecting portions 10c and the second unfolding portion 10b located on the side of the other projecting portion 10c. The folding of the projecting portion 10c of the airbag 10 onto the side of the bottom portion includes folding the projecting portion 10c and the first unfolding portion 10a of the bottom portion onto the side of the second unfolding portion 10b, and the folding of the bottom portion of the airbag 10 from the opposite side of the projecting portion 10c includes folding the second unfolding portion 10b of the bottom portion. The mentioned folding method allows the second unfolding portion 10b to be first expanded in the event of collision with the pedestrian, so that the airbag 10 is rapidly expanded from the portion corresponding to a region over the hood 4, which is closer to the pedestrian, thus enabling the pedestrian to be effectively protected. Further, it is known that the airbag 10 imposes a strongest impact on the peripheral parts in the initial stage of the expansion when the first lot of the gas is ejected from the gas generator 22. However, in the airbag 10 configured as above the first unfolding portion 10a to be unfolded over the wiper 7 starts to expand after the second unfolding portion 10b is expanded, and therefore the impact of the first unfolding portion 10a against the wiper 7 can be mitigated.

In the foregoing airbag 10 folding method, the number of folding times of the projecting portion 10c of the airbag 10 onto the side of the bottom portion is larger than the number of folding times of the projecting portion 10c and the longitudinal end portions of the bottom portion. The mentioned folding method increases the expanding speed of the airbag 10 in the width direction of the vehicle 1, thereby allowing the airbag 10 to be rapidly unfolded over the entire width of the hood 4 of the vehicle 1.

The foregoing folding method of the airbag 10, formed in the U-shape including the bottom portion and the pair of projecting portions 10c projecting from the bottom portion, includes folding the projecting portion 10c of the airbag 10 onto the side of the bottom portion, folding in a Z-shape the projecting portion 10c of the airbag 10 folded onto the side of the bottom portion and both end portions of the bottom portion in a longitudinal direction thereof, and folding the airbag 10 the longitudinal end portions of which have been folded onto the side of the bottom portion, in a direction opposite to the folding of the projecting portion 10c onto the side of the bottom portion. The mentioned folding method increases the expanding speed of the airbag 10 in the width direction of the vehicle 1, thereby allowing the airbag 10 to be rapidly unfolded over the entire width of the hood 4 of the vehicle 1.

The foregoing airbag 10 folding method further includes folding in a Z-shape the projecting portion 10c of the airbag 10 and the longitudinal end portions of the bottom portion, after the folding of the airbag 10 the longitudinal end portions of which have been folded onto the side of the bottom portion. Therefore, the airbag 10 is alternately folded in the up-down direction and in the longitudinal direction, which improves the balance of the expanding performance.

In the foregoing airbag 10 folding method, the folding of the projecting portion 10c of the airbag 10 onto the side of the bottom portion includes rolling the end portion of the projecting portion 10c in one direction away from the vehicle body, as an initial action of the folding. The mentioned folding method prevents interference between the end portion of the projecting portion 10c and the vehicle body at the time of expansion, thus enabling the airbag 10 to be rapidly unfolded.

The foregoing folding method of the airbag 10, formed in the U-shape including the bottom portion and the pair of projecting portions 10c projecting from the bottom portion, includes folding the projecting portion 10c of the airbag 10 and both end portions of the bottom portion in a longitudinal direction thereof, folding the projecting portion 10c of the airbag 10 the longitudinal end portions of which have been folded onto the side of the bottom portion, and folding the projecting portion 10c of the airbag 10 folded onto the side of the bottom portion and the longitudinal end portions of the bottom portion. The mentioned folding method increases the expanding speed of the airbag 10 in the width direction of the vehicle 1, thereby allowing the airbag 10 to be rapidly unfolded over the entire width of the hood 4 of the vehicle 1.

The foregoing embodiments are merely examples of the airbag unit 20 according to the present invention, and the constituents of the airbag unit 20 may be modified or combined in different manners, within the scope of the present invention defined by the appended claims.

REFERENCE SIGNS LIST

1: vehicle
2: front pillar
3: fender
4: hood
5: roof
6: windshield
7: wiper
8: bulkhead
9: cowl top
10: airbag
10a: first unfolding portion (bottom portion)
10b: second unfolding portion (bottom portion)
10c: third unfolding portion (projecting portion)
11: base cloth
11c: patched portion
11e: tucked portion
12: sewing thread
13: bottom inner tether (second inner tether)
14: projection inner tether (first inner tether)
15: diffuser cloth
16: collapse prevention tether (first outer tether)
17: crushing tether (second outer tether)
18: marking
19: vulnerable stitch portion
20: airbag unit
21: lower cover unit
22: gas generator
23: bag case
24: upper cover unit
25: spacer cloth
26: cover cloth
31: first bracket
32: second bracket

What is claimed is:

1. An airbag unit configured to cover at least a part of a windshield and a front pillar outside of a vehicle, the airbag unit comprising:
    an airbag formed in a U-shape including a bottom portion and a pair of projecting portions projecting from the bottom portion;
    a gas generator that ejects gas into the airbag;
    a lower cover unit that accommodates therein the folded airbag and the gas generator; and
    an upper cover unit that covers the lower cover unit containing therein the airbag,
    wherein the airbag is expanded by the gas ejected from the gas generator through between a hood of the vehicle and the windshield, and
    the lower cover unit and the upper cover unit each include a recess for circumventing functional parts of the vehicle.

2. The airbag unit according to claim 1,
    wherein the upper cover unit is connected to a cowl top of the vehicle.

3. The airbag unit according to any one of claim 1,
    wherein the upper cover unit includes a groove formed on an upper face thereof.

4. The airbag unit according to any one of claim 1,
    wherein the upper cover unit includes a tear line that facilitates the upper cover unit to be torn apart and a hinge that facilitates the upper cover unit to be bent,
    the lower cover unit and the upper cover unit each include an offset portion recessed backward and located on the side of a forward portion of the vehicle, and
    the tear line is offset along the offset portion.

5. The airbag unit according to claim 1,
    wherein the lower cover unit includes a sloped cover bottom and a cover sidewall projecting from the cover bottom, and
    a water escape hole is provided in the cover bottom or at a lower end portion of the cover sidewall.

6. The airbag unit according to claim 1,
    wherein the bottom portion covers at least a part of the hood, and
    a thickness of the projecting portion of the airbag in a vertical direction from the windshield is thicker than a thickness of the bottom portion of the airbag in a vertical direction from the hood.

7. The airbag unit according to claim 6,
    wherein a thickness h1 of the airbag in the bottom portion in the vertical direction from the hood satisfies 80 mm≤h1≤230 mm, or 80 mm≤h1≤180 mm, and
    a thickness h2 of the airbag in the projecting portion in the vertical direction from the windshield satisfies 180 mm≤h2≤280 mm, or 200 mm≤h2≤250 mm.

8. The airbag unit according to claim 1,
    wherein the airbag includes a first inner tether constituting a partition between the bottom portion and the projecting portion.

9. The airbag unit according to claim 8,
    wherein the first inner tether is inclined so as to be closer to a distal end of the projecting portion in a direction away from the midpoint between the pair of projecting portions formed in the U-shape.

10. The airbag unit according to claim 8,
    wherein the airbag further includes a second inner tether that divides the bottom portion into two sections,
    the section of the bottom portion of the airbag on the side of the windshield divided by the second inner tether constitutes a first unfolding portion,
    the section of the bottom portion of the airbag on the side of the hood divided by the second inner tether constitutes a second unfolding portion, and
    the projecting portion of the airbag constitutes a third unfolding portion.

11. The airbag unit according to claim 10,
    wherein the second inner tether includes a gas passage, and the airbag includes a diffuser that leads the gas generated by the gas generator to the gas passage.

12. The airbag unit according to claim 10,
wherein a central portion of the second inner tether is made higher than end portions thereof in a width direction of the vehicle.

13. The airbag unit according to claim 10,
wherein the gas generator is supported by a gas generator holder that serves as a diffuser.

14. The airbag unit according to claim 10, further comprising a harness connected to the gas generator, the harness being longer than a length of the lower cover unit in a longitudinal direction thereof.

15. The airbag unit according to claim 14,
wherein 80% or more of the harness is accommodated in the lower cover unit.

16. An airbag unit configured to cover at least a part of a windshield and a front pillar outside of a vehicle, the airbag unit comprising:
  an airbag formed in a U-shape including a bottom portion and a pair of projecting portions projecting from the bottom portion;
  a gas generator that ejects gas into the airbag;
  a lower cover unit that accommodates therein the folded airbag and the gas generator; and
  an upper cover unit that covers the lower cover unit containing therein the airbag,
  wherein the airbag is expanded by the gas ejected from the gas generator through between a hood of the vehicle and the windshield,
  the lower cover unit and the upper cover unit each include a recess for circumventing functional parts of the vehicle, and
  the upper cover unit includes a sloped recess formed in a region of the upper face of the upper cover unit on the side of the forward portion of the vehicle.

17. An airbag unit configured to cover at least a part of a windshield and a front pillar outside of a vehicle, the airbag unit comprising:
  an airbag formed in a U-shape including a bottom portion and a pair of projecting portions projecting from the bottom portion;
  a gas generator that ejects gas into the airbag;
  a lower cover unit that accommodates therein the folded airbag and the gas generator; and
  an upper cover unit that covers the lower cover unit containing therein the airbag,
  wherein the airbag is expanded by the gas ejected from the gas generator through between a hood of the vehicle and the windshield,
  the airbag includes a first inner tether constituting a partition between the bottom portion and the projecting portion,
  the airbag further includes a second inner tether that divides the bottom portion into two sections,
  the section of the bottom portion of the airbag on the side of the windshield divided by the second inner tether constitutes a first unfolding portion,
  the section of the bottom portion of the airbag on the side of the hood divided by the second inner tether constitutes a second unfolding portion,
  the projecting portion of the airbag constitutes a third unfolding portion, and
  the second inner tether is supported by the gas generator together with the airbag.

18. The airbag unit according to claim 17,
wherein the airbag includes a first outer tether connecting between a part of the bottom portion on the side of the windshield and a part of the projecting portion on the side of the windshield.

19. The airbag unit according to claim 14,
wherein the airbag includes a second outer tether having one end attached to the bottom portion and the other end attached to one of the lower cover unit and the bottom portion, so that the end portions of the bottom portion in the width direction of the vehicle body are crushed at the time of expansion of the airbag.

20. The airbag unit according to claim 14,
wherein the airbag includes a second outer tether having one end attached to the bottom portion and the other end attached to both of the lower cover unit and the bottom portion, so that the end portions of the bottom portion in the width direction of the vehicle body are crushed at the time of expansion of the airbag.

21. The airbag unit according to claim 17,
wherein the lower cover unit is attached to a bulkhead of the vehicle.

22. The airbag unit according to claim 17,
wherein the airbag includes a marking provided on a surface thereof and indicating steps to be followed before the expansion and after the unfolding.

23. The airbag unit according to claim 17,
wherein an unfolded size of the projecting portion of the airbag is longer in the width direction of the vehicle, than a size of the front pillar in the width direction of the vehicle.

24. The airbag unit according to claim 17,
wherein the airbag includes a vulnerable stitch portion provided in an upper portion of the bottom portion, to be torn apart by a predetermined internal pressure.

25. The airbag unit according to claim 17,
wherein the airbag includes a patched portion at a position interfering with other parts.

26. The airbag unit according to claim 17,
wherein the airbag includes a tucked portion folded back and sewn together, the tucked portion being located on the side of the vehicle.

* * * * *